US010805273B2

United States Patent
Shetty et al.

(10) Patent No.: US 10,805,273 B2
(45) Date of Patent: *Oct. 13, 2020

(54) SYSTEMS FOR IMPROVING PERFORMANCE AND SECURITY IN A CLOUD COMPUTING SYSTEM

(71) Applicant: Egnyte, Inc., Mountain View, CA (US)

(72) Inventors: Sachin Shetty, Mumbai (IN); Amrit Jassal, Morgan Hill, CA (US); Krishanu Lahiri, San Jose, CA (US); Yogesh Rai, Mountain View, CA (US); Manoj Chauhan, Mountain View, CA (US); Leszek Jakubowski, Poznan (PL); Shishir Sharma, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/476,376

(22) Filed: Mar. 31, 2017

(65) Prior Publication Data

US 2017/0286696 A1 Oct. 5, 2017

Related U.S. Application Data

(62) Division of application No. 15/476,223, filed on Mar. 31, 2017.

(Continued)

(51) Int. Cl.
*H04L 29/06* (2006.01)
*H04L 9/08* (2006.01)
(Continued)

(52) U.S. Cl.
CPC ...... *H04L 63/0281* (2013.01); *G06F 16/1748* (2019.01); *G06F 16/182* (2019.01);
(Continued)

(58) Field of Classification Search
CPC . H04L 63/0281; H04L 9/0822; H04L 9/0897; G06F 21/6218
See application file for complete search history.

(56) References Cited

U.S. PATENT DOCUMENTS 8,782,393 B1 * 7/2014 Rothstein ............ H04L 63/0281
713/151
9,071,429 B1 * 6/2015 Roth ...................... H04L 9/0894
(Continued)

OTHER PUBLICATIONS

U.S. Appl. No. 15/477,063, Office Action dated Jul. 26, 2019.
(Continued)

*Primary Examiner* — Vance M Little
(74) *Attorney, Agent, or Firm* — Larry E. Henneman, Jr.; Henneman & Associates, PLC

(57) ABSTRACT

Methods in a cloud object store facilitate strong data encryption, customer-management of object (encryption) keys, reductions in latency, globally-distributed object storage, and handling of streamed uploads. A method for encrypting objects stored in a cloud includes encrypting each object with a unique encryption (object) key. The plaintext object keys are generated in advance of uploads. The plaintext object keys can be stored in an object database in the cloud. Alternatively, the plaintext object keys can be provided to a customer's HSM, encrypted, and returned to the cloud, such that encrypted object keys, encrypted by the customer, are stored in the cloud. The cloud can alternatively encrypt the customer's object keys with a master key for the customer, which is then encrypted by the customer's HSM before being stored in the cloud. Proxies are also deployed for efficiently communicating with customer security modules.

18 Claims, 29 Drawing Sheets

Related U.S. Application Data

(60) Provisional application No. 62/317,018, filed on Apr. 1, 2016.

(51) Int. Cl.

| | | |
|---|---|---|
| *G06F 21/62* | (2013.01) | |
| *H04L 9/32* | (2006.01) | |
| *H04L 29/08* | (2006.01) | |
| *G06F 16/174* | (2019.01) | |
| *G06F 16/182* | (2019.01) | |

(52) U.S. Cl.
CPC ........ *G06F 21/6218* (2013.01); *H04L 9/0822* (2013.01); *H04L 9/0897* (2013.01); *H04L 9/3263* (2013.01); *H04L 63/0209* (2013.01); *H04L 63/0471* (2013.01); *H04L 67/10* (2013.01); *H04L 67/1097* (2013.01); *H04L 63/0272* (2013.01); *H04L 2463/062* (2013.01)

(56) References Cited

U.S. PATENT DOCUMENTS

| | | | |
|---|---|---|---|
| 9,076,004 B1 | 7/2015 | Bogorad | |
| 9,152,578 B1* | 10/2015 | Saad | G06F 12/1408 |
| 9,264,333 B1* | 2/2016 | Mizrahi | H04J 3/0673 |
| 9,413,730 B1* | 8/2016 | Narayan | H04L 63/0471 |
| 9,773,118 B1* | 9/2017 | Bennett | G06F 21/6218 |
| 2002/0194209 A1 | 12/2002 | Bolosky et al. | |
| 2008/0019527 A1* | 1/2008 | Youn | H04L 9/083 |
| | | | 380/278 |
| 2008/0104146 A1* | 5/2008 | Schwaab | G06F 11/1451 |
| 2008/0263213 A1 | 10/2008 | Kinoshita | |
| 2012/0131341 A1 | 5/2012 | Mane et al. | |
| 2012/0328105 A1* | 12/2012 | Mukkara | H04L 9/0897 |
| | | | 380/277 |
| 2013/0311612 A1 | 11/2013 | Dickinson | |
| 2014/0006773 A1 | 1/2014 | Chazalet et al. | |
| 2014/0040196 A1 | 2/2014 | Wijayaratne et al. | |
| 2014/0101451 A1 | 4/2014 | Chan et al. | |
| 2014/0122866 A1 | 5/2014 | Haeger et al. | |
| 2014/0149461 A1 | 5/2014 | Wijayaratne et al. | |
| 2014/0149794 A1* | 5/2014 | Shetty | H04L 67/1095 |
| | | | 714/20 |
| 2014/0270178 A1* | 9/2014 | Kiang | H04L 9/0822 |
| | | | 380/281 |
| 2014/0307734 A1 | 10/2014 | Luby et al. | |
| 2014/0331061 A1* | 11/2014 | Wright | H04L 9/085 |
| | | | 713/189 |
| 2015/0113279 A1 | 4/2015 | Andersen et al. | |
| 2015/0127937 A1 | 5/2015 | Ali et al. | |
| 2016/0149669 A1 | 5/2016 | Meyers et al. | |
| 2016/0226831 A1 | 8/2016 | Kim et al. | |
| 2016/0267279 A1 | 9/2016 | Catalano | |
| 2016/0315765 A1* | 10/2016 | Zheng | G06F 12/1408 |
| 2016/0321461 A1* | 11/2016 | Oliver | G06F 11/1004 |
| 2017/0185789 A1* | 6/2017 | Khosravi | H04L 9/3263 |
| 2017/0228559 A1 | 8/2017 | Jackson | |
| 2017/0286695 A1 | 10/2017 | Shetty et al. | |
| 2017/0286697 A1 | 10/2017 | Shetty et al. | |
| 2017/0286698 A1 | 10/2017 | Shetty et al. | |

OTHER PUBLICATIONS

R. Nivedhaa and J. Jean Justus, "A Secure Erasure Cloud Storage System Using Advanced Encryption Standard Algorithm and Proxy Re-encryption," International Conference on Communication and Signal Processing, Apr. 3-5, 2018, India.

Shen-Ming Chung, Ming-Der Shieh, Tzi-Cker Chiueh, "A Security Proxy to Cloud Storage Backends Based on an Efficient Wildcard Searchable Encryption," 2018 IEEE 8$^{th}$ International Symposium on Cloud and Service Computing (SC2), Nov. 18-21, 2018.

Youngjun Ren, Jian Shen, Jin Wang, Liming Fang, "Security Analysis of Delegable and Proxy Provable Data Possession in Public Cloud Storage," 2014 Tenth Internation Conference on Intelligent Information Hiding and Multimedia Signal Processing, Aug. 27-29, 2014.

U.S. Appl. No. 15/476,223, Office Action dated Jan. 15, 2019.
U.S. Appl. No. 15/476,223, Office Action dated Jul. 3, 2019.
U.S. Appl. No. 15/476,488, Office Action (Restriction Requirement) dated May 24, 2019.
U.S. Appl. No. 15/476,488, Notice of Allowance dated Nov. 12, 2019.
U.S. Appl. No. 15/476,223, Office Action dated Feb. 11, 2020.
U.S. Appl. No. 15/477,063, Office Action dated May 15, 2020.

* cited by examiner

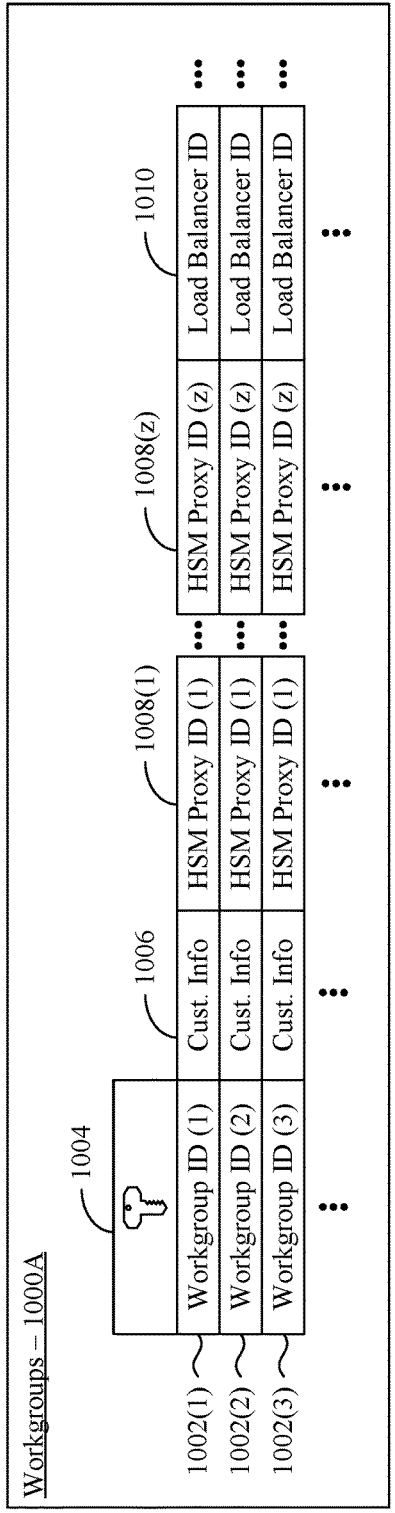
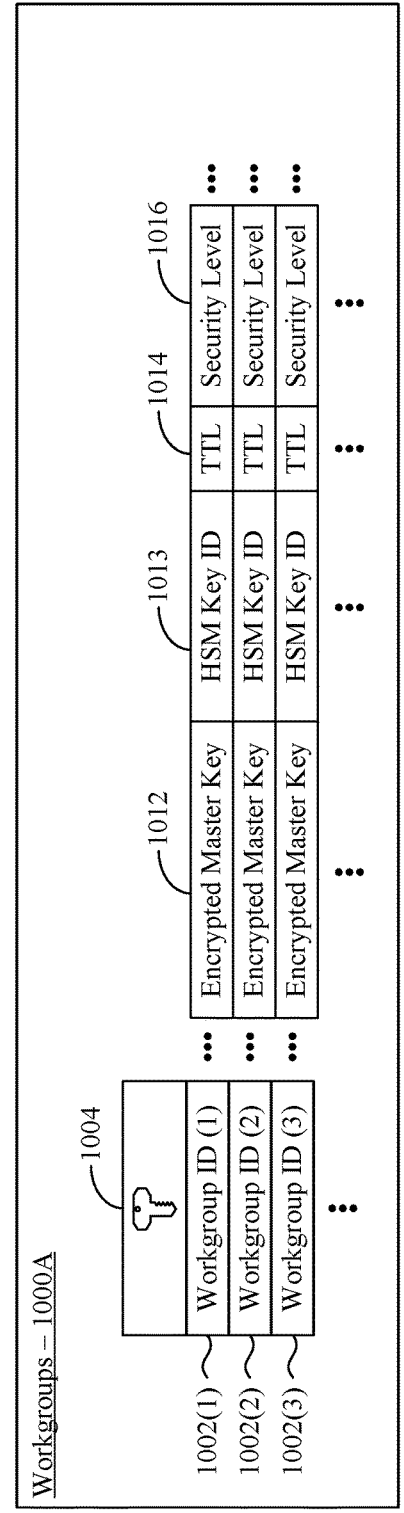
FIG. 10A
FIG. 10B

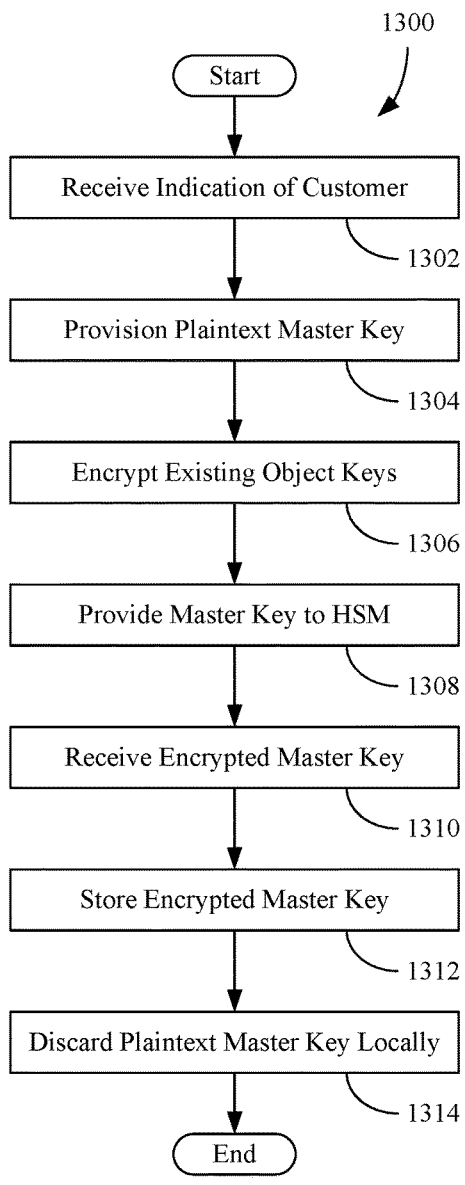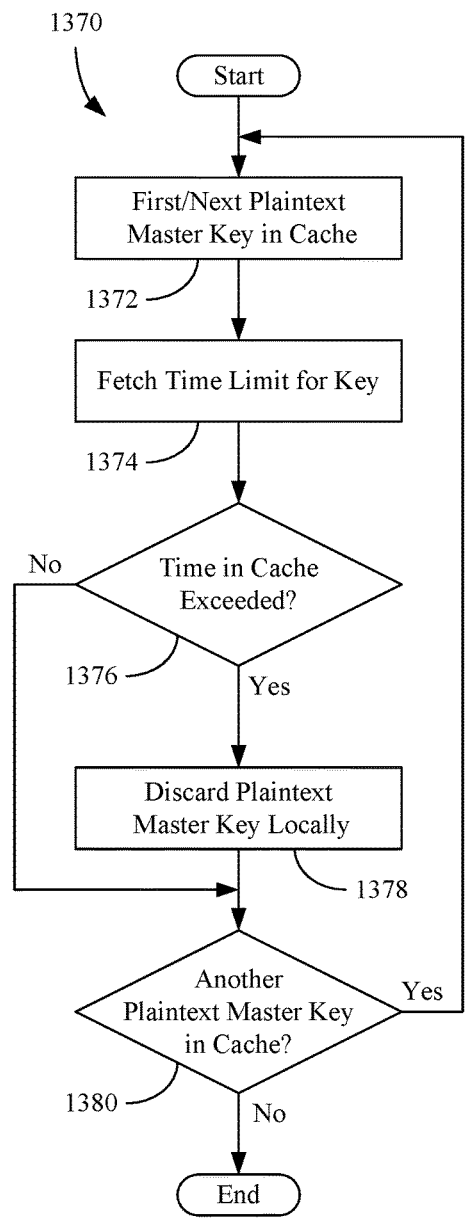
FIG. 13A
FIG. 13E

SYSTEMS FOR IMPROVING PERFORMANCE AND SECURITY IN A CLOUD COMPUTING SYSTEM

CROSS-REFERENCE TO RELATED APPLICATIONS

This application is a division of co-pending U.S. patent application Ser. No. 15/476,223, filed on Mar. 31, 2017 by at least one common inventor, which claims the benefit of U.S. Provisional Patent Application Ser. No. 62/317,018, filed on Apr. 1, 2016 by at least one common inventor, all of which are incorporated by reference herein in their respective entireties.

BACKGROUND

Field of the Invention

This invention relates generally to cloud computing systems, and more particularly to cloud file storage systems.

Description of the Background Art

Cloud computing systems are known. In cloud computing systems, computing and/or storage services are provided to clients over a wide area network such as the Internet.

Cloud computing systems suffer from several drawbacks and inefficiencies. For example, customers have concerns about whether or not their data is truly secure in the cloud and seek assurances that their data is not vulnerable to theft or unauthorized access, for example, by personnel of the cloud service provider. In addition, cloud service providers want cloud computing and storage services to function quickly for their clients, often so the response time of the cloud is similar to that of a desktop computer. Unfortunately, long latency in completing client requests can still be a problem. Other difficulties arise in the cloud when handling very large files or files of unknown size. Accordingly, file size constraints are often imposed on clients. Additionally, while storage limitations of the cloud might not be apparent to a client, the amount of cloud storage space is finite and valuable to the cloud service provider. Therefore, it is desirable to improve the storage efficiency of the cloud computing system.

SUMMARY

The present invention overcomes the problems associated with the prior art by providing a cloud object store that facilitates strong data encryption and facilitates efficient customer-management of object keys in cases where the customer does not want the cloud service provider to be able to decrypt its stored content without the customer's authorization. Additionally, the invention improves cloud performance in various respects, including reducing latency, object storage requirements, and handling of special uploads.

A method for encrypting digital objects stored in an object storage system includes the steps of providing a plurality of unique encryption keys including a first encryption key and a second encryption key, establishing a connection with a client device associated with a customer, receiving a first digital object from the client device, encrypting the first digital object using the first encryption key, and storing the first encrypted digital object. The method also includes the steps of receiving a second digital object from the client device, encrypting the second digital object using the second encryption key, and storing the second encrypted digital object.

In a particular method, each of the plurality of unique encryption keys comprises at least an Advanced Encryption Standard (AES) 256-bit key.

In another particular method, the step of providing the plurality of unique encryption keys comprises generating the plurality of unique encryption keys prior to the step of receiving the first digital object, and temporarily storing the plurality of unique encryption keys, whereby ones of the plurality of unique encryption keys are consumed as digital objects are uploaded to the object storage system.

Still another particular method includes calculating a pre-encryption checksum and a post-encryption checksum for the first digital object, and performing a deduplication operation on the first digital object and other stored digital objects based on the pre-encryption checksum and not the post-encryption checksum.

Yet another particular method includes providing an object database storing a plurality of object records associated with stored digital objects, wherein each of the object records includes information facilitating the decryption of an encrypted one of the unique encryption keys used to encrypt a stored digital object associated with the object record from a security module (e.g., a hardware security module) of the customer.

In still another particular method, the step of receiving the first digital object from the client device includes receiving a plurality of chunks of the first digital object using the transfer encoding chunked mechanism of HTTP and, following receipt of a final chunk of the plurality of chunks, receiving a trailer specifying a checksum associated with the first digital object.

Yet another particular method includes the steps of providing an object database storing a plurality of object records associated with stored digital objects, storing the first encryption key in the object database such that the first encryption key is associated with the first digital object, and storing the second encryption key in the object database such that the second encryption key is associated with the second digital object. A more particular method further includes the steps of receiving a request to download the first encrypted digital object from a requesting client device associated with the customer, fetching the first encryption key from the object database in response to the request to access the first encrypted digital object, decrypting the first encrypted digital object using the first encryption key, and serving the first digital object to the requesting client device.

Another particular method includes a step of communicating with at least one remote customer security module (CSM) associated with the customer, where the remote CSM provides key management services for the customer on behalf of the customer. A more particular method further includes the steps of providing the first and the second encryption keys to the remote CSM such that the remote CSM encrypts the first and the second encryption keys, receiving an encrypted first encryption key and an encrypted second encryption key from the CSM, and discarding the first and the second encryption keys locally. Still more particularly, the method can further include the steps of receiving a request to download the first encrypted digital object from a requesting client device associated with the customer, obtaining the first encryption key from the remote CSM in response to the request to download the first encrypted digital object, decrypting the first encrypted digital object using the first encryption key, and serving the first digital object to the requesting client device. Another more particular method can include deploying at least one customer security module (CSM) proxy for the customer, and configuring the CSM proxy to securely communicate with the remote CSM such that the step of communicating with the remote CSM occurs via the CSM proxy.

Still another particular method includes generating a master key unique to the customer.

A more particular method further includes communicating with at least one remote customer security module (CSM), which provides key management services on behalf of the customer, providing the master key to the remote CSM, and discarding the master key locally. Still more particularly, the method includes receiving an encrypted master key associated with the customer from the remote CSM and storing the encrypted master key in association with the customer. Even more particularly, the method includes receiving an upload request associated with the first digital object from the client device after the master key has been discarded locally, providing the encrypted master key to the remote CSM, receiving the decrypted master key from the remote CSM, encrypting the first encryption key using the master key received from the CSM, storing the encrypted first encryption key such that the encrypted first encryption key is associated with the first digital object, and discarding the master key locally again. A yet even more particular method includes receiving a request to download the first encrypted digital object from a requesting client device associated with the customer after the step of discarding the master key locally again, providing the encrypted master key to the remote CSM, receiving the master key from the remote CSM, the master key being decrypted, decrypting the encrypted first encryption key using the master key received from the remote CSM, decrypting the first encrypted digital object using the first encryption key, serving the first digital object to the requesting client device, and discarding the master key again locally.

Another more particular method includes receiving a file request associated with at least one of the first digital object and the second digital object from the client device or another client device associated with the customer after the master key has been discarded locally, providing the encrypted master key to the remote CSM, receiving the (decrypted) master key from the remote CSM, and temporarily caching the master key for a predetermined time period to service the file request and subsequent file requests. The predetermined time period can be set by the customer.

Still another more particular method includes deploying at least one customer security module (CSM) proxy for the customer and configuring the CSM proxy to securely communicate with the remote CSM such that the step of communicating with the remote CSM occurs via the CSM proxy.

Yet another more particular method includes encrypting the first encryption key using the master key, storing the encrypted first encryption key such that the encrypted first encryption key is associated with the first digital object, encrypting the second encryption key using the master key, and storing the encrypted second encryption key such that the encrypted second encryption key is associated with the second digital object.

A method for proxying key communications between a cloud storage system and a customer security module (CSM) includes the steps of opening a first connection with the cloud storage system, receiving a request for key processing from the cloud storage system via the first connection, opening a second connection with the CSM, where the CSM is operating on behalf of a customer of the cloud storage system, and forwarding the request for key processing to the CSM via the second connection. The request for key processing is associated with the customer and with the encryption of at least one digital object stored on the cloud storage system.

A particular method further includes receiving a response to the request from the CSM, where the response including key information associated with the customer, and forwarding at least the key information to the cloud storage system. In a first more particular method, the request for key processing comprises a plaintext master key assigned by the cloud storage system to the customer, and the key information provided with the response comprises an encrypted master key. In a second more particular method, the request for key processing comprises an encrypted master key associated with a plaintext master key assigned by the cloud storage system to the customer, and the key information provided with the response comprises the plaintext master key. In a third more particular method, the request for key processing comprises a plaintext object key used to encrypt a digital object stored on the object storage system, and the key information provided with the response comprises an encrypted object key. In a fourth more particular method, the request for key processing comprises an encrypted object key associated with a plaintext object key used to encrypt the stored digital object, and the key information provided with the response comprises the plaintext object key.

In another particular method the step of opening the first connection comprises establishing a private network connection with the cloud storage system, and the step of opening the second connection comprises using a Java security process to communicate with the CSM.

In still another particular method, the step of opening the first connection comprises establishing an HTTPS connection, and the step of opening the second connection comprises establishing a private network connection with the CSM via a private network of the customer.

A method for facilitating key management between a cloud storage system and a plurality of customer security modules associated with a plurality of customers of the cloud storage system is also disclosed. The method includes establishing a plurality of cloud storage accounts associated with a plurality of customers, deploying at least one customer security module (CSM) proxy associated with a first customer, configuring the at least one CSM proxy associated with the first customer to securely access a first CSM on a first private network, deploying at least one CSM proxy associated with a second customer, and configuring the at least one CSM proxy associated with the second customer to securely access a second CSM on a second private network. A more particular method further includes deploying a plurality of CSM proxies associated with the first customer and configuring each of the plurality of CSM proxies associated with the first customer to securely access the first CSM.

An object storage system facilitating one-key-per-object encryption includes at least one storage node including memory for storing digital objects therein, a key provisioning service configured to provide a plurality of unique encryption keys including a first encryption key and a second encryption key, a client interface configured to establish a connection with a client device associated with a customer, and an upload service. The upload service is configured to receive a first digital object from the client device, encrypt the first digital object using the first encryption key, and cause the first encrypted digital object to be stored by the at least one storage node. The upload service is also operative to receive a second digital object from the client device, encrypt the second digital object using the second encryption key, and cause the second encrypted digital object to be stored by the at least one storage node.

In a particular embodiment, the key provisioning service comprises a key generator operative to generate the unique encryption keys prior to ones of the unique encryption keys being used by the upload service and a key cache operative to temporarily store the unique encryption keys generated by the key generator for consumption by the upload service.

In another particular embodiment, each of the plurality of unique encryption keys comprises at least an Advanced Encryption Standard (AES) 256-bit key.

In yet another particular embodiment, the object storage system further includes a deduplication service, and the upload service is further operative to calculate a pre-encryption checksum and a post-encryption checksum for the first digital object. The deduplication service is operative to perform a deduplication operation on the first digital object and other stored digital objects based on the pre-encryption checksum and not the post-encryption checksum.

In still another particular embodiment, the object storage system further includes an object database storing a plurality of object records associated with stored digital objects, wherein each of the object records includes information facilitating the decryption of an encrypted one of the unique encryption keys used to encrypt a stored digital object associated with the object record from a from a security module (e.g. a hardware security module) of the customer.

In yet another particular embodiment, the client interface is further operative to receive the first digital object by receiving a plurality of chunks of the first digital object via the transfer encoding chunked mechanism of HTTP and to receive a trailer following receipt of a final chunk of the plurality of chunks, where the trailer specifies a checksum associated with the first digital object.

In still another particular embodiment, the object storage system further includes an object database storing a plurality of object records associated with stored digital objects. Additionally, the upload service is further operative to store the first encryption key in the object database such that the first encryption key is associated with the first digital object, and store the second encryption key in the object database such that the second encryption key is associated with the second digital object. In a more particular embodiment, the object storage system further comprises a download service operative to receive a request to download the first encrypted digital object from a requesting client device associated with the customer, fetch the first encryption key from the object database in response to the request to access the first encrypted digital object, decrypt the first encrypted digital object using the first encryption key, and serve the first digital object to the requesting client device via the client interface.

In yet another particular embodiment, the upload service is further operative to communicate with at least one remote customer security module (CSM) associated with the customer, where the remote CSM provides key management services on behalf of the customer. In a more particular embodiment, the upload service is further operative to provide the first and the second encryption keys to the remote CSM such that the remote CSM encrypts the first and the second encryption keys, receive an encrypted first encryption key and an encrypted second encryption key from the remote CSM, and to delete the first and the second encryption keys locally. In a still more particular embodiment, the object storage system further comprising a download service operative to receive a request to download the first encrypted digital object from a requesting client device associated with the customer, obtain the first encryption key from the remote CSM in response to the request to download the first encrypted digital object, decrypt the first encrypted digital object using the first encryption key, and serve the first digital object to the requesting client device via the client interface. In another more particular embodiment, the object storage system further includes at least one customer security module (CSM) proxy associated with the customer, wherein the CSM proxy is configured to securely communicate with the remote CSM on behalf of the object storage system.

In still another particular embodiment, the key provisioning service is further operative to generate a master key unique to the customer. In a more particular embodiment, the upload service is further operative to encrypt the first encryption key using the master key, store the encrypted first encryption key in association with the first digital object, encrypt the second encryption key using the master key, and store the encrypted second encryption key in association with the second digital object.

In another more particular embodiment, the customer employs at least one remote customer security module (CSM) providing key management services on behalf of the customer, and the key provisioning service is further operative to provide the master key to the remote CSM and discard the master key locally. In an even more particular embodiment, the object storage system further includes at least one CSM proxy associated with the customer, where the CSM proxy is configured to securely communicate with the remote CSM on behalf of the object storage system.

In another even more particular embodiment, the key provisioning service is further operative to receive an encrypted master key associated with the customer from the remote CSM and store the encrypted master key in association with the customer. In a still even more particular embodiment, the upload service is further operative to receive an upload request associated with the first digital object from the client device after the master key has been discarded locally, cause the (decrypted) master key to be retrieved from the remote CSM, encrypt the first encryption key using the master key, and store the encrypted first encryption key in association with the first digital object. The master key is locally discarded again after the first encryption key is encrypted. In a still even more particular embodiment, the object storage system further comprises a download service operative to receive a request to download the first encrypted digital object from a requesting client device associated with the customer after the master key has been discarded again locally, cause the (decrypted) master key to be retrieved from the remote CSM, decrypt the encrypted first encryption key using the master key, decrypt the first encrypted digital object using the first encryption key, and serve the first digital object to the requesting client device. The master key is locally discarded again after the encrypted first encryption key is decrypted.

In another more particular embodiment, the object storage system further includes a master key cache and the object storage system is further operative to provide the encrypted master key to the remote CSM, receive the (decrypted) master key from the remote CSM, and temporarily cache the master key for a predetermined time period to service the file request and subsequent file requests. Optionally, the predetermined time period can be set by the customer.

A server for proxying communications associated with encryption keys between a cloud storage system and a customer security module (CSM) is also described. The server includes a cloud interface configured to communicate with the cloud storage system and a CSM interface configured to communicate with a CSM operating on behalf of a customer of the cloud storage system, and a CSM proxy application. The server also includes a server application operative to open a first connection facilitating communication with the cloud storage system via the cloud interface and open a second connection with the CSM via the CSM interface. The server also includes a proxy application operative to receive a request for key processing from the cloud storage system via the first connection and forward the request for key processing to the CSM via the second connection. The request for key processing is associated with the customer and with the encryption of at least one digital object stored on the cloud storage system.

In a particular embodiment, the CSM proxy application is further operative to receive a response, including the key information associated with the customer to the request, from the CSM, and forward at least the key information to the cloud storage system. In a first more particular embodiment, the request for key processing comprises a plaintext master key assigned by the cloud storage system to the customer, and the key information provided with the response comprises an encrypted master key. In a second more particular embodiment, the request for key processing comprises an encrypted master key associated with a plaintext master key assigned by the cloud storage system to the customer, and the key information provided with the response comprises the plaintext master key. In a third more particular embodiment, the request for key processing comprises a plaintext object key used to encrypt a digital object stored on the object storage system, and the key information provided with the response comprises an encrypted object key. In a fourth more particular embodiment, the request for key processing comprises an encrypted object key associated with a plaintext object key used to encrypt the stored digital object, and the key information provided with the response comprises the plaintext object key.

In another particular embodiment, the first connection comprises a private network connection, and the second connection is established using a Java security process facilitating communication with the CSM.

In still another particular embodiment, the first connection comprises an HTTPS connection, and the second connection comprises a private network connection with the CSM via a private network of the customer.

Thus, as will be described herein, the object storage systems include means for providing a plurality of unique encryption keys for a plurality of object uploads. The object stores also include means for receiving a series of objects uploaded from one or more clients of a customer, for encrypting each of the series of objects using one of the plurality of unique encryption keys, and for causing each of the series of encrypted digital objects to be stored.

BRIEF DESCRIPTION OF THE DRAWINGS

The present invention is described with reference to the following drawings, wherein like reference numbers denote substantially similar elements:

FIGS. 10A-10B show an exemplary workgroups table stored in the object database of FIG. 3 according to an embodiment of the invention;

FIGS. 13A-13E show flowcharts summarizing exemplary methods related to master key encryption according to the present invention;

DETAILED DESCRIPTION

The present invention overcomes the problems associated with the prior art, by providing an object storage infrastructure with better data security and protection, with reduced latency, with the ability to upload large files or files of unknown size, and with improved storage efficiency and flexibility. In the following description, numerous specific details are set forth (e.g. particular data structures, etc.) in order to provide a thorough understanding of the invention. Those skilled in the art will recognize, however, that the invention may be practiced apart from these specific details. In other instances, details of well-known cloud computing practices and components (e.g., particular encryption and decryption routines, etc.) have been omitted, so as not to unnecessarily obscure the present invention.

Figure 1:
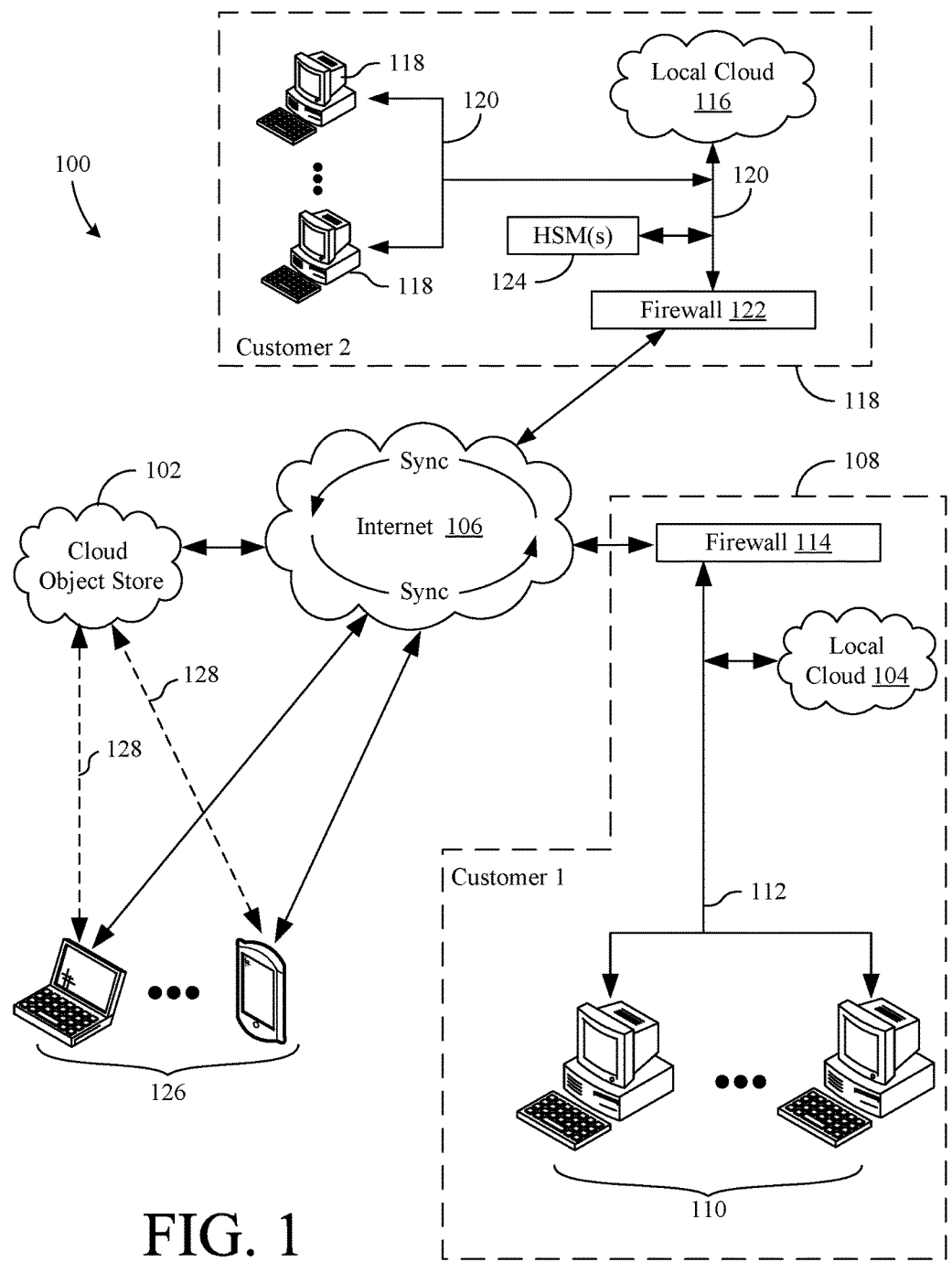
FIG. 1 shows an exemplary cloud computing system 100 according to the invention.

FIG. 1 shows a cloud computing system 100 that includes a cloud object store (a remote cloud) 102 and a local cloud 104, which communicate and are synchronized via the Internet 106. Local cloud 104 can be hosted, for example, by a file server in an office of a first customer 108, and is, therefore, sometimes referred to as an office local cloud (OLC). A local file system (e.g., namespace and file data) stored on local cloud 104 is synchronized with cloud object store 102 to provide local and remote data access and remote data security. In this embodiment, at least a portion of the local file system stored on local cloud 104 is bi-directionally synchronized with cloud object store 102. Although one-way synchronization of all or portions of the local and remote file systems is also possible. Local users of first customer 108 can access local file system objects stored on local cloud 104 via local clients 110, which are devices in communication with local cloud 104 via a local network 112. Devices on local network 112 are protected from unwanted access over Internet 106 by a firewall 114. Additionally, where a customer has multiple offices and multiple local file systems, each local file system can be synchronized with cloud object store 102.

FIG. 1 further shows that a local file system stored on a local cloud 116 of a second customer 118 is also synchronized with cloud object store 102 via the Internet 106. Local clients 120 of second customer 118 can access the local file system stored on local cloud 116 via a local network 120, which is protected by a firewall 122. Unlike first customer 108, second customer 118 also operates one or more security module(s) 124, which are coupled to its local network 120. In this example, security module(s) 124 comprise hardware security module(s) (HSMs), which safeguard and manage digital keys for strong authentication and cryptographic processing, as will be discussed in more detail below. However, software based security modules might also be employed.

Thus, cloud object store 102 maintains remote (cloud) file systems for first customer 108, second customer 118, and others. These remote file systems include the synchronized portions of the local file systems stored on local clouds 104 and 116 as described above, as well as, optional cloud-only file systems for each customer that are accessible via cloud object store 102 only. Remote users associated with first and second customers 108 and 118 can access their respective remote file systems on cloud 102 via remote client devices 126 either over Internet 106 or via some other connections 128 (e.g., customized client applications and APIs).

Cloud object store 102 is a multi-entity object store and, therefore, these entities will be described herein as "customers" or "subscribers" of the cloud service provider operating cloud object store 102. However, the terms "subscriber" and "customer" should be interpreted expansively to include any entity that uses the cloud services described herein, whether or not something of value (e.g., money) is exchanged for those cloud services.

Figure 2:
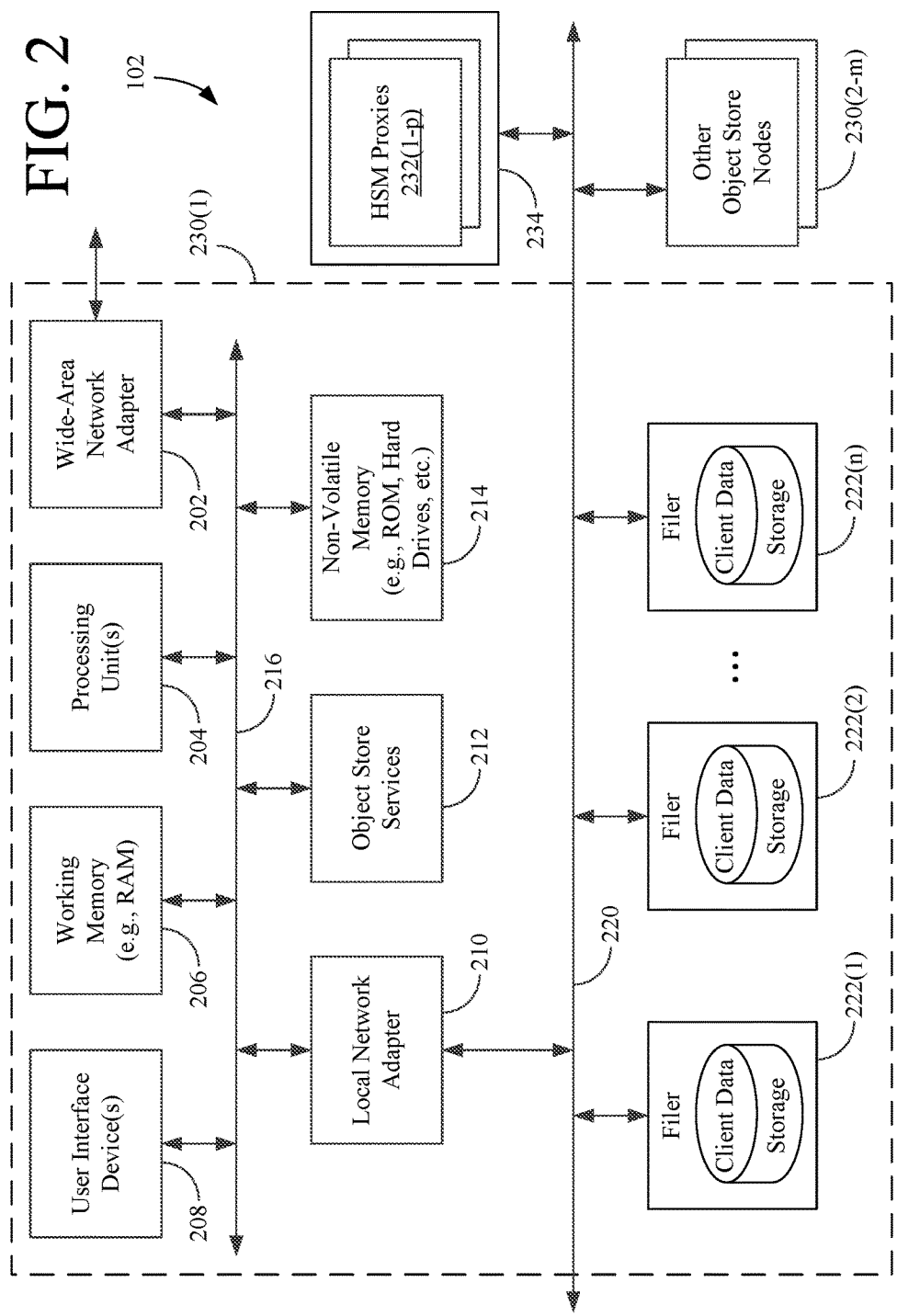
FIG. 2 is a block diagram showing the cloud object store of FIG. 1 in greater detail.

FIG. 2 is a block diagram showing cloud object store 102 in greater detail, according to one embodiment of the invention. Object store 102 includes a wide-area network adapter 202, one or more processing units 204, working memory 206, one or more user interface devices 208, a local network adapter 210, object store services 212, and non-volatile memory 214, all of which intercommunicate via an internal bus 216. Processing units(s) 204 impart functionality to object store 102 by executing code stored in any or all of non-volatile memory 214, working memory 206, and object store services 212. Object store services 212 represent hardware, software, firmware, or some combination thereof, that provides the object storage and encryption services described herein.

Wide area network adapter 202 provides a means for object store 102 to communicate with remote clients 126 and with local clouds 104 and 116 via Internet 106. Wide area network adapter 202 can also facilitate communications over other connections 128 (e.g., in the case of a cellular network, etc.). Local network adapter 210 provides a means for accessing a plurality of data storage devices 222(1-$n$), via a local private network 220. Clients' file system objects are stored in data storage devices 222(1-$n$) (hereinafter called "filers") and are retrieved therefrom as needed. Additional filers 222($n$+) can also be added as needed to provide additional storage capacity. In this example embodiment, filers 222 include network attached storage (NAS) devices, but any suitable type of storage device can be used.

The components shown within the dashed border define an object store node 230(1) in this embodiment. Cloud object store 102 can optionally include other object store nodes 230(2-$m$) that are also coupled to private network 220. Additionally, in some embodiments, a plurality of object store nodes 230(1-$m$) can share a pool of filers 222(1-$n$).

As will be elaborated on below, aspects of the present invention provide improved encryption key management services, which in some embodiments are facilitated by one or more HSM proxies 232(1-$p$), which can optionally be deployed on an isolated (e.g., firewalled) HSM proxy network 234 portion of private network 220, which can have restricted access to only those services and components of cloud object store 102 that require access.

Figure 3:
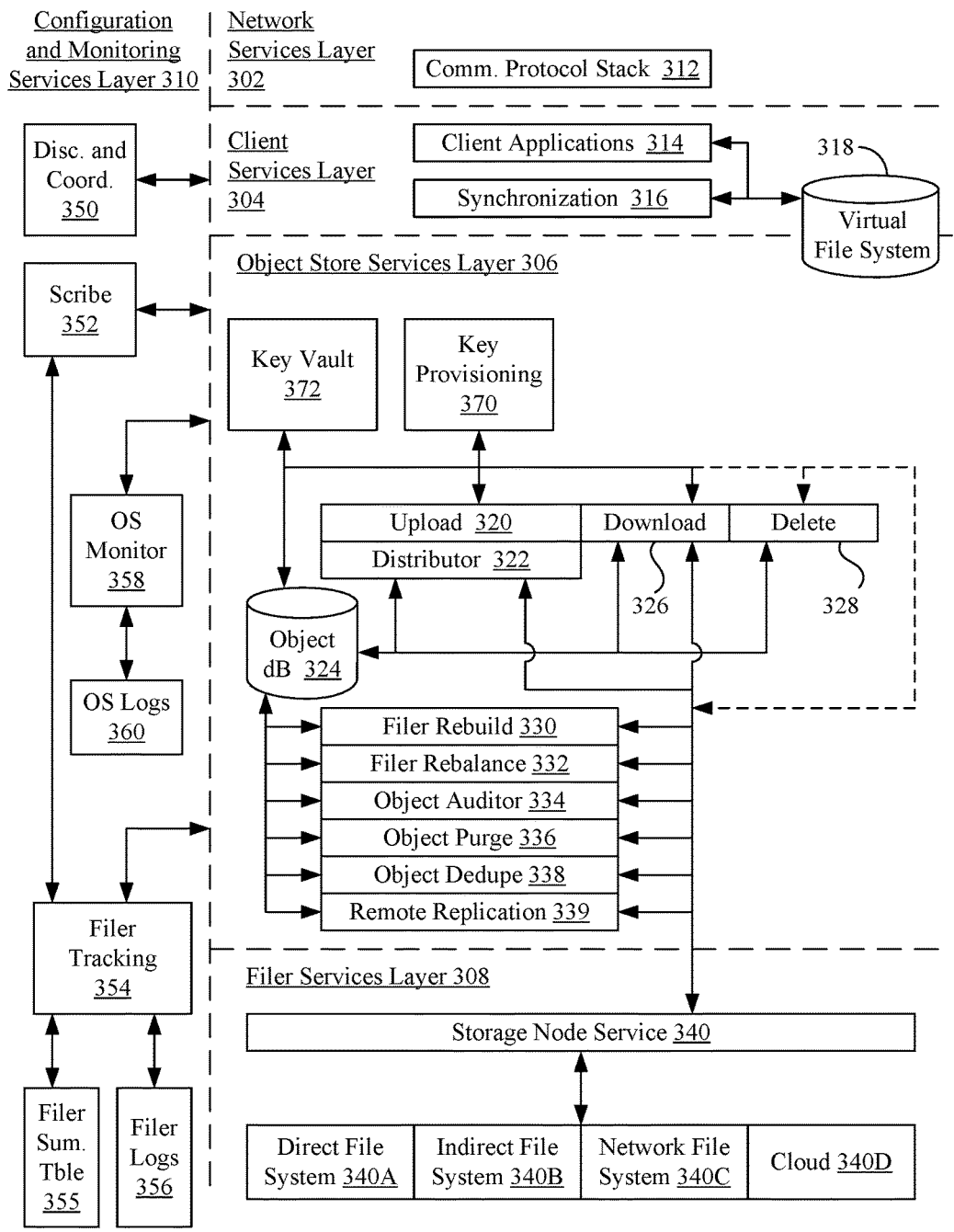
FIG. 3 is a block diagram showing the operational layers of the cloud object store of FIG. 1 in greater detail.

FIG. 3 is a block diagram showing the operational layers of object store 102 in greater detail. Such operational layers include a network services layer 302, a client services layer 304, an object store services layer 306, a filer services layer 308, and a configuration and monitoring services layer 310. In some embodiments, each object store node 230(1-$m$) includes all the operational layers shown. In other embodiments, the operational layers can be distributed across different object store nodes 230(1-$m$) as desired. Additionally, some communication paths are shown in FIG. 3 to aide in an understanding of the invention. However, it should be understood that other communication pathways will exist so the components and services can accomplish their desired functions, even if not explicitly shown.

Network services layer 302 includes protocols and services that facilitate communications between cloud object store 102 and other entities via WAN adapter 202 and local network adapter 210. For example, network services layer 302 facilitates communications between cloud object store 102 and local clouds 104 and 116, and between object store 102 and remote clients 126 via Internet 106 and/or other connections 128. Additionally, network services layer 302 facilitates communications between cloud object store 102 and those other entities (e.g., HSM proxies 232(1-p), etc.) coupled to private network 220. In the present embodiment, network services layer 302 includes one or more communications protocol stack(s) 312, comprising the various desired protocols that facilitate the intercommunication of the services and components discussed herein. Communications protocol stack(s) 312 can include such protocols such as HTTPS, TCP/IP, Samba, etc. as is known in the art. Network services layer 302 also provides communication endpoints on cloud storage system 102, which enable file system objects (e.g., digital files) to be uploaded to, and downloaded, from storage system 102.

Client services layer 304 includes client applications 314 and a synchronization (sync) service 316. Client applications 314 permit each client device (e.g., remote client 126, local cloud, etc.) to log into object store 102 (e.g., by providing a username and password, undergoing an Identity Provider (IDP) security process, certificate exchange, etc.) and to interface with an associated virtual file system defined by records stored in a virtual file system (VFS) database 318. Accordingly, object store 102 can associate the authenticated client device with a particular customer's workgroup (domain). Client applications 314 allow the client device to provide commands to cloud object store 102 for modifying its associated virtual file system, including uploading objects to objet store 102, downloading objects from objet store 102, and deleting objects from object store 102. Sync service 316 synchronizes the customer's remote file system on object store 102 with its associated local file system on local cloud 104.

Object store services layer 306 includes a set of services that provide the object storage functionality of object store 102 as well as other cloud maintenance services. Object store services layer 306 includes an upload service 320 and distributor service 322 that cause a digital object (e.g., a file) to be uploaded to object store 102. Responsive to an upload request from a client application 314 of client services layer 304, upload service 320 causes an object to be received from client services layer 304, encrypted using any of various key services described below, stored (replicated) on a plurality of filers 222(1-n), and a new object record to be created in an object database 324.

A call to upload service 320 also causes distributor service 322 to utilize information from the configuration and monitoring services layer 310 (e.g., a filer summary table 355, etc.) to identify a set of available filers 222(1-n), which it provides to upload service 320. Upload service 320 selects a plurality (r) of filers 222 from the set of available filers 222 returned by distributor service 322, and streams the uploaded object to each of the selected (r) filers 222, encrypting the object and calculating checksums inline. The object can optionally be streamed to two or more of the selected (r) filers 222 concurrently. If one of the selected filers 222 returns an error (e.g., object already exists), then upload service 320 selects a new filer 222 and writes a replica of the object to that filer 222 instead. The upload service 320 records filer identifiers for the (r) selected filers 222 in an object-filer map (FIG. 5B) stored in object database 324.

Object store services layer 306 also includes a download service 326 that causes an object to be retrieved from one of filers 222 at the request of one of remote clients 126 and/or local clouds 104 and 116. In response to a download request from a client application 314 of client services layer 304, download service 326 uses the information contained in the download request (e.g., a unique object identifier) and the object-filer map in object database 324 to identify the filers 222 storing the associated object, retrieves the object, decrypts the object according to any of the various key services described below, and serves the object to the client application 314 requesting it.

Object store services layer 306 further includes a delete service 328 that causes objects to be marked for deletion in the virtual file system of VFS database 318 responsive to requests from a client application 314 of client services layer 304. Delete service 328 can also modify record(s) in object database 324 to indicate that a particular object has been marked for deletion.

Object store services layer 306 includes other cloud services as well. For example, layer 306 includes a filer rebuild service 330, which enables a partially or fully failed filer 222 to be recovered. Object store services layer 306 also includes a filer rebalance service 332, which manages and adjusts the distribution of data stored on each of the filers 222(1-n). Layer 306 also includes an object auditor service 334, which verifies the integrity of objects stored on filers 222(1-n), and an object purge service 336 that purges objects from filers 222(1-n) that have been marked for deletion. An object deduplication ("dedupe") service 338 and a remote replication service 339 are also shown in object store services layer 306, both of which will be described in more detail below.

Filer services layer 308 shows services associated with filers 222(1-n). In the present embodiment, each filer 222 (1-n) includes a storage node service 340 running thereon, which fronts one or more mass data store(s). More specifically, each storage node service 340 comprises a web server (e.g., Apache Tomcat™, etc.) that exposes an HTTP interface. As such, storage node service 340 responds to PUT object, GET object, and DELETE object requests received from the various services of object store services layer 306. Each storage node service 340 can also facilitate encryption and decryption of objects inline as they are being received or served, compression and decompression of objects as they are being received or served, etc. Multiple iterations of storage node service 340 can also be executing concurrently for each filer 222(1-n).

Storage node service 340 provides an interface to various filer mass data stores. Mass data stores are shown representationally in FIG. 3 and can be any mass data storage device, including a direct file system 340A, an indirect file system 340B, and a network file system 340C. Mass data store can even be another private or public cloud having a cloud file system 340D. Direct file system 340A can comprise any of, for example, XFS, Puppy Linux (2FS), B-tree File System (Btrfs), or Fourth Extended File System (EXT4) storing data on a D-RAID of JBOD device 322 using an ISCSI or Fibre Channel Over Ethernet (FCoE) protocol. An indirect file system 340B can comprise XFS storing data on a mapped RAID or JBOD device (e.g., using DM-LVM protocol). A network file system 340C can include Sun's Network File System storing data on a data center produced, for example, by EMC Corporation. Cloud file system 340D can include, for example, Amazon S3™, Microsoft Azure, Google Cloud Storage, etc. The invention, therefore, provides an important advantage in that objects can be persisted in a variety of different mass storage devices, and even private and public clouds.

Configuration and Monitoring Services (CMS) Layer 310 includes services that coordinate and monitor the services provided in the other layers of object store 102. CMS layer 310 includes a discovery and coordination service 350, a scribe service 352, a filer tracking service 354, and an object store monitoring service 356. The services of layer 310 can communicate with the services of the other layers of FIG. 3 as desired to carry out their functions.

The services of CMS layer 310 provide the following functions. Discovery and coordination service 350 ensures the services of object store 102 can discover and interact with one another. For example, discovery and coordination service 350 discovers and manages the network configurations of the various elements and/or services communicating on private network 220. Discovery and coordination service 350 can also create a register of network configurations so that the network configuration of one cloud element/service can be shared with the other cloud elements/services. In a particular embodiment, discovery and coordination service 350 manages a framework of common URL interfaces between elements (e.g., filers 222(1-n), object store nodes 230(1-m), elements on proxy network 234 such as HSM proxies 232(1-p), etc.) and services of cloud object store 102. Discovery and coordination service 350 can also provide notifications indicating whether elements and/or services are on-line or off-line (e.g., via Ping tests, etc.) and/or when elements and/or services change their network configuration (e.g., changing from read-write to read-only status and vice-versa, etc.). Discovery and coordination service 350 also facilitates the scalability of object store 102. For example, service 350 ensures that any expansions of object store 102 (e.g., adding a new filer 222, adding a new object database 324, etc.) are properly configured. Service 350 can also perform test runs on the expansions before the expansions are brought online. Discovery service 350 can be implemented using, for example, Apache Zookeeper™.

Scribe service 352 records any important messages generated by the services of layers 302, 304, 306, 308, and 310. For example, scribe service 352 can log error messages generated by the upload service 320, download service 326, and delete service 328. Additionally, scribe service 352 can log messages for use by other services. For example, scribe service 352 can log object creation information (e.g., object size, full object path, pre-encryption checksum, etc.) for an uploaded object, which can be used to initiate other services (e.g., object dedupe service 338, object replication service 339, etc.

Filer tracking service 354 tracks the activity of filers 222(1-n) and updates the filer records of a filer summary table 355 accordingly. Filer tracking service 354 can also implement a ping and/or latency test that pings storage node services 340 to determine that the filers 222(1-n) are on-line and/or to determine their latencies for hot spots. Service 354 can then use this ping and latency information to update filer summary table 355. Filer tracking service 354 also generates filer logs 356. Filer logs 356 include statistics about filers 222(1-n) that can, for example, be used by administrators of object store 102 to improve cloud services.

Object store (OS) monitoring service 358 monitors object store services and associated components of object store 102 and generates OS log files 360, which can be used by administrators of object store 102 to improve cloud services. For example, OS monitoring service 356 can monitor and log the number of calls to upload service 320, download service 326, and delete service 328 over a predetermined amount of time (e.g., daily, weekly, monthly, etc.). OS monitoring service 356 can also perform other monitoring functions (e.g., object-filer map metrics, cache statistics, etc.) as desired.

Object store 102 can include additional service layers that are not expressly shown in FIG. 3. For example, object store 102 can include caching layers as desired to promote rapid information retrieval. It would be desirable, for example, to cache filer summary table 355 such that filers 222(1-n) can be quickly accessed. As another example, caching portions of virtual file system stored in VFS database 318 would be desirable to give a remote client 126 more responsive access to its virtual file system. Caching layers can be implemented using a caching system such as Memcached (http://memcached.org).

While only single instances of the various services of FIG. 3 are shown, multiple instances of each can be running concurrently. For example, multiple iterations of upload service 320, download service 326, and delete service 328 can be running concurrently.

The following U.S. Patent Application Publications provide additional information relevant to the understanding and implementation of the present inventions in a hybrid cloud storage system, and are incorporated herein by reference, in their respective entireties:

US Pub. No. 2014/0149794 A1 (System and Method of Implementing an Object Storage Infrastructure for Cloud-Based Services) published May 29, 2014 (now U.S. Pat. No. 9,135,269 B2);

US Pub. No. 2014/0149461 A1 (Flexible Permission Management Framework for Cloud Attached File Systems) published on May 29, 2014 (now U.S. Pat. No. 9,483,491 B2); and US Pub. No. 2014/0040196 A1 (System and Method for Event-Based Synchronization of Remote and Local File Systems) published on Feb. 6, 2014.

Encryption Key Provisioning and One-Key-Per-Object Encryption

Traditionally object stores use one key per customer to encrypt all the digital objects for that customer. The downside of this approach is that a single key can decrypt all the objects for that customer, and any leakage of the key can expose all the objects for the customer. To mitigate this, the cloud object store 102 of the present invention uses a unique encryption key to encrypt each stored digital object. This reduces unwanted exposure if an encryption key is leaked or stolen. Additionally, the invention provides several ways for customers to manage encryption keys associated with their files using the customer's own security module to make sure the cloud service provider never has access to their data without their permission, which will be described below.

Returning first, however, to using one-key-per-object encryption, there are several challenges to implementing this strong encryption method. First, generating strong encryption keys (e.g., Advanced Encryption Standard (AES) 256-bit keys) is computationally expensive and difficult to accomplish synchronously for uploads, especially when multiple upload requests are being processed concurrently. Additionally, an encryption key and an initialization vector are stored for every object. (An initialization vector is a random input variable used in symmetric encryption and is a method used to add some randomness to various blocks of encrypted strings for stronger encryption. Using an initialization vector, identical encrypted blocks in the encrypted string can be avoided even if the source string has repeated plain text blocks.) Third, one-key-per-object results in every encrypted object having a different checksum, even if the pre-encrypted content is same, which will effectively disable deduplication for an object at rest because the object content will be different with every new key. Fourth, for a customer wanting to use an external hardware security module (HSM) (e.g., second customer 118) to encrypt its object keys, one-key-per-object encryption means many rounds trips to the customer's HSM (e.g., HSM 124), adding significantly to file access time.

To overcome some of these difficulties, the present invention employs a key provisioning service 370, which pre-creates and caches strong (e.g., AES-compliant, 256-bit) encryption keys in advance to be consumed by upload service(s) 320. Additionally, encryption keys are stored for each object in object database 324 in a table with strict access controls, or alternatively, in a dedicated Key Vault 372. For purposes of this disclosure, it will be assumed that object keys will be stored in object database 324. If a customer's HSM is used for key management, the invention includes deployments of HSM proxies 232(1-p), which key provisioning service 370, upload service 320, and download service 320 use to efficiently perform key processing with a customer's HSM.

Figure 4:
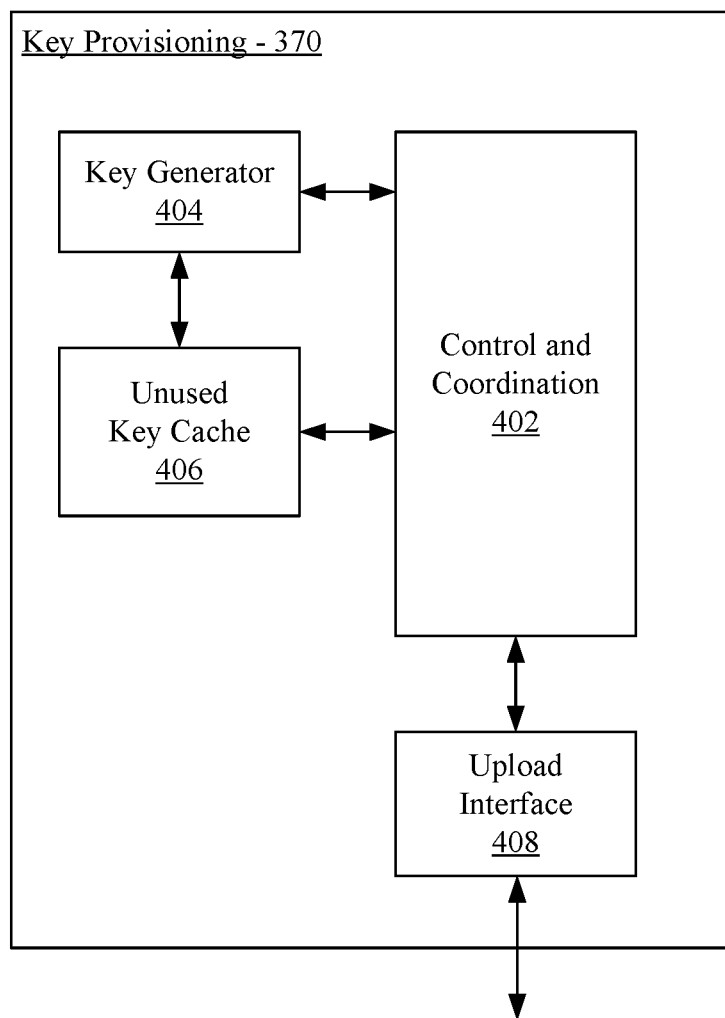
FIG. 4 the key provisioning service of FIG. 3 in greater detail according to one embodiment of the invention.

FIG. 4 shows a first embodiment of key provisioning service 370 in greater detail. Key provisioning service 370 includes a control and coordination module 402, a key generator 404, an unused key cache 406, and an upload interface 408. The key provisioning service 370 shown in FIG. 4 is a simplified version that will be expanded upon later with reference to FIG. 12.

The elements of key provisioning service 370 provide the following functions. Control and coordination module 402 provides overall coordination and control of the various modules of key provisioning service 370. Key generator 404 generates unique encryption keys and associated initialization vectors (IVs) and stores those encryption keys and IVs in unused key cache 406. In this embodiment, the keys generated by key generator 404 comply with the Advanced Encryption Standard (AES) specification and are at least 256 bits in length. Unused key cache 406 temporarily stores the encryption keys and IVs generated by key generator 404 for future consumption by upload service 320. Once a key is allotted to an object from cache 404, that key is removed from cache 406 by module 402 and is not issued to any other object. Control and coordination module 402 also monitors the number of unused keys in cache 406 and instructs key generator 404 to generate more keys when the number of keys in cache 406 gets too low (e.g., below a predetermined threshold determined by the cloud service provider).

Upload interface 408 provides an interface between upload service 320 and control and coordination module 402. Responsive to a new object being uploaded to cloud object store 102 (e.g., from a remote client 126, from a local cloud 104, etc.), upload service 320 calls key provisioning service 370 to fetch an available unique encryption key and IV for that object. Responsive to such a request, control and coordination module 402 fetches a unique key and associated IV from unused key cache 406, and provides the encryption key and IV to upload service 320 via upload interface 408. Module 402 then removes (e.g., deletes, deletes and logs, etc.) the unique encryption key and associated IV from cache 406.

Generating AES 256-bit keys is a computationally-intensive cryptographic process involving Java cryptography algorithms, including Java's SecureRandom API. Accordingly, key provisioning services 370 provides the advantage that a pool of usable encryption keys (and initialization vectors) is created that can be consumed on demand by upload service 320. Accordingly, the object store's upload processes are not delayed by the key generation process.

Figure 5A:
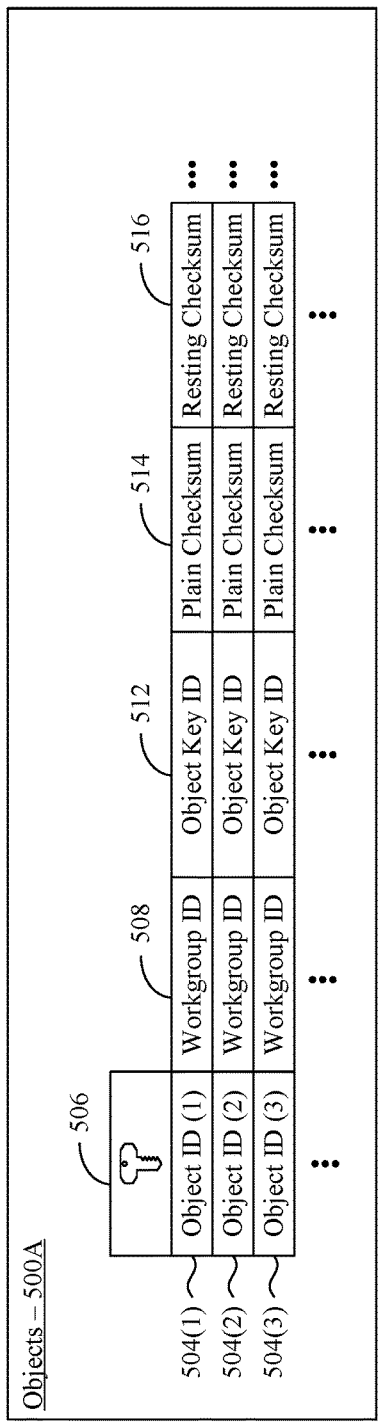
FIGS. 5A-5C show exemplary tables stored in the object database 324 of FIG. 3.
Figure 5B:
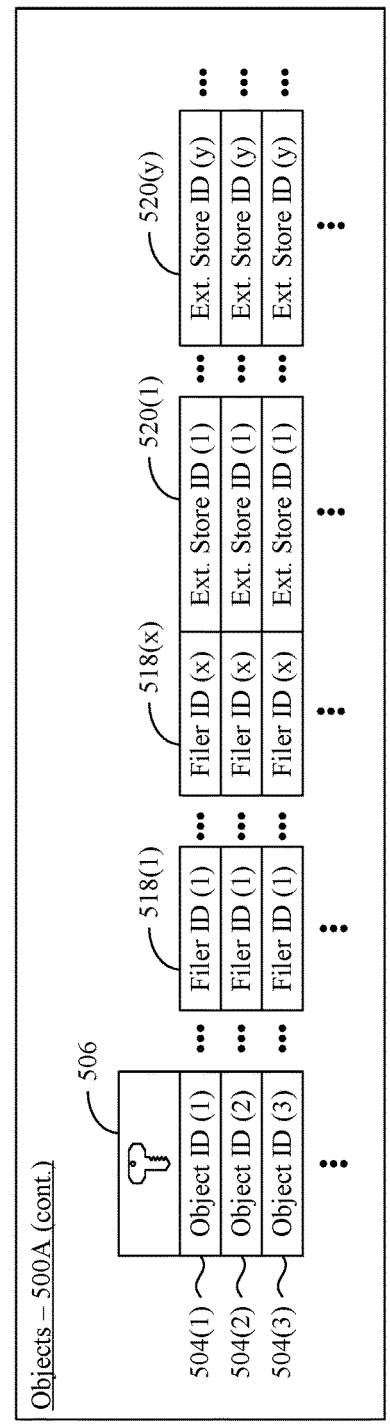
Figure 5C:
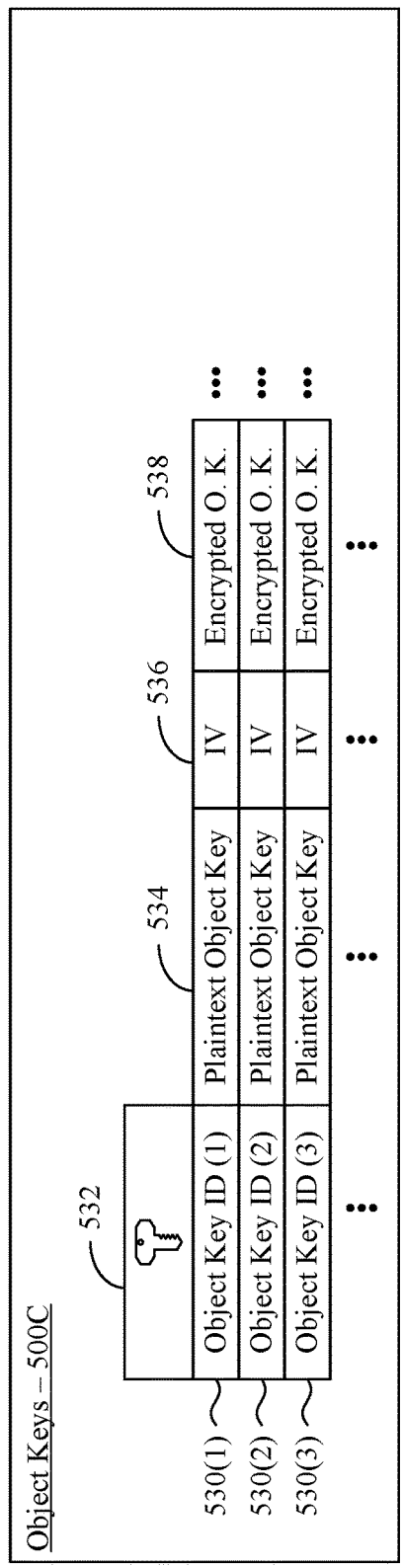

FIGS. 5A-5C show some exemplary tables stored in object database 324. FIG. 5A and FIG. 5B show respective portions of an objects table 500A containing a plurality of object records 504 (records for only three objects shown) arranged as the rows of table 500A. Each object record 504 includes an object ID field 506, a workgroup ID field 508, an object key ID field 512, a plain checksum field 514, a resting checksum field 516, a plurality of filer ID fields 518(1-x), and a plurality of external data store ID fields 520(1-y). Other fields in each object record can be included as desired. Each object record 504 in table 500A is associated with a corresponding digital object stored in cloud object store 102.

Object ID field 506 contains data uniquely identifying a particular object record associated with a stored digital object. Workgroup ID field 508 contains data uniquely identifying the workgroup domain (and accordingly the customer) associated with the object. Object key ID field 512 stores data identifying an object key record in table 500C (FIG. 5C) (or alternatively in Key Vault 372) storing the encryption key and IV used to encrypt the associated digital object. Plain checksum field 514 contains data corresponding to the checksum for the unencrypted object, whereas resting checksum field 516 contains data corresponding to the checksum of the encrypted digital object at rest. Filer ID fields 518(1-x) comprise a plurality of fields, where each field 518 includes a filer identifier uniquely identifying a particular filer 222 storing the object. Thus, filer ID fields 508(1-x) provide an object-filer map associating the object record 504 with a plurality of filers 222(1-n) storing the associated digital object. Similarly, external store ID fields 520(1-y) comprise a plurality of fields, where each field 520 includes an identifier that identifies an external storage node (e.g., other object stores instantiated at remote data centers, etc.) that an associated digital object has been replicated to. The number of filer ID fields 518 and external store ID fields 520 in an object record 504 can vary depending on the object replication policies of cloud 102, the customer, etc. Filer ID fields 508(1-x) and external storage ID fields 520(1-y) can be cross-referenced with other tables (not shown) that provide connection information for the associated filers 222 and external data stores, respectively.

FIG. 5C show portions of an Object Keys table 500C storing a plurality of object key records 530 (only three records shown) arranged as the rows of table 500C. Each object key record 530 includes an object key identifier field 532, a plaintext object key field 534, an initialization vector (IV) field 536, and an encrypted object key field 538. Object key ID field 532 stores data uniquely identifying the associated object key record 530 in table 500C. Plaintext object key field 534 stores the plaintext, unique encryption key (e.g., a 256-bit AES key) associated with the object key record 530. IV field 534 stores data (e.g., 128-bit data) representing an initialization vector associated with the object key record 530. Encrypted object key field 538 contains ciphertext representing an encrypted version of the plaintext object key (field 534) that was used to encrypt the associated digital object. Encrypted object key field 538 is utilized in some embodiments of the invention, which will be described later.

There is a one-to-one relationship between an object record 504 in table 500A and an object key record 530 in table 500C. Accordingly, a particular object key identifier 532 of an object key record 530 will be stored in the object key field 512 of only one object record 504 in table 500A. Object keys are stored in a secondary table 500C in this example embodiment, so that an object key does not need to be fetched until needed.

Because object keys table 500C stores sensitive key information, strict access controls can be placed on this table. For example, access to object keys table 500C can be limited only to cloud object store applications needing access to objects or object records 530 (e.g., upload service, download service, key provisioning service, etc.). Alternatively, as mentioned above, the object keys stored in table 500C can be stored in a private key vault 372 with strict access controls, such as KeySecure by Safenet. Accordingly, access to object keys table 500C can be controlled on a service-by-service basis within cloud object store 102.

Methods of the present invention are also described herein with reference to FIGS. 6A-6B, 11A-11B, 13A-13E, 15, and 22. For the sake of clear explanation, these methods are described with reference to particular elements of the embodiments described herein. However, it should be noted that other elements, whether explicitly described herein or created in view of the present disclosure, could be substituted for those cited without departing from the scope of the present invention. Therefore, it should be understood that the methods of the present invention are not limited to any particular elements that perform any particular functions. Furthermore, some steps of the methods presented herein need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figures 6A, 6B:
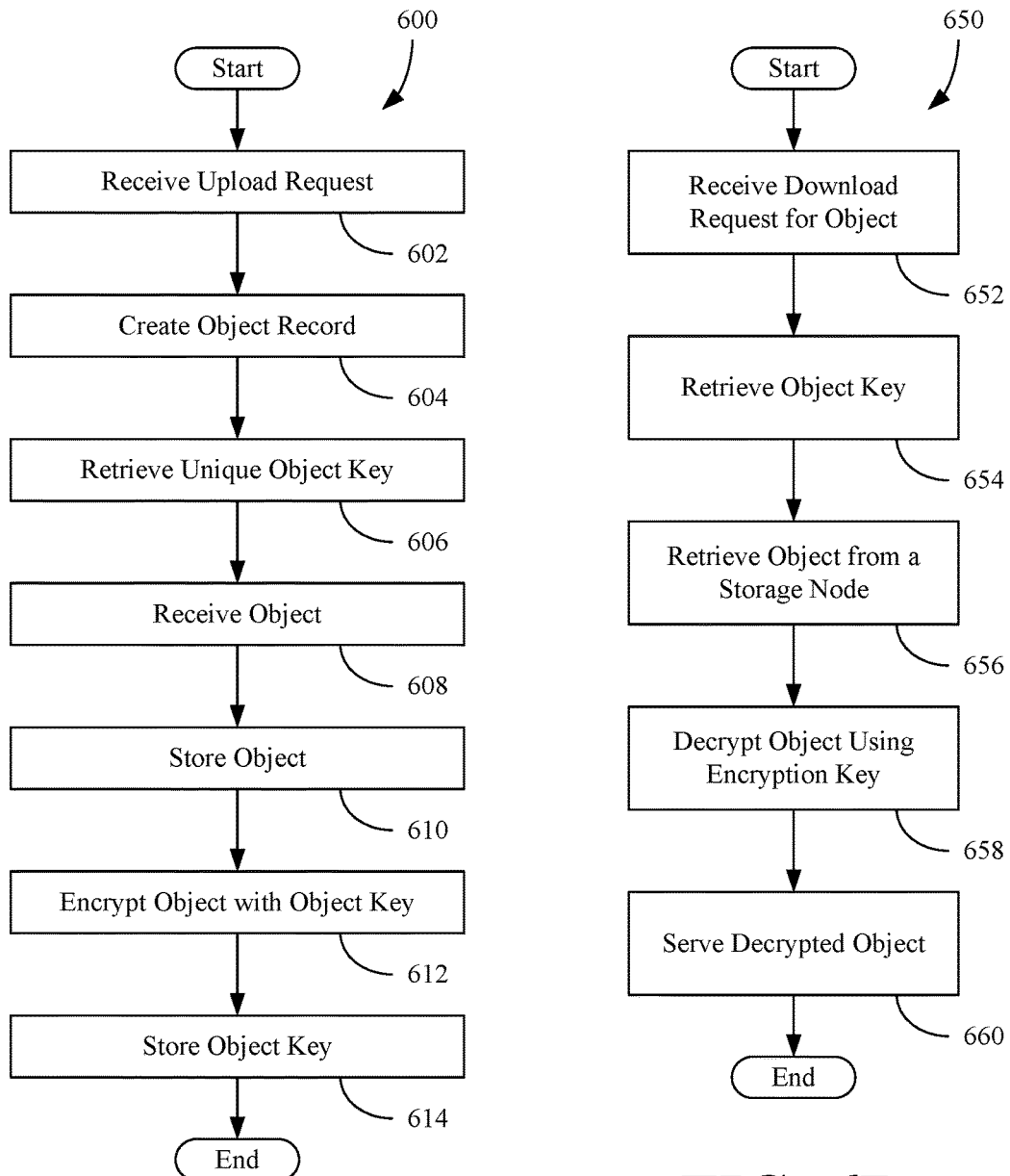
FIG. 6A is a flowchart summarizing an exemplary method for uploading and encrypting an object according to the present invention.
FIG. 6B is a flowchart summarizing an exemplary method for downloading and decrypting an object according to the present invention.

FIG. 6A is a flowchart summarizing an exemplary method 600 for uploading and encrypting an object using a unique object key according to the present invention. In a first step 602, upload service 320 (FIG. 3) receives a request to upload a new object from a client application 314 in communication with a client device. In response, in a second step 604, upload service 320 creates a new object record 504 and a new object key record 530 in object database 324. In a third step 606, upload service 320 requests a unique encryption key and IV from key provisioning service 370 via upload interface 408 and receives the encryption key and IV from service 370 in response. In a fourth step 608, upload service 320 receives the object and causes the object to be stored (optionally without staging) on a plurality of filers 222 selected to receive the object via put requests to the corresponding storage node services 340. In a sixth step 612, upload service 320 causes the object to be encrypted using the unique encryption key and associated IV received from key provisioning service 370. According to a particular method, the object can be encrypted inline as it is being streamed to each of the filers 222 as part of a Java stream object process. In a seventh step 614, upload service 320 stores the plaintext encryption key and IV in object database 324 in the plaintext object key field 534 and initialization vector field 536, respectively, of the associated object key record 530. Thus, method 600 can be used to upload each object in a series of objects associated with a customer, whereby each of the customer's digital objects is encrypted with a unique object key.

Upload service 320 also fills the other information in the object record 504 as appropriate. For example, upload service 320 records filer identifiers corresponding to the filers 222 that the object was stored on in the filer ID fields 518 of the associated object record 504. Upload service 320 can also cause pre-encryption and post-encryption checksums to be calculated for the object inline when the file is streamed to the filers 222, for example, by wrapping the Java stream object with checksum calculator(s). Upload service 320 then receives and stores the checksums in plain and resting checksum fields 514 and 516, respectively, of the associated object record 504.

FIG. 6B is a flowchart summarizing an exemplary method 650 for downloading (or otherwise accessing) and decrypting an object using a unique object key according to the present invention. In a first step 652, download service 326 (FIG. 3) receives a request to download an object from a client application 314 in communication with a client device associated with a customer. In response, in a second step 654, download service 326 accesses the object record 504 associated with the requested object in object database 324, determines the object key ID from object key ID field 512 of the object record 504, and then retrieves the plaintext object key 534 and initialization vector 536 from the corresponding object key record 530 in table 500C. Download service 326 also determines the filers 222 on which the requested object is stored using filer ID fields 518(1-*x*) in the object record 504. Accordingly, in a third step 656, download service 326 retrieves the requested object from one of filers 222 via a get request to an associated storage node service 340. In a fourth step 658, download service 326 causes the object to be decrypted using the encryption key 534 and initialization vector 536 retrieved for the object, for example, as part of an inline Java decryption routine. In a fifth step 660, download service 326 serves the decrypted object to the client application 314, which in turn serves it to the requesting client device. As will be apparent, method 650 is also used for each subsequent object download request associated with the customer.

Thus, the invention uses one-key-per-object encryption for each of a customer's stored digital objects. This limits the customer's data exposure for if a plaintext object key is leaked or stolen to the particular object in question. This is much better than the prior art, where a single key per customer was used to encrypt all the customer's digital objects stored on the cloud. Accordingly, the invention provides increased data security, particularly for customers (e.g., first customer 108, etc.) that don't utilize their own security modules.

Integration of Customer-Managed Hardware Security Modules (HSM)

Figure 7A:
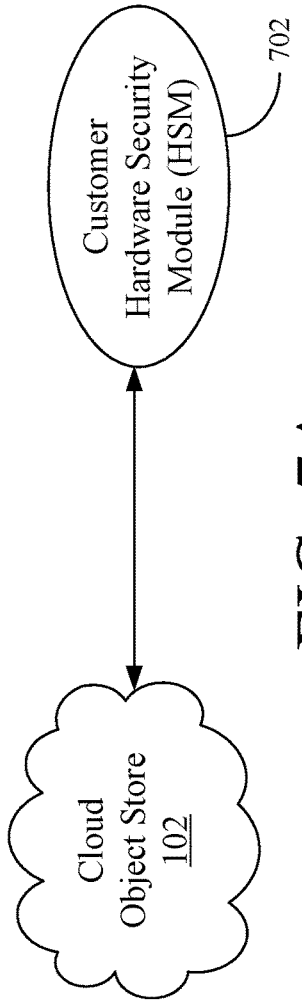
FIG. 7A shows a cloud object store interacting with a customer's hardware security module (HSM)

One-key-per-object encryption as described above provides a strong solution against key exposure, but some customers want to store and manage keys themselves and control when and who can access their data. FIG. 7A shows cloud object store 102 interacting with an HSM 702 (e.g., HSM 124) associated with a particular customer (e.g., second customer 118). An HSM 702 is a physical computing device that safeguards, creates, and manages digital keys for strong authentication and provides crypto-processing. These modules traditionally come in the form of a plug-in card or an external device that attaches directly to a computer or network server. HSMs include controls that provide tamper evidence, such as logging and alerting, and tamper resistance such as deleting keys upon tamper detection.

Figure 7B:
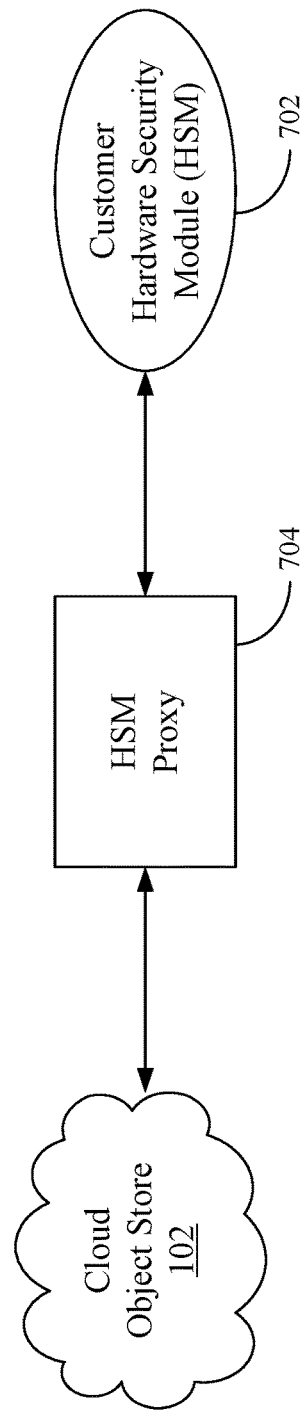
FIG. 7B shows an HSM proxy deployed to proxy communications between a cloud object store and a customer's HSM.

To handle communications with a plurality of HSMs associated with a plurality of customers, the present invention modularizes accessing components and configurations for a particular HSM in an HSM proxy 704, which is deployed between cloud object store 102 and the customer's HSM 702 as shown generally in FIG. 7B. More specifically, the customer will provision an HSM key in their HSM that is dedicated to the cloud service provider, and provide its HSM details (e.g., an identifier for the HSM key assigned to the cloud service provider, a security provider and credentials for the HSM proxy 704 to use when interacting with the HSM 702, etc.) to the cloud service provider (e.g., during service setup). The cloud service provider will accordingly deploy at least one HSM proxy 704 for that customer with the credentials and secure network connection to access the customer's HSM 702. The cloud service provider will also delegate HSM calls to the deployed customer-specific HSM proxy(ies) 704. The HSM proxies 704 of the present invention can be used with different types of existing HSMs, including (1) Microsoft Cloud Deployed Azure HSM, (2) Customer Premise deployed Safenet Luna HSMs and KeySecure HSMs, and (3) Amazon Web Service (AWS)-Deployed CloudHSM.

Figure 8:
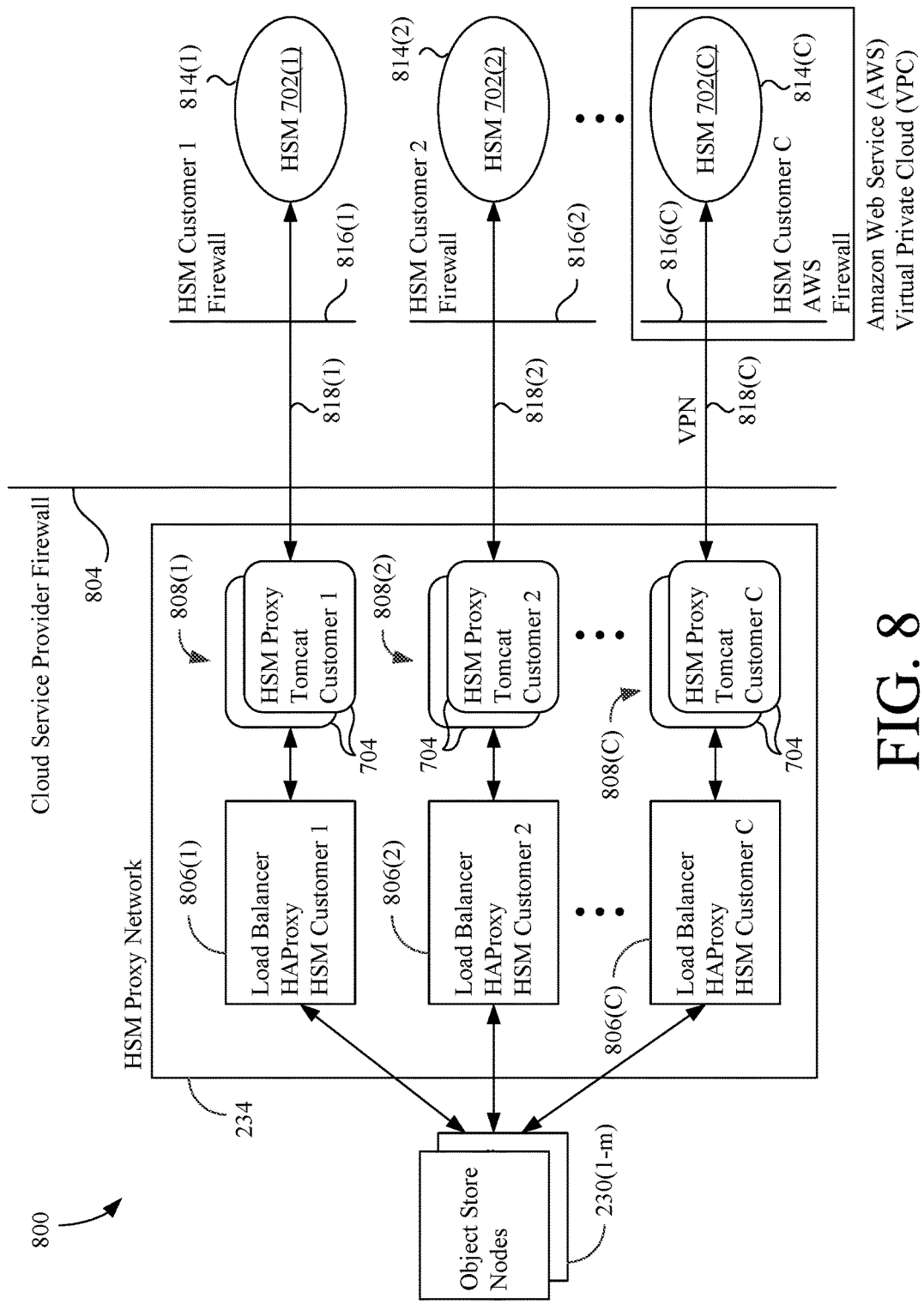
FIG. 8 is a block diagram showing an exemplary HSM proxy deployment according to one embodiment of the present invention.

FIG. 8 is a block diagram showing an exemplary HSM proxy deployment 800 according to the present invention. FIG. 8 shows a plurality of object store nodes 230(1-m) of cloud object store 102 accessing HSM proxy network 234 of the cloud service provider, which for security reasons is located behind a cloud service provider firewall 804 and only accessible to those components of object store nodes 230(1-m) that might need access to encryption keys. As shown, HSM proxy network 234 includes a plurality of load balancers 806(1-C) and a plurality of pools 808(1-C) of HSM proxies 704. Each pool of HSM proxies 808(1-C) can include one or more HSM proxies 704, but in the present embodiment, each pool 808(1-C) includes a plurality of HSM proxies 704 for failover handling of requests from an associated one of load balancers 806(1-C).

Each HSM proxy 704 in a particular pool 808 is in communication with an associated load balancer 806 and with the same HSM 702 of a particular HSM customer 814. For example, each HSM proxy 704 of pool 808(1) is configured to communicate with load balancer 806(1) and an HSM 702(1) (e.g., HSM 124 of FIG. 1, etc.) of a first HSM customer 814(1) (e.g., customer 118, etc.). Similarly, each HSM proxy 704 of pool 808(2) is configured to communicate with load balancer 806(2) and with an HSM 702(2) of a second HSM customer 814(2). This is so for all HSMs associated with customers, ending with final customer 814 (C), where each HSM proxy 704 of set 808(C) is configured to communicate with load balancer 806(C) and HSM 702 (C). Deployment 800 provides the advantage that additional load balancers 806 and pools 808 of HSM proxies 704 can be readily added as new HSM customers 814 establish accounts with the cloud service provider.

Each of load balancers 806(1-C) receives requests for key processing (e.g., requests to encrypt a plaintext key, requests to decrypt a ciphertext key, etc.) from various services (e.g., upload service 320, download service 326, etc.) of object store nodes 230(1-m) via secure private network connections therebetween. Each load balancer 806 then distributes those requests among its associated pool 808 of HSM proxies 704 via secure private network connections established therebetween. Each of load balancers also receives responses from its associated pool 808 of HSM proxies 704 and forwards those responses to the appropriate object store nodes 230 (1-m). Thus, load balancers 806(1-C) proxy traffic between object store nodes 230(1-m) and the respective pools 808 (1-C) of HSM proxies 704.

In the current embodiment, load balancers 806(1-C) are implemented using HAProxy™ which is an open-source TCP/HTTP load-balancing proxy server supporting encrypted (e.g., Secure Sockets Layer (SSL)) communications. Additionally, each of load balancers 806 communicates with object store nodes 230(1-m) and each of its associated HSM proxies 704 via respective secure private network connections and, for example, REST APIs. Accordingly, it will be understood that each load balancer 806 can establish pluralities of separate private network connections with a plurality of object store nodes 230 and a plurality of HSM proxies 704, even though only single communication paths are shown for simplicity.

Each HSM proxy 704 receives the requests for key processing from object store nodes 230(1-m) via its associated load balancer 806, optionally caches those requests, and forwards those requests to its assigned HSM 702 via a secure connection 818 established therewith. Similarly, each HSM proxy 704 receives responses with key information (e.g., a requested ciphertext key, a requested plaintext key, etc.) from its assigned HSM 702, optionally caches those responses, and forwards those responses to its associated load balancer 806. The number of HSM proxies 704 included in a particular pool 808 can vary depending on the amount of traffic between object store nodes 230(1-m) and a particular customer's HSM 702. In the present embodiment, each HSM proxy 704 instance is deployed on an HTTP web server, such as Apache Tomcat™.

As mentioned above, HSMs are extremely security sensitive components and need special configuration and attention in deployment. Accordingly, the connection between each HSM proxy 704 and its associated HSM 702 over Internet is extremely secure. For example, in a particular embodiment, each HSM proxy 704 communicates with its associated HSM 702 via a secure TCP connection over Internet 106. Additionally, for each HSM proxy 704 of pool 808(1), HSM customer 814(1) opens a firewall port and adds complex rules to its firewall 816(1) that allow only the desired traffic through firewall 816(1) between the associated HSM proxy 704 and HSM 702(1). Similarly, HSM customer 814(2) opens firewall ports and adds complex firewall rules through its firewall 816(2) for secure connections 818(2) between HSM proxies 704 of pool 808(2) and its HSM 702(2). In contrast, customer 814(C) is associated with a Virtual Private Cloud (VPC) implemented by Amazon Web Services (AWS). Accordingly, each HSM proxy 704 associated with set 808(C) is secured by a virtual private network (VPN) connection 818 over Internet 106. Thus, each HSM proxy 704 is deployed with access to an isolated and protected customer network (e.g., a DMZ of the customer) with access to the customer HSM 702.

Furthermore, to provide secure access and communications between an HSM proxy 704 and a specific HSM 702, each HSM proxy 704 is configured with a security provider customized to the specific HSM 702. In the present embodiment, the security provider is implemented in a Java Development Kit (JDK) environment and is configured with specific protocols and routines that enable the HSM proxy 704 to translate calls for key processing from object store nodes 230(1-m) into appropriate HSM calls, and similarly, to translate HSM responses into responses appropriate for HSM proxy 704 and object store nodes 230(1-m). In other words, the security provider ensures that the Java cryptographic libraries and routines can be utilized in communications between the HSM proxy 704 and the specific HSM 702. The security provider can also be configured with credentials (e.g., a public and private key pair, etc.) provided by the customer that allow the HSM proxy 704 to authenticate with the customer's HSM 702. For the above reasons, the same security provider cannot be used to communicate across different HSMs 702.

A security provider will be provided by the customer for each HSM proxy 704 upon service setup (e.g., when the customer decides it wants to use an HSM proxy deployment). Provisioning a security provider for an HSM is a well-known process for the IT staff of an HSM owner or for an HSM vendor, and therefore, will not be discussed in further detail.

As seen above with respect to FIG. 8, to integrate with an HSM Proxy 704 located on the cloud provider side, an HSM customer 814 either sets up a VPN connection 818(C) between their network and the object store's network or opens up access to their HSM instance (e.g., a Luna instance from Safenet) by opening up a firewall port and adding complex firewall rules to secure the port, as represented by connections 818(1-2).

Figure 9:
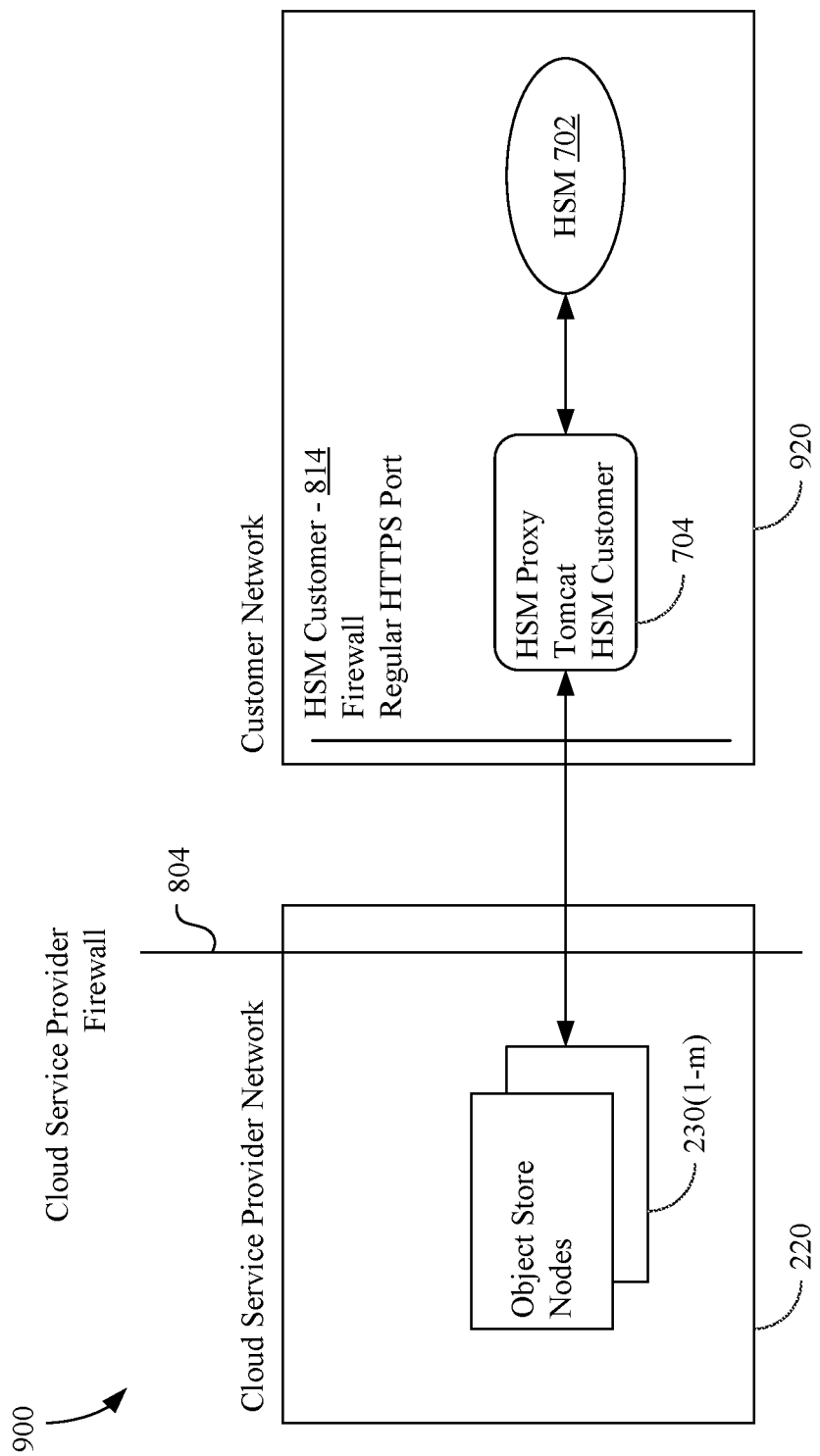
FIG. 9 is a block diagram showing an exemplary HSM proxy deployment according to a second embodiment of the present invention.

Because the deployments 800 in FIG. 8 can be complex, the invention also facilitates deploying an HSM proxy 704 on the customer's network 920 as shown in FIG. 9. As in FIG. 8, HSM proxy 704 shown in FIG. 9 is an internet protocol (IP) component of the object store service provider, but instead is deployed on the customer's premises (e.g., in the customer's DMZ) with a Java security provider credentialed to access to the customer's HSM 702 over a secured private network connection. In the implementation of FIG. 9, HSM proxy 704 exposes a REST interface to key management with object store nodes 230(1-m) over HTTPS and is also protected by Client and Server CA Signed HTTPS certificate-based authentication with cloud object store nodes 230(1-m). This eliminates the need for complex network setup and security controls between object store nodes 230(1-m) and HSM 702, because protecting and securing an HTTPS service between object store nodes 230(1-m) and HSM proxy 704 on the customer's premises, is significantly easier than opening up firewall ports and defining firewall rules at the customer as in FIG. 8. Additionally, although not shown, a pool of HSM proxies 704, optionally operating behind a load balancer, can be deployed on the customer's premises.

FIGS. 10A-10B show an exemplary Workgroups table 1000A, which is also stored in object database 324, according to an embodiment of the invention. Workgroups table 1000A contains a plurality of workgroup records 1002 (records for only three workgroups shown) arranged as the rows of table 1000A. Each record 1002 includes a workgroup ID field 1004, a customer information field 1006, one or more HSM proxy ID fields 1008(1-z), a load balancer ID field 1010, an encrypted master key field 1012, an HSM key ID field 1013, a time-to-live (TTL) field 1014, and a security level field 1016. Other fields in each workgroup record 1002 can be included as desired.

Workgroup ID field 1004 contains data uniquely identifying a workgroup (domain) of a customer of cloud object store 102 and, therefore, each workgroup record 1002 is associated with a customer of cloud object store 102. Customer information field 1006 includes data representing some desirable information (e.g., name, etc.) about the customer. HSM proxy ID fields 1008(1-z) comprise a plurality of fields, where each field 1008 identifies an HSM proxy 704 that is assigned to the workgroup (customer). Thus, HSM proxy fields ID 1008(1-z) provide a customer-to-HSM-proxy map, which can be used to obtain connection information for a particular HSM proxy 704 and facilitate communication therewith. Similarly, load balancer ID field 1010 includes data identifying a load balancer 806 that is associated with the pool of HSM proxies 704 associated with fields 1008(1-z). Thus, load balancer field 1010 also provides a customer-to-load-balancer map, which can be used to obtain connection information for an object store node 230 to communicate with the load balancer 806 assigned to a particular workgroup. If a particular workgroup is not associated with an HSM, then HSM proxy ID fields 1008 and load balancer ID field 1010 can contain NULL values or be omitted.

Encrypted master key field 1012 stores data defining an encrypted master key associated with the workgroup (customer). HSM key ID field 1013 contains a key identifier associated with an HSM key assigned to the cloud service provider on the associated customer's HSM 702. TTL field 1014 stores data defining a predetermined time period for storing a plaintext (decrypted) master key associated with the workgroup. Security level field 1016 includes data indicating what level of encryption security (e.g., one-key-per-object only (FIGS. 6A-6B), an encrypted object key for each object encrypted by the customer's HSM (FIGS. 11A-11B), object key encryption using a master key (FIGS. 13A-13E), etc.) is employed for objects associated with the associated workgroup. The security level can be chosen by the customer (e.g., during account setup, etc.) or by the object store provider (e.g., depending on storage plan, etc.).

Figure 10C:
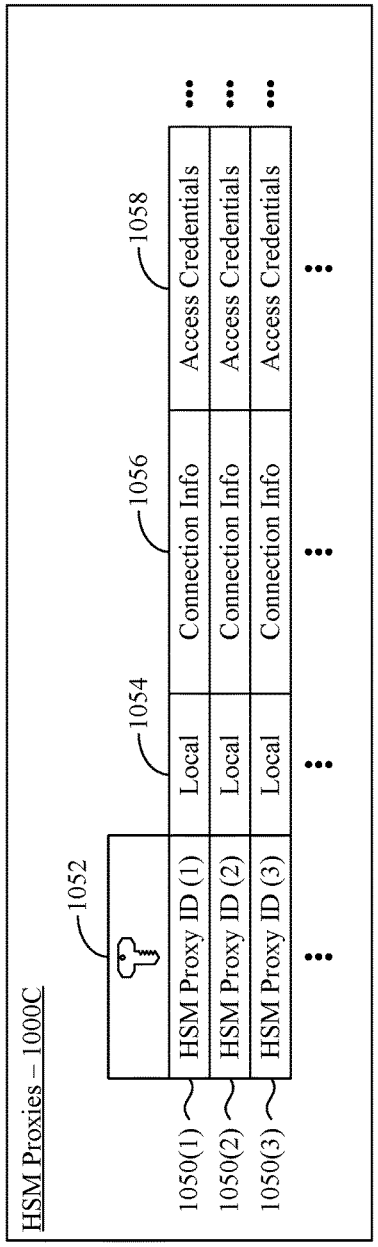
FIG. 10C shows an HSM proxies table stored in the object database of FIG. 3.

FIG. 10C shows an HSM proxies table 1000C, which is also stored in object database 324. HSM proxies table 1000C contains a plurality of HSM proxy records 1050 (records for only three HSM proxies are shown) arranged as the rows of table 1000C. Each HSM proxy record 1050 includes a HSM proxy ID field 1052, a local field 1054, a connection information field 1056, and an access credentials field 1058. HSM proxy ID field 1052 contains data uniquely identifying an HSM proxy record 1050, which is associated with a deployed HSM proxy 704. Local field 1054 includes data (e.g., a flag) indicating whether the HSM proxy 704 is deployed on the local HSM proxy network 234 on cloud object store 102, or if the HSM proxy 704 is deployed remotely at the customer's HSM location. Connection information field 1056 includes connection information (e.g., URL, IP address, port, etc.) for facilitating network communication with the associated HSM proxy 704. Access credentials field 1058 includes data representing access credentials (e.g., a digital certificate, etc.) for establishing a connection with the HSM proxy, which may or may not be required depending on the implementation.

Figure 10D:
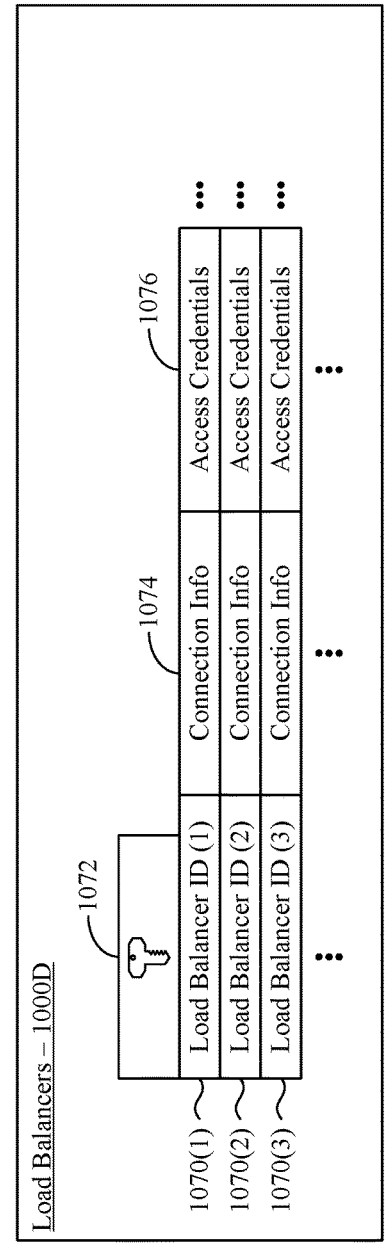
FIG. 10D shows a load balancers table stored in the object database of FIG. 3.

FIG. 10D shows a load balancer table 1000D, which is also stored in object database 324. Load balancer table 1000D contains a plurality of load balancer records 1070 (records for only three load balancers are shown) arranged as the rows of table 1000D. Each load balancer record 1070 includes a load balancer ID field 1072, a connection information field 1074, and an access credentials field 1076. Load balancer ID field 1072 contains data uniquely identifying a load balancer record 1070, which is associated with a deployed load balancer 806. Connection information field 1074 includes connection information (e.g., URL, IP address, port, etc.) for facilitating network communication with the associated load balancer 806. Access credentials field 1076 includes data representing access credentials (e.g., a digital certificate, etc.) for establishing a connection with the load balancer 806, which may or may not be required depending on implementation.

An object record 504 (FIGS. 5A-5B) can be readily associated with a workgroup in table 1000A using the workgroup identifier in field 508 of the object record 504. Once the workgroup is identified, a corresponding load balancer 806 and/or any of a pool of HSM proxies 704 can be readily identified via fields 1008(1-z) and 1010. Tables 1000C and 1000D accordingly provide communication and access parameters for load balancers 806 and HSM proxies 704. Tables 1000A-D are exemplary in nature, however, and can be readily modified depending on a desired implementation.

Encrypting Object Keys Using a Customer-Managed HSM

Figure 11A:
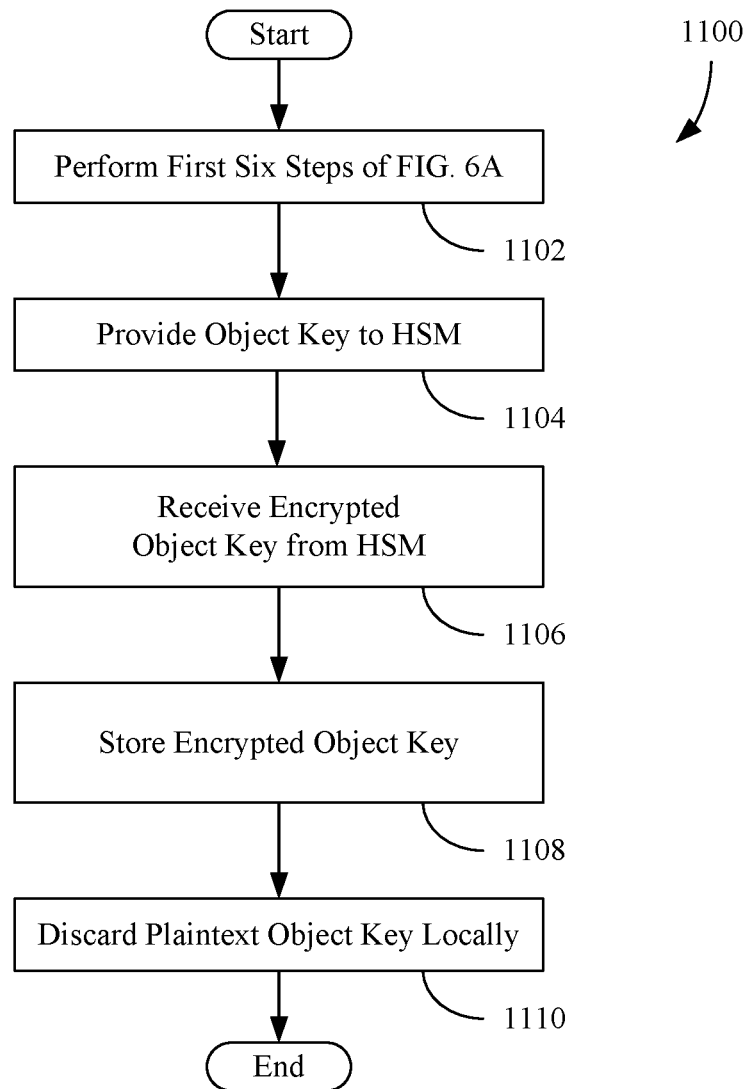
FIG. 11A is a flowchart summarizing a method for uploading an object when object keys are encrypted using a customer-managed HSM.
Figure 11B:
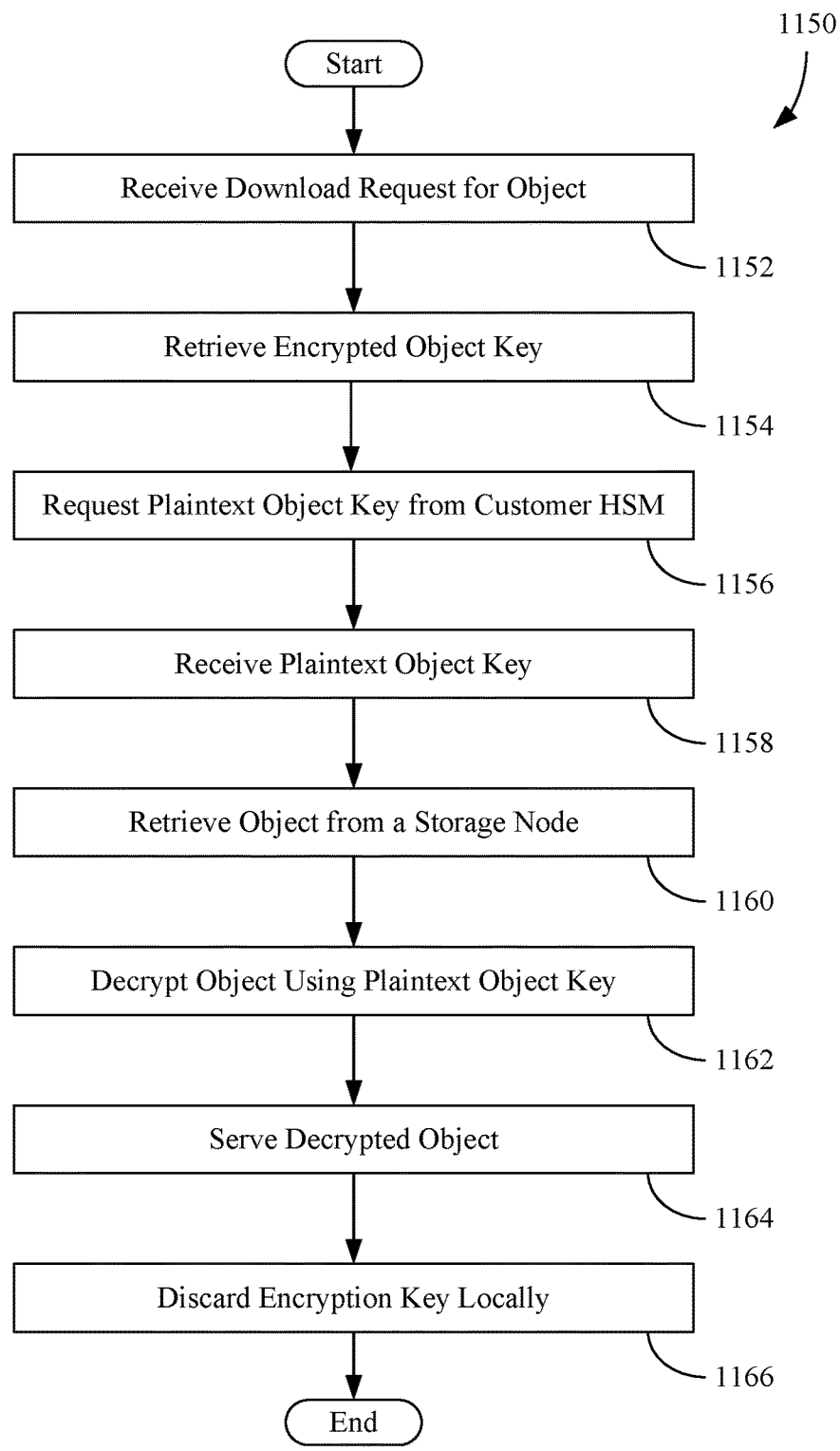
FIG. 11B is a flowchart summarizing a method for downloading an object when encrypted object keys are decrypted using a customer-managed HSM.

FIGS. 11A and 11B are flowcharts summarizing methods for uploading and downloading digital objects to and from cloud object store 102 when using one-key-per-object encryption and when the plaintext object keys are stored in a customer-managed HSM 702. Accordingly, a series of digital objects can be uploaded by performing the method of FIG. 11A a plurality of times. Similarly, a series of digital objects can be downloaded by performing the method of FIG. 11B a plurality of times.

FIG. 11A is a flowchart summarizing a method 1100 for uploading an object to cloud object store 102, encrypting that object with a unique object key, and then encrypting the unique object key using a customer-managed HSM 702. In a first step 1102, upload service 320 (FIG. 3) performs the first six steps of method 600 of FIG. 6A. In a second step 1104, upload service 320 provides the plaintext object key to the customer's HSM 702 by making a request for key processing to an HSM proxy 704 associated with the customer. The request for key processing includes the plaintext object key, the HSM key ID 1013 for the customer, and a request for the HSM 702 to encrypt the plaintext object key. In the case of the deployment 800 in FIG. 8, upload service 320 provides the request for key processing to an associated load balancer 806, which forwards the request to a connected HSM proxy 704. The receiving HSM proxy 704 in turn forwards the request for key processing, including the plaintext object key, to the customer's HSM 702. In the case of the deployment 900 shown in FIG. 9, upload service 320 determines an HSM proxy 704 deployed on the customer's premises and forwards the request for key processing, including the plaintext object key, to the HSM proxy 704, which in turn provides the request to HSM 702.

After receiving the request for key processing, HSM 702 encrypts the plaintext object key with one of its own HSM keys corresponding to HSM key ID 1013 to generate an encrypted object key, and returns the encrypted object key to the associated HSM proxy 704. The HSM 702 does not store (discards) the plaintext object key. The key management and encryption functions of HSM 702 are well-known cryptographic processes commonly performed by HSMs, and therefore, will not be described in detail.

Subsequently, in a third step 1106, upload service 320 receives a response from HSM 702 including the encrypted object key, via HSM proxy 704 (and optionally load balancer 806 in the case of deployment 800). Then, in a fourth step 1108, upload service 320 stores the encrypted object key in encrypted object key field 538 of the associated object key record 530. In a fifth step 1110, upload service 320 discards (permanently deletes) the plaintext object key, including from plaintext object field if the object key was temporarily stored there. Thus, according to method 1100, only an encrypted object key is stored in object database 324. This enables the customer to tightly control access to the encrypted object stored on cloud object store 102, because it controls the HSM key needed for decryption in its HSM 702.

FIG. 11B is a flowchart summarizing a method 1150 for retrieving a plaintext object key from a customer-managed HSM 702 and decrypting an object therewith according to the invention. In a first step 1152, download service 326 (FIG. 3) receives a request to download an object from object store 102 from a client application 314 in communication with a client device associated with a workgroup (customer). In response, in a second step 1154, download service 326 identifies the object record 504 associated with the requested object and retrieves an encrypted object key for the object from encrypted object key field 538 and the HSM key ID from HSM key ID field 1013. In a third step 1156, download service 326 generates a request for key processing, including the encrypted object key, the HSM key ID, and a request to decrypt the encrypted object key. In the case of deployment 800 (FIG. 8), download service 326 forwards the request for key processing, including the encrypted object key, to the associated load balancer 806, which in turn forwards the request to a connected HSM proxy 704. HSM proxy 704 in turn forwards the request, including encrypted object key, to the customer's HSM 702. Alternatively, in the case of the deployment 900 (FIG. 9), download service 326 determines an HSM proxy 704 deployed on the customer's premises and forwards a request for the plaintext object key, including the HSM key ID and encrypted object key, for the HSM 702 to return the associated plaintext object key.

After receiving the request, encrypted object key, and HSM key ID, the HSM 702 decrypts the encrypted object key using its own internal key that corresponds with the provided HSM key ID and then returns the plaintext object key to HSM proxy 704. Such HSM key processes are well-known functions of HSMs and, therefore, will not be described in detail.

In a fourth step 1158, HSM proxy 704 receives the plaintext object key and forwards it to download service 326, which in some deployments occurs via load balancer 806. In a fifth step 1160, download service 326 retrieves the requested object from one of filers 222, causes the object to be decrypted using the plaintext object key and IV (field 536) in a sixth step 1162, and serves the decrypted object to the requesting client device in a seventh step 1164. In an eighth step 1166, download service 326 discards (permanently deletes) the plaintext version of the object key locally on cloud object store 102.

The above-described embodiments and methods of the present invention thus provide better security in that each object is encrypted with a unique object key. Additionally, the above-described embodiments and methods further provide the advantage that plaintext object keys are encrypted using a customer-managed HSM 702. However, according to this implementation, each object upload and each object download will have to make a call to the customer-managed HSM, which can result in slow access to objects, but is also the most secure approach.

One-Key-Per-Object Encrypted Using a Master Key Per Customer

In this implementation, a cloud master key is issued by the cloud service provider per customer. For example, cloud object store 102 generates one master key per workgroup (customer) when the customer's account is established or when an existing customer decides it wants to use the master key encryption services described herein. Additionally, the cloud service provider will deploy one or more HSM proxies 704 for the customer with the credentials provided by the customer and associated network setup as discussed previously with respect to either of FIGS. 8 and 9 and configure the customer's account to delegate all HSM calls to the customer-specific deployed HSM proxy(ies) 704. The HSM customer 814 will also provision an associated HSM key in its HSM 702 that is dedicated to cloud object store 102 as discussed above, and provide an associated HSM key ID to cloud object store 102, which will be stored in HSM key ID field 1013. Subsequently, cloud object store 102 provides its plaintext master key and HSM key ID 1013 to the customer-managed HSM 702, which encrypts the cloud's master key using its HSM key that corresponds to the HSM key ID 1013, and then provides the encrypted master key back to cloud object store 102. Thereafter, cloud object store 102 stores the encrypted master key in object database 324 at the workgroup (customer) level in field 1012.

After a master key is provisioned by cloud object store 102, each digital object associated with the particular workgroup is encrypted using a unique object key as discussed above. However, instead of storing the plaintext object key for each object directly in the object database 324, the plaintext object key for each object is itself encrypted using the plaintext master key assigned to the customer. (The plaintext master key may first have to be fetched from a customer's HSM 702 using the encrypted master key). The encrypted object key is then stored in object database 324 in encrypted object key field 538 of the associated object key record 530.

Thus, a unique key per object is still used, but the cloud-assigned master key is the same for all objects and is one per customer. When a request is made to download an object, the object store first fetches the plaintext master key from the customer-managed HSM 702 (or in some cases a local temporary cache), decrypts the object key stored in the object database 324 for the desired object using the plaintext master key, and then decrypts the object using the plaintext object key.

In the case of upload or download, the plaintext master key is either (1) deleted right away after the object key is encrypted or decrypted, or (2) is temporarily stored for a predetermined amount of time (time-to-live, TTL 1014) set by the customer in a secure cache (e.g., in secure Java memory) on cloud object store 102. Use of the master key makes it impossible for any process of the cloud service provider to decrypt an object without first fetching the plaintext master key from the customer's HSM 702. However, in the case that the customer allows the plaintext master key to be cached on the cloud object store for a predetermined time period, the master key implementation reduces the number of calls to the customer's HSM 702 and, thus, significantly improves the latency of object operations on cloud object store 102 over encrypting each object key using the customer's HSM (FIGS. 11A-11B).

Figure 12:
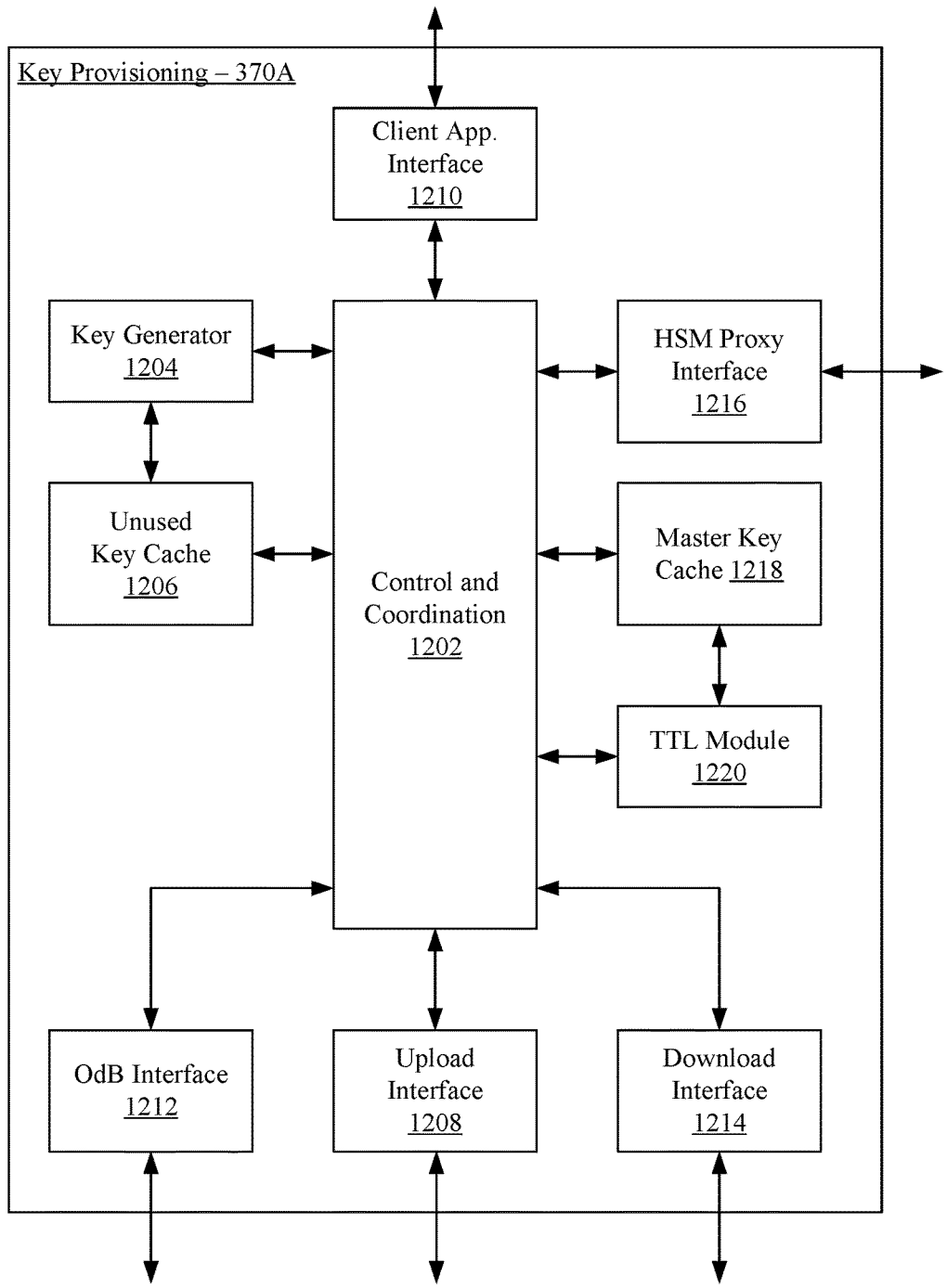
FIG. 12 is a block diagram showing the key provisioning service of FIG. 3 according to an alternative embodiment of the present invention.

FIG. 12 is a block diagram showing an alternative key provisioning service 370A having expanded functionality related to key provisioning and management. Key provisioning service 370A includes a control and coordination module 1202, a key generator 1204, an unused key cache 1206, and an upload interface 1208. Key generator 1204, unused key cache 1206, and upload interface 1208 provide the same functionality as key generator 404, unused key cache 406, and upload interface 408, respectively, and therefore, their functionality will not be described again in detail except as it relates to the new functions of key provisioning service 370A. Key provisioning service 370A also includes a client application interface 1210, an object database (OdB) interface 1212, a download interface 1214, an HSM proxy interface 1216, a plaintext master key cache 1218, and a TTL module 1220.

Control and coordination module 1202 provides the same functions as module 1202, but also facilitates the master key services described herein. For example, control and coordination module 1202 provisions a plaintext master key (e.g., from unused key cache 1206) for each customer (new or existing) that wants to use the master key services described herein. In a particular embodiment, a customer can choose which of the encryption key services described herein it wants to use via one of client applications 314. The customer's selection can then be provided to key provisioning service 370A via client application interface 1210. In response, key provisioning service 370A can update the security level field 1016 of the associated workgroup record 1002 via an OdB interface 1212 and issue plaintext master keys as needed. Accordingly, OdB interface 1212 provides an interface (e.g., an API) between control and coordination module 1202 and object database 324 (and optionally key vault 372).

Control and coordination module 1202 is also operative to provide, via an HSM proxy interface 1216, each newly-issued plaintext master key to a customer's HSM 702 for encryption by the customer's HSM 702 using the HSM's key. Additionally, module 1202 is operative to receive each encrypted master key from the customer's HSM 702 via HSM proxy interface 1216 and store the encrypted master key in object database 324 via OdB interface 1212.

Furthermore, control and coordination module 1202 can retrieve encrypted master keys from workgroup records 1002 as needed via OdB interface 1212. For example, in some embodiments, module 1202 can do so in response to requests from upload service 320 and download service 326 received via upload interface 1208 and download interface 1214, respectively. (Download interface 1214 provides an interface between download service 326 and control and coordination module 1202.) In such embodiments, control and coordination module 1202 is operative provide an encrypted master key and HSM key ID to a customer's HSM 702 and receive the plaintext master key from the HSM 702 in response. Control and coordination module 1202 can thereafter provide the plaintext master key to the requesting upload service 320 and/or download service 326, and optionally, temporarily store the plaintext master key in plaintext master key cache 1218 according to the associated customer's TTL policy 1014.

As an aside, in an alternative embodiment, each of upload service 320 and download service 326 can be configured to themselves retrieve encrypted master keys and HSM key IDs from object database 324 directly, send the encrypted master key and HSM key IDs to the appropriate HSM 702, and receive the plaintext master key in response. In this case, upload service 320 and download service 326 can also be configured to cache the plaintext master key themselves in master key cache 1218.

Plaintext master key cache 1218 provides temporary storage for plaintext master keys for use in cloud object store 102. In a particular embodiment, master key cache 1218 associates workgroups (customers), plaintext master keys, a timestamp associated with when a plaintext master key was placed in the cache, and optionally a TTL parameter 1014. Accordingly, control and coordination module 1202 can advantageously attempt to retrieve a plaintext master key from cache 1218 before requesting a plaintext master key for the customer from the customer's HSM 702.

TTL module 1220 is operative to monitor the plaintext master keys stored in cache 1218 and monitor the amount of time that each plaintext master key has been cached. If the time period that the plaintext master key has been cached exceeds the time limit set in the associated customer's TTL policy 1014, then TTL module 1220 permanently deletes the plaintext master key from cache 1218.

FIGS. 13A-13E show flowcharts summarizing exemplary methods for performing the master key encryption services of the present invention.

FIG. 13A is a flowchart summarizing a method 1300 for provisioning a master key to an HSM customer 814. In a first step 1302, control and coordination module 1202 receives an indication of a customer (new or existing) via client application interface 1210 that desires to use the master key services provided by the invention for securing their cloud file system. As part of step 1302, module 1202 can also receive (optionally via HSM proxy interface 1216) an HSM key ID associated with an HSM key assigned to cloud service provider in the customer's HSM 702 and/or a time-to-live (TTL) parameter from the customer, specifying the amount of time that a plaintext master key assigned to the customer can be cached on cloud object store 102. If so, control and coordination module 1202 stores the HSM key ID and the TTL parameter in HSM key ID field 1013 and TTL field 1014, respectively, of the customer's workgroup record 1002. If the customer does not want its plaintext master key cached on cloud object store 102 at all, then TTL field 1014 can contain a value (e.g., null) indicating this preference.

In a second step 1304, control and coordination module 1202 provisions a new master key by retrieving a unique key (e.g., an AES 256-bit key) from unused key cache 1206. In an optional third step 1306, where the master key is for an existing customer (workgroup), control and coordination module 1202 (via Odb interface 1212) encrypts the existing plaintext object keys 534 associated with the customer's objects and stores those the encrypted object keys in fields 538 of their associated object records 504, and thereafter deletes their plaintext object keys 534. In a fourth step 1308, control and coordination module 1202 provides the plaintext master key, HSM key ID, and request to encrypt the plaintext master key to the HSM 702 of customer 814 via an HSM proxy 704 and, in some deployments, via a load balancer 806. Module 1202 accomplishes this via HSM proxy interface 1216 and the associated customer-to-load-balancer and/or customer-to-HSM-proxy maps defined by the workgroup, load balancer, and HSM proxy records (FIGS. 10A-10D) in object database 324, which can be accessed via OdB interface 1212. Thereafter, in a fifth step 1310, module 1202 receives the encrypted master key from HSM 704 via HSM proxy interface 1216, and in a sixth step 1312, stores the associated encrypted master key in field 1012 of the associated workgroup record 1002. Once the encrypted master key is received, then in a seventh step 1314, module 1202 discards (permanently deletes) the plaintext master key locally.

Figure 13B:
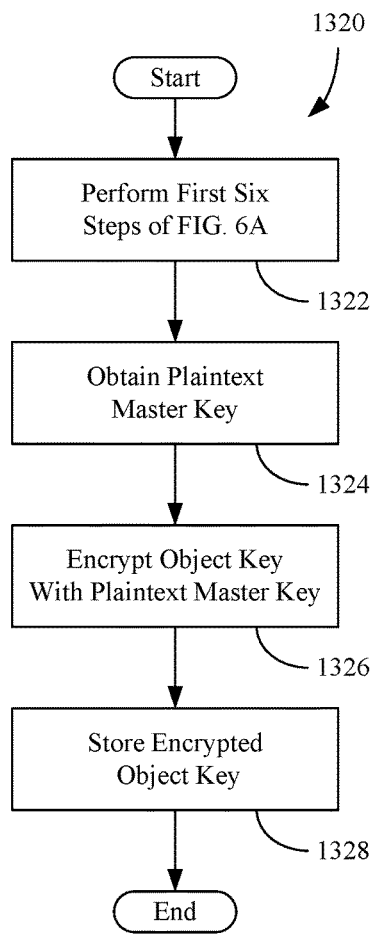

FIG. 13B is a flowchart summarizing an exemplary method 1320 for uploading an object to cloud object store 102 when the associated customer employs master key encryption. A first step 1322 of method 1318 comprises performing the first six steps of method 600 of FIG. 6A. This involves upload service 320 fetching a new object key for the object from key provisioning service 370A, creating an object record for the object, storing the object, and encrypting the stored object using the object key. In a second step 1324, upload service 320 requests the plaintext master key for the customer that is associated with the object upload from key provisioning service 370A, which returns the plaintext master key to upload service 320 as will be explained in more detail in FIG. 13D. Then in a third step 1326, upload service 320 encrypts the object key used to encrypt the uploaded object using the plaintext master key. In a fourth step 1328, upload service 320 stores the encrypted object key in encrypted object key record 538 of the associated object record 530. However, upload service 320 does not store the plaintext version of the object key in field 534 of the object record 530. Additionally, although not shown, upload service 320 can store an initialization vector associated with the master key-object key encryption in the object key record 530 should an initialization vector be utilized by the encryption algorithm. Upload service 320 then discards (deletes) any copy of the plaintext master key it created, but leaving the plaintext master key in master key cache 1218.

Figure 13C:
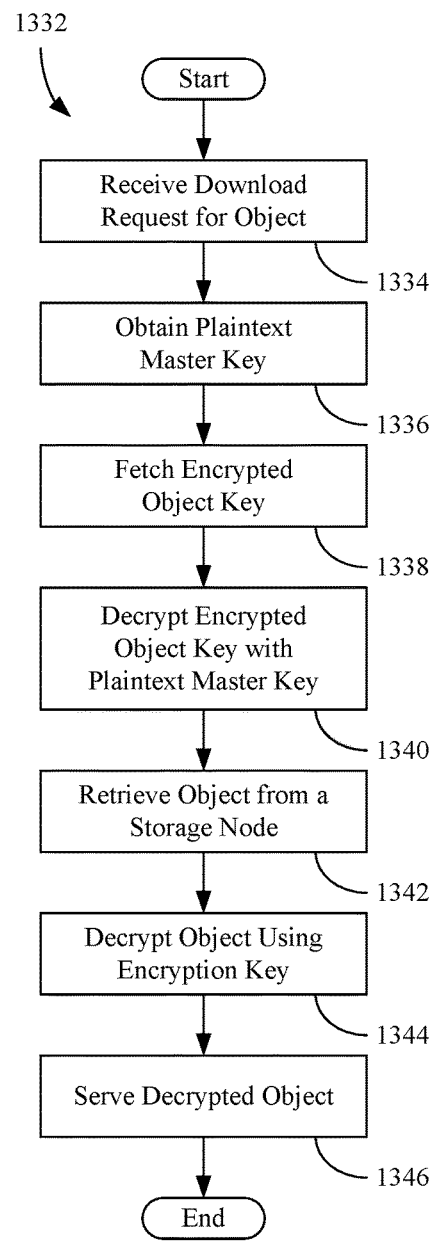

FIG. 13C is a flowchart summarizing an exemplary method 1332 for an object download process when the customer uses master key encryption. In a first step 1334, download service 326 receives a request to download an object from object store 102 from a client application 314. In a second step 1336, download service 326 requests the plaintext master key for the workgroup associated with the object to be downloaded from key provisioning service 370A, which returns the plaintext master key. In a third step 1338, download service 326 accesses the object record 504 associated with the requested object in object database 324, obtains the encrypted object key ID from field 512 of the object record 504, and then retrieves the encrypted object key 538 (and optionally an initialization vector used during object key encryption) for the object. In a fourth step 1340, download service 320 decrypts the encrypted object key using the plaintext master key to obtain the plaintext object key. In a fifth step 1342, download service 326 determines the filers 222 on which the requested object is stored and retrieves the requested object from one of filers 222. In a sixth step 1344, download service 326 causes the object to be decrypted using the initialization vector 536 retrieved for the object and the plaintext object key. Then, in a seventh step 1346, download service 326 serves the decrypted object to the requesting client device via a client application 314 and discards (deletes) the plaintext object key without storing it in object database 324.

Figure 13D:
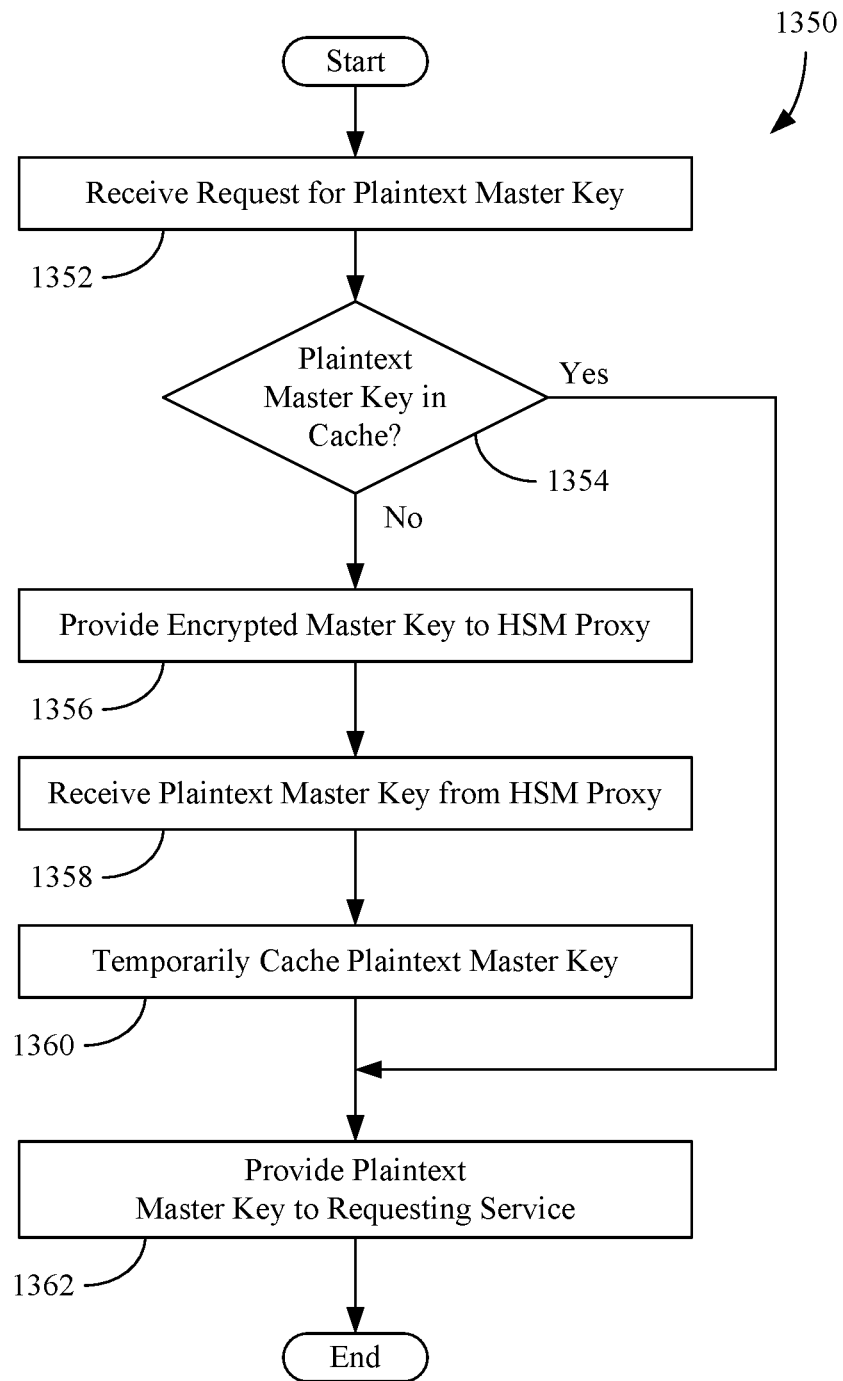

FIG. 13D is a flowchart summarizing a method 1350 for performing steps 1324 and 1336 (obtain plaintext master key) of FIGS. 13B and 13C, respectively. In a first step 1352, control and coordination module 1202 receives a request for a plaintext master key associated with a customer (workgroup) from upload service 320 or download service 326. In response, in a second step 1354, module 1202 determines if the requested plaintext master key is cached in plaintext master key cache 1218, which associates workgroup identifiers and plaintext master keys. If the key is not cached, then in a third step 1356, control and coordination module 1202 fetches the encrypted master key for the customer and associated HSM key ID from the encrypted master key field 1012 and HSM key ID field 1013 of the associated workgroup record 1002 in object database 326 and provides the encrypted master key and HSM key ID to an HSM proxy 704 associated with the workgroup along with a request to decrypt the encrypted master key.

HSM proxy 704 will then provide the request, including encrypted master key and HSM key ID, to its assigned HSM 702, receive the plaintext master key from the HSM 702 in response, and forward the plaintext master key to control and coordination module 1202. Thereby, in a fourth step 1358, control and coordination module 1202 receives the plaintext master key from the HSM proxy 704 (optionally via an associated load balancer 806). In a fifth step 1360, module 1202 temporarily caches the plaintext master key in master key cache 1218. Module 1202 also stores a time stamp, indicative of the time of caching, and an associated workgroup ID in conjunction with the plaintext master key. Optionally, module 1202 can also retrieve the TTL parameter in field 1014 for the customer and store it with the plaintext master key in cache 1218. In a sixth step 1362, control and coordination module 1202 provides the plaintext master key to the requesting upload service 320 or download service 326.

Step 1362 can be accomplished, for example, by providing the plaintext master key to the requesting service, which the requesting service would then delete after completion of the upload or download routine. Alternatively, module 1202 might simply provide the upload service 1220 or download service 1226 with a pointer to the plaintext key's location in master key cache 1218 for direct cache access. These and other routines are possible. Thereafter, method 1350 ends.

If in second step 1354, it is instead determined that the plaintext master key is currently stored in stored in plaintext master key cache 1218, then method 1350 proceeds to step 1362 where module 1202 provides the requesting upload service 320 or download service 326 with the plaintext master key for the customer as described above.

FIG. 13E is a flowchart summarizing an exemplary method 1370 for ensuring that Time-To-Live (TTL) storage times are observed for the plaintext master keys stored in plaintext master key cache 1218. As mentioned above, making a request to a customer HSM 702 is a very expensive operation and can add delays in serving files to the users. To mitigate this, a customer can pre-specify a Time-To-Live (TTL) parameter, which is stored in the associated TTL field 1014 of the customer's workgroup record 1002. The TTL parameter allows the object store 102 to cache the particular customer's plaintext master key in cache 1218 for the period of time specified by the TTL parameter, which reduces calls to the customer's HSM 702 and enables objects to be served to client devices faster. Master key cache 1218 is embodied in Java memory such that the keys stored therein are inaccessible to a processes external to the cloud object store's runtime. Keys in master key cache 1218 are also not persisted to any disk, database, or file.

Method 1370 is a loop process performed by TTL module 1220 that ensures the TTL requirements of all customers using master key encryption are complied with. In a first step 1372, TTL module 1220 accesses the first/next plaintext master key record in cache 1218 and identifies the associated workgroup. Then, in a second step 1374, TTL module 1220 fetches the time limit for caching the plaintext master key by accessing TTL field 1014 of the associated workgroup record 1002. If the TTL time limit has already been stored in conjunction with the plaintext master key in cache 1218, then accessing workgroup record 1002 is not necessary. In a third step 1376, TTL module 1220 determines if the plaintext master key has been in cache 1218 longer than the predetermined TTL time limit based on a comparison of the current time to the timestamp stored in conjunction with the master key. If so, then in a fourth step 1378, TTL module 1220 permanently deletes the plaintext master key from cache 1218. Then, in a fifth step 1380, TTL module 1220 determines if there is another plaintext master key record in cache 1218. If so, method 1370 returns to first step 1372, otherwise method 1370 ends, but will restart when another plaintext master key record is entered in cache 1218. If in third step 1376 it is instead determined that the plaintext master key has not exceeded the TTL time for the customer, then method 1370 proceeds to fifth step 1380, bypassing fourth step 1378.

Thus, method 1370 ensures that plaintext master keys remain in master key cache 1218 only as long as specified by the customer's predetermined TTL parameter. If the customer specifies no TTL time (e.g., a NULL value), TTL module 1220 will delete the plaintext master key immediately after the upload or download process that requested the plaintext master key completes.

It should be noted that FIGS. 12-13E illustrate the case where key provisioning service 370A obtains the plaintext master key using the associated HSM 702. This provides the advantage that fewer services need to request master keys from customer HSMs. In alternative embodiments, upload service 320 and download service 326 can fetch a plaintext master key from a customer's HSM 702 themselves, and then temporarily store the retrieved plaintext master key in cache 1218. To do so, each of upload service 320 and download service 326 can be configured to fetch the encrypted master key and HSM key ID from encrypted master key field 1012 and HSM key ID field 1013, respectively, of the associated workgroup record 1002 and provide the encrypted master key and HSM key ID to an HSM proxy 704 associated with the workgroup (optionally via a load balancer 806). HSM proxy 704 would then provide the encrypted master key and HSM key ID to its assigned HSM 702, receive the plaintext master key from the HSM 702 in response, and forward the plaintext master key to the requesting upload service 320 or download service 326, which could in turn, store it in cache 1218.

Returning again to FIG. 12 for a moment, various other desirable features and/or alternative embodiments can be implemented using key provisioning service 370A. For example, in one particular embodiment, control and coordination module 1202 is further operative to rotate the plaintext master key provided by cloud object store 102 for a particular customer. In particular, module 1202 can request the current plaintext master key from the customer's HSM 702 by providing the current encrypted master key and HSM key ID. Then, in response to receiving the current plaintext master key, module 1202 chases down all object records associated with the customer (workgroup), decrypts each object key with the current plaintext master key, re-encrypts each plaintext object key using a new plaintext master key that it issued to the customer, and then stores each re-encrypted object key. Thereafter, the new plaintext master key can be provided to the customer's HSM 702 where it would be encrypted using the HSM key, and a new encrypted master key returned for storage on cloud object store 102. Cloud master key rotation can be scheduled based on security policies of cloud object store 102 itself, based on a security policy determined by the customer and stored in cloud object store 102, and/or based on a request by the customer.

Control and coordination module 1202 can also be operative to receive a new version of the customer's encrypted master key and associated HSM key ID from an HSM 702, for example, after key rotation on the customer side. When control and coordination module 1202 receives a new version of the encrypted master key and HSM key ID for a customer, control and coordination module 1202 stores the new encrypted master key and new HSM key ID in fields 1012 and 1013, respectively, of the customer's workgroup record 1002. Module 1202 can receive the new encrypted master key in various ways, for example, at the initiation of the customer's HSM 702, as part of a response to a request for the customer's plaintext master key when providing the prior encrypted master key for the first time after an HSM key rotation, or in response to a periodic key update service conducted by module 1202.

It should also be noted that key provisioning service 370A can be employed in the other embodiments of the invention discussed above, particularly where object keys are encrypted using the customer's HSM (e.g., FIGS. 11A and 11B). For example, in some embodiments, key provisioning service 370A can make requests for key processing (e.g., to encrypt a plaintext object key, to decrypt an encrypted object key, etc.) to an HSM proxy 704 on behalf of upload service 320 and download service 326 via HSM proxy interface 1216. Additionally, in such an embodiment, service 370A can also forward responses to upload and download services 320 and 326 via the corresponding interfaces 1208 and 1214, respectively. This provides the advantage that fewer services need to be in communication with a customer's HSM.

As still another example, key provisioning module 370A can be utilized for object key rotation purposes on a per-object basis. For example, if a plaintext object key needed to be rotated for an object (e.g., due to a security policy of cloud or customer, at the customer's request, etc.), control and coordination module 1202 could fetch the current plaintext object key from the HSM 702 using the current encrypted object key and HSM key ID, decrypt the object using the current plaintext object key, re-encrypt the object using a new object key from unused key cache 1206, provide the new plaintext object key to the HSM 702, receive the new encrypted object key from the HSM 702, and store the new encrypted object key in the object key record 530. Additionally, if a customer rotated its own HSM key used to encrypt the cloud object keys in its HSM 702, control and coordination module 1202 can also be operative to provide each encrypted object key ID associated with a prior HSM key ID, receive the new versions of the encrypted object keys from HSM 702, and store them in the corresponding object key records 530.

Figure 14:
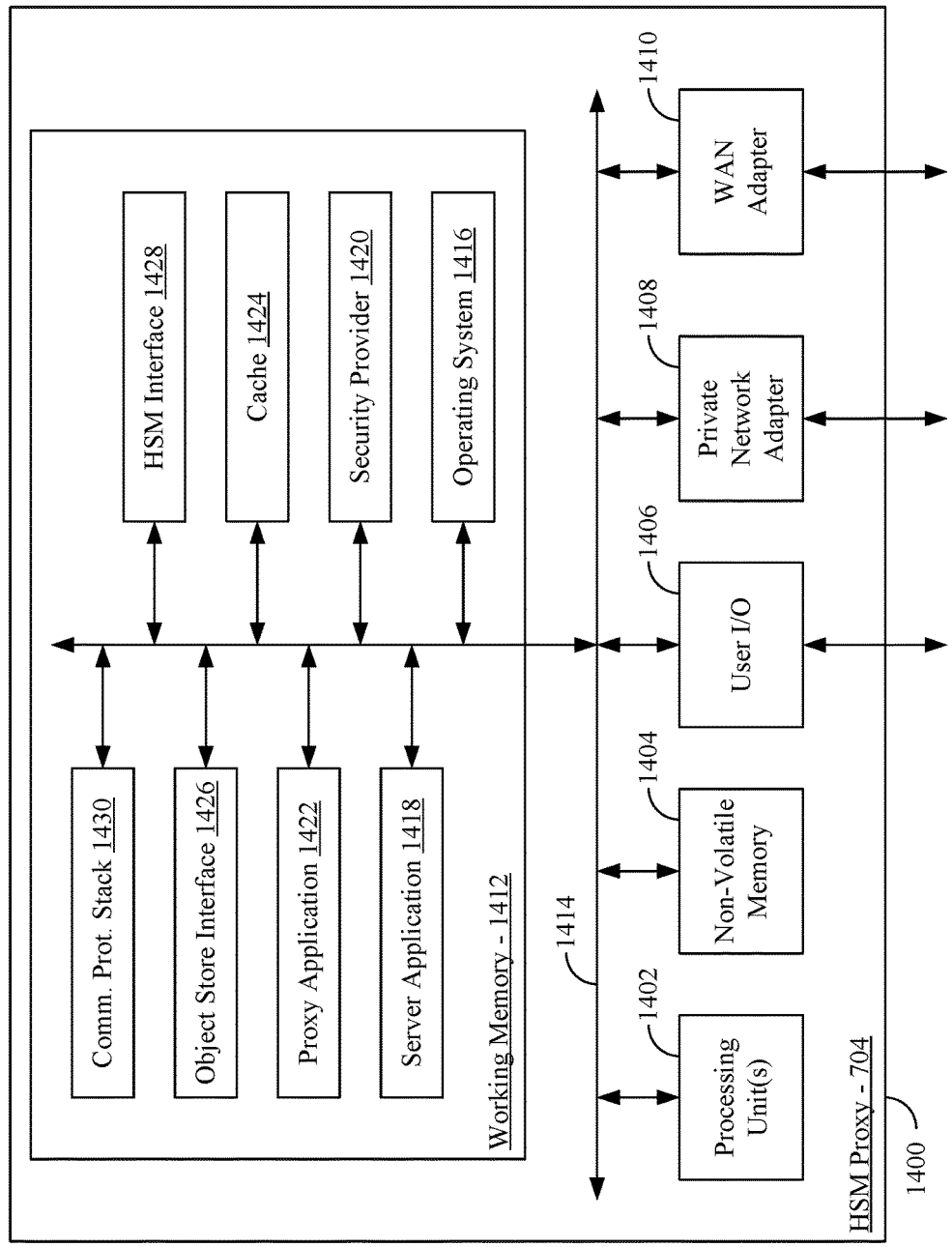
FIG. 14 is a block diagram showing an HSM proxy of the invention in greater detail.

FIG. 14 is a block diagram showing a computer system 1400 implementing HSM proxy 704, according to an embodiment of the present invention. Computer system 1400 includes one or more processing unit(s) (PU) 1402, non-volatile memory 1404, a user I/O controller 1406, a private network adapter 1408, a wide area network (WAN) adapter 1410, and working memory 1412, all intercommunicating via a system bus 1414. PU(s) 1402 execute(s) data and code contained in working memory 1412 to cause computer system 1400 to carry out the functions of HSM proxy 704 (e.g. proxying encryption key-related requests and responses to and from a customer's HSM 702, etc.). Non-volatile memory 1404 (e.g. read-only memory, one or more hard disk drives, flash memory, etc.) provides storage for data and code (e.g., boot code, applications, etc.) that are retained even when computer system 1400 is powered down. User I/O controller 1406 manages connections for user interface devices (not shown) that facilitate interaction and communication between computer system 1400 and a user (e.g., a cloud administrator). Private network adapter 1408 transmits data packets onto, and receives data packets, from HSM proxy network 234. WAN adapter 1410 transmits data packets onto, and receives data packets, from the Internet 106. System bus 1414 facilitates intercommunication between the various components of computer system 1400.

Working memory 1412 (e.g. random access memory) provides dynamic memory for computer system 1400 and includes executable code (e.g. an operating system 1416, etc.), which is loaded into working memory 1412 during system start-up. Operating system 1416 facilitates control and execution of the other modules loaded into working memory 1412. Working memory 1412 also includes an HTTP server application 1418 (e.g., Apache Tomcat™) operative to establish and manage the connections with HSM proxy 704 described herein. Working memory 1412 further includes a security provider 1420 (e.g., a Java process) that provides the framework for server application 1418 to establish credentialed access to HSM 702. Working memory 1412 further includes a proxy application 1422 that receives requests for key processing from object store nodes 230, optionally translates those requests into a format usable by HSM 702 consistent with security provider 1420, and forwards the requests to HSM 702. Additionally, proxy application 1422 receives responses to the requests for key processing from HSM 702, optionally translates the responses for cloud object store 102, and forwards the responses to object store nodes 230. Cache 1424 provides temporary storage for encryption-key-related and other cryptographic communications being routed by proxy application 1420. Object store interface 1426 provides a communications interface (e.g., a REST APIs, etc.) to a private network of cloud object store 102. HSM interface 1428 provides a communications interface (VPN access, configured access through a customer's firewall, REST APIs, etc.) to a private network coupled to HSM 702. Communications protocol stack 1430 defines protocols (e.g., HTTPS, TCP/IP, etc.) facilitating communications via private network adapter 1408 and WAN adapter 1410, respectively.

Figure 15:
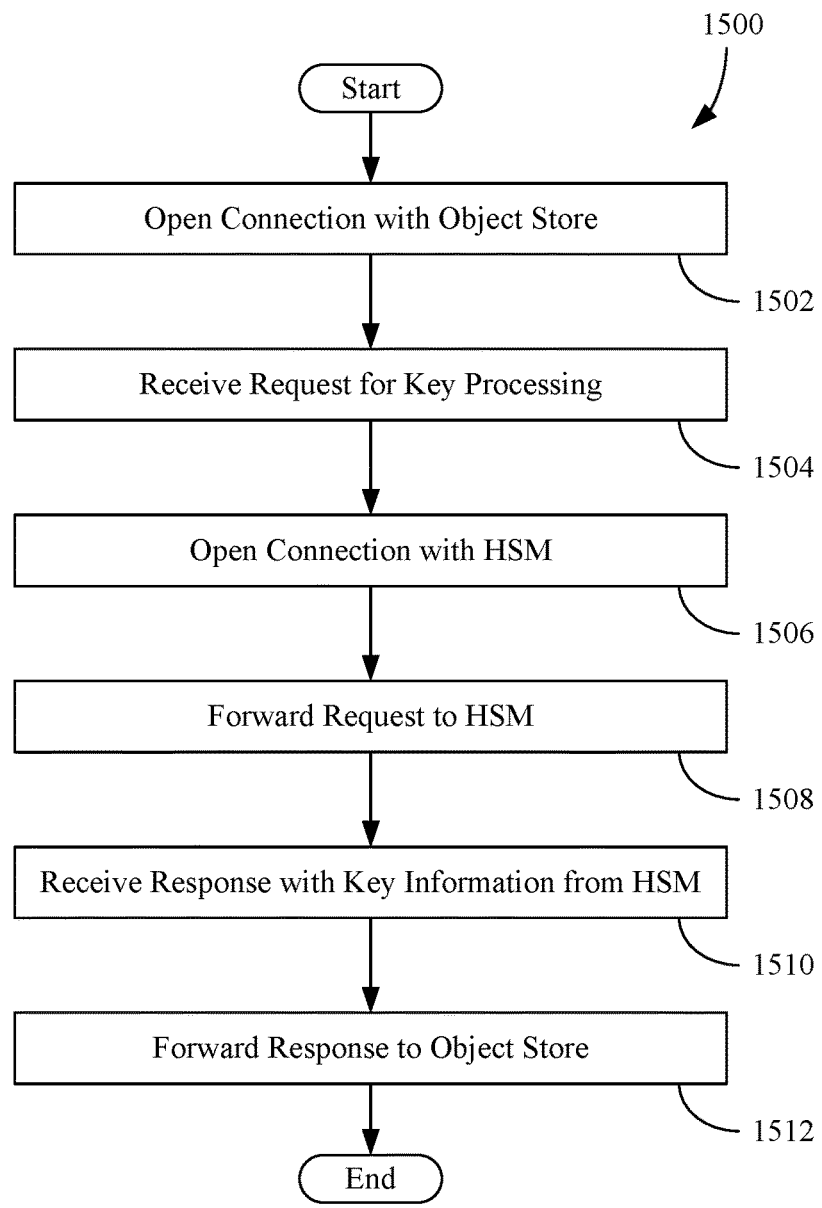
FIG. 15 is a flowchart summarizing a method for proxying encryption key communications between a cloud storage system and an HSM according to the invention.

FIG. 15 is a flowchart summarizing a method for proxying encryption key communications between a cloud storage system and an HSM 702. In a first step 1502, HSM proxy 704 opens a first connection with an object store node 230 of cloud storage system via server application 1418 and object store interface 1426. Then, in a second step 1504, proxy application 1422 receives a request for key processing from the object store node 230 via the first connection, where the request for key processing is associated with the encryption of at least one digital object stored on cloud storage system 102. In a third step 1506, HSM proxy 704 opens a second connection with HSM 702 via server application 1418 consistent with the customer credentials in security provider 1420. In a fourth step 1508, proxy application 1422 forwards the request for key processing to HSM 702 via the second connection. In a fifth step 1510, HSM proxy 704 receives a response, including the requested key information, and in a sixth step 1512, proxy application 1422 forwards the response to the object store node 230 of the cloud storage system 102.

The following are examples of calls that HSM proxy 704 receives from cloud object store 102, which it forwards to HSM 702, and the associated responses that HSM proxy 704 receives from HSM 702 and forwards to cloud object store 102. In one case, the request for key processing call includes a plaintext master key assigned by the cloud storage system to the customer, an HSM key ID, and a request for HSM 702 to encrypt the plaintext master key. Accordingly, a response from HSM 702 includes an encrypted master key associated with the customer. In another case, the request for key processing call includes an encrypted master key previously provided to the cloud object store 102 by HSM 702, an HSM key ID, and a request that the HSM 702 decrypt the encrypted master key using its HSM key corresponding to the HSM key ID. Accordingly, a response from HSM 702 includes the plaintext master key associated with the customer. In still another case, the request for key processing can include a plaintext object key used to encrypt a digital object stored on the object storage system, an HSM key ID, and a request that HSM 702 encrypt the object key. In such a case, the response from the HSM 702 includes an encrypted object key. In yet another case, the request for key processing comprises an encrypted object key previously provided by HSM 702, an HSM key ID, and a request that the HSM decrypt the encrypted object key. Accordingly, a response from HSM 702 includes the plaintext object key for the object. Other calls (e.g., requesting a new encrypted master key for a customer following master key rotations on cloud object store 102, etc.) can also be implemented.

Additionally, requests from HSM 702 can also be received in some embodiments, such as for key rotation purposes, and responses generated by cloud object store 102. For example, if HSM 702 requested an encrypted master key or encrypted object key(s) in response to a key rotation on the HSM 702, cloud object store 102 would respond with the requested encrypted keys.

In summary the invention provides one-key-per-object encryption, which is a strong solution limiting exposure in case of a security breach. In addition, the invention provides various HSM proxy deployments, which facilitate efficient interaction with customer HSMs. This allows security conscious customers to control their own object keys in various ways and also maintain full control of when and who can access their data, including preventing cloud access without receiving at least one encryption key (e.g., object or master) from the customer's HSM. Additionally, the invention provides the advantage that a customer specific master key and/or HSM key can be rotated at any time, for example, based on customer security policies.

Globally Distributed Hybrid Object Store

Cloud object stores have been described above and also in commonly-owned U.S. Pat. No. 9,135,269 B2, which is incorporated by its reference herein in its entirety. Such object stores can be enabled to replicate customer data to remote object stores, as well as, to third party public object stores like Google Cloud Storage, Amazon S3, and Microsoft Azure.

Using these remote object stores, which can include public object store and object stores like those described above and in the '269 patent, copies of objects uploaded by a client can be stored in different regions of the world—for example a copy can be stored in each of Asia, Europe, North America etc. Users are distributed across the globe and can advantageously download these objects from any region.

Figure 16:
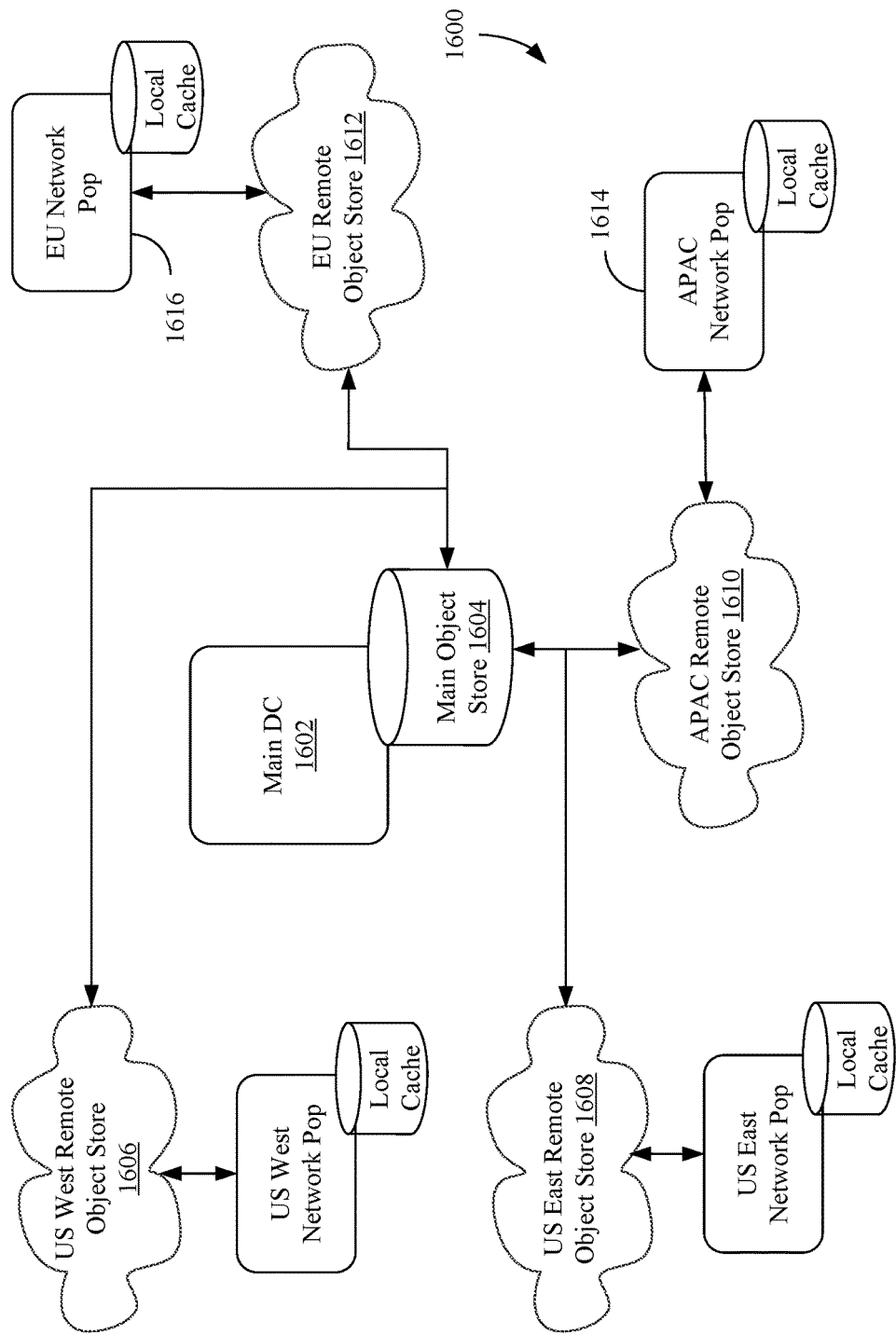
FIG. 16 is a diagram showing a geographically-distributed object store and network topology.

FIG. 16 is a diagram showing a geographically-distributed object store and network topology 1600, which includes a Main DC 1602 having a main object store deployed locally, for example, as described above or in the '269 patent. Regular uploads arrive in the Main DC and are stored in local main object store 1604. Based on a customer's replication policy and, optionally, the cloud provider's data replication (DR) policy, objects are replicated to one or more remote objects stores. Exemplary remote object stores are shown as a "US West Remote Object Store" 1606, a "US East Remote Object Store" 1608, an "APAC Remote Object Store" 1610 (e.g., in the Asia Pacific region), and a European "EU Remote Object Store" 1612.

The geographically-distributed object store 1600 is capable of serving an object from the local object store (e.g., at the Main DC 1602), or from a remote location if the local copy is not available. Because the geographically-distributed object store 1600 can include proprietary and/or public object stores such as Microsoft Azure, Google Cloud Storage, and Amazon S3, it is termed a Hybrid Object Store. The remote object stores provide an advantage because they can be used to serve user request(s) from the closest regions to the user(s).

FIG. 16 also shows that dedicated network point-of-presences ("pops") are also deployed in various regions across the world, which provide dedicated optimized networks for communicating with the "Main DC" 1602. The pops are configured to optimize network routing is optimized and sometimes include dedicated network links.

It should also be noted that even though object copies can be made available in different regions, in a particular embodiment, a user directory and permissions repository is only available in the region where the customer's account is located, which is referred to as the "Main Data Center (DC)" 1602 for the customer in question. In such an embodiment, only the Main DC 1602 can decide if an object should be served to a user after applying various authentication and authorization policies for the user.

An advantage of this invention is that objects are served to users from the closest location available to the user, improving download and upload times by cutting down standard network latency issues faced when serving content from data centers that are located tens of thousands of miles away from the users. When accessing/serving the closest copy of an object, it is desirable to apply current permissions and current authentication rules for all the requests. Accordingly, in a particular embodiment, the invention advantageously ensures that permission and authentication policies are 100% current for all user requests with no or very minimal lag. This embodiment is not a near-real-time or an eventually consistent global object cache model; rather it is 100% accurate 100% of the time. If a permission for an object was revoked for a user in Singapore by an administrator at the Main DC 1602 a fraction of a second before, the user in Singapore will not be able to access the object from the copy in Asia exactly like the user would be denied access if the user was trying to access the object (e.g., download the file) from the Main DC 1602.

A customer's replication policy determines how an object is replicated across the global object store 1600. A replication policy is specific to a customer and defines the following parameters/settings for that given customer:
1. Number of local copies of an object;
2. Number of remote copies of an object (can be specified for each region);
   a. Locations of remote copies including
      i. Region and
      ii. Storage details (e.g., if the location is a public or private object store, etc.)
3. Deduplication—Is deduplication enabled for this replication policy?;
4. Compression—Can objects in this replication policy be compressed?; and
5. Encryption—Details of object encryption like key id, key vault location, etc.

Figure 17:
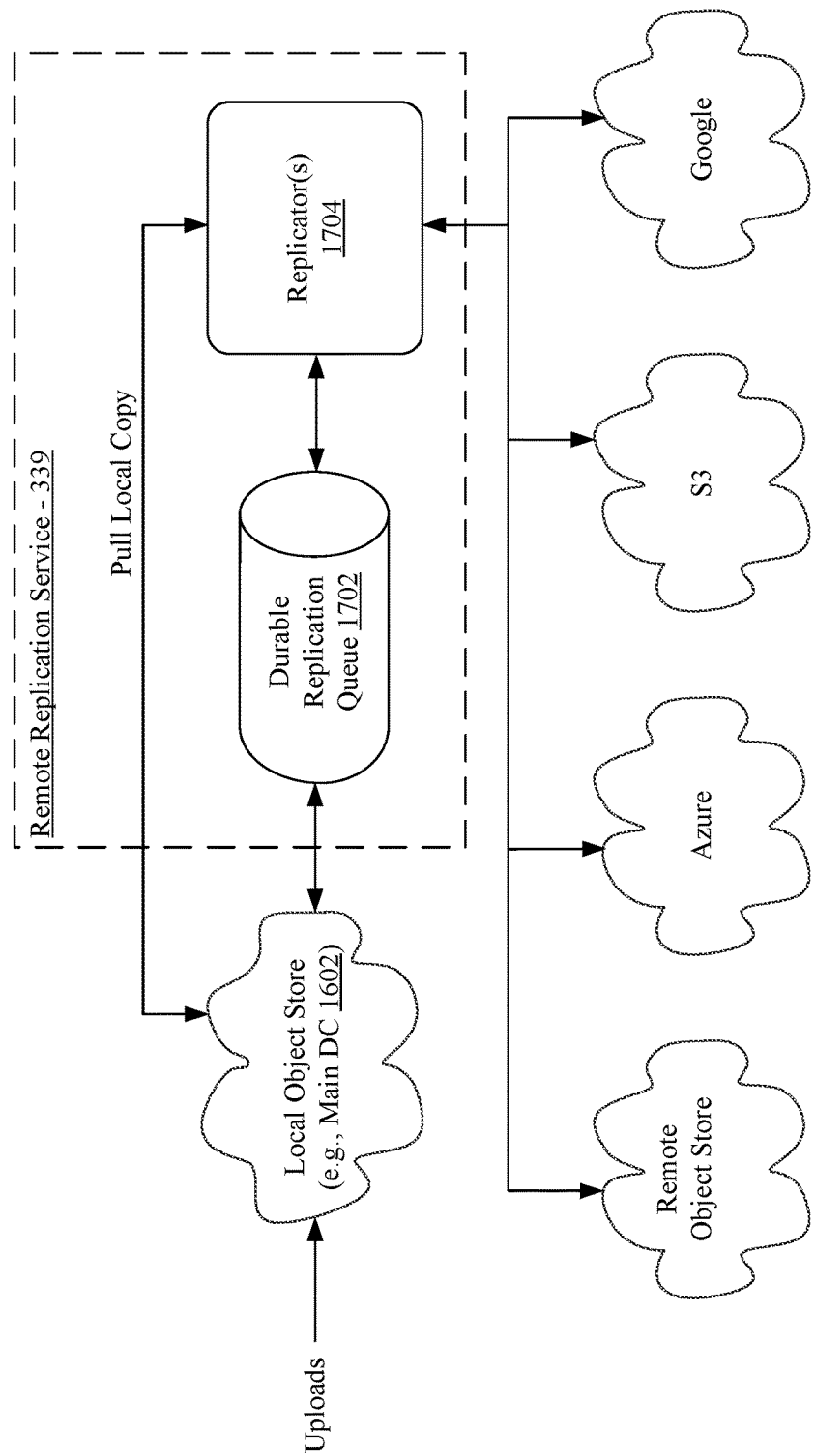
FIG. 17 shows an object replication process for the global object store of FIG. 16.

FIG. 17 shows an exemplary replication process for the global object store 1600 according to the present invention. Initially, objects are uploaded to a cloud object (e.g., cloud object store 102, one as described in the '269 patent, etc.) that is local to the client device (user). In this embodiment, we will assume this is the main DC 1602. Depending on the replication policy defined for the customer associated with the upload, a message is queued to a replication queue 1702. A pool of replicators 1704 listen to the replication queue 1702 and pick up requests to replicate objects as they arrive. Replicators 1704 then copy the object from the local object store to one or more other object stores based on the client's and/or internal replication policy(ies). The other object stores can be remote object stores (e.g., US west remote object store 1606, etc.) operated by the same cloud service provider or some other public object store (e.g., Google Cloud Service, Microsoft Azure, Amazon S3, etc.), which are configured using public cloud Rest APIs. Remote object stores can be mapped to the particular customer and contacted based on URL or other endpoint information.

Objects are replicated when they are persisted to the local object store. In a particular embodiment, the replication is asynchronous but near real time. The metadata of the local object store (e.g., external store ID fields 520 of an associated object record, etc.) is updated to indicate the remote copies. Replicators 1704 make sure the checksum of objects in the remote/public object stores are same as the one(s) stored in local copies to ensure data integrity. In addition to the other advantages described herein, when an object is requested for download, if a local copy is not available or corrupt, the local object store will pull the object down from one of the remote/public object stores and serve it to the requester—the requester being unaware to all this.

Figure 18:
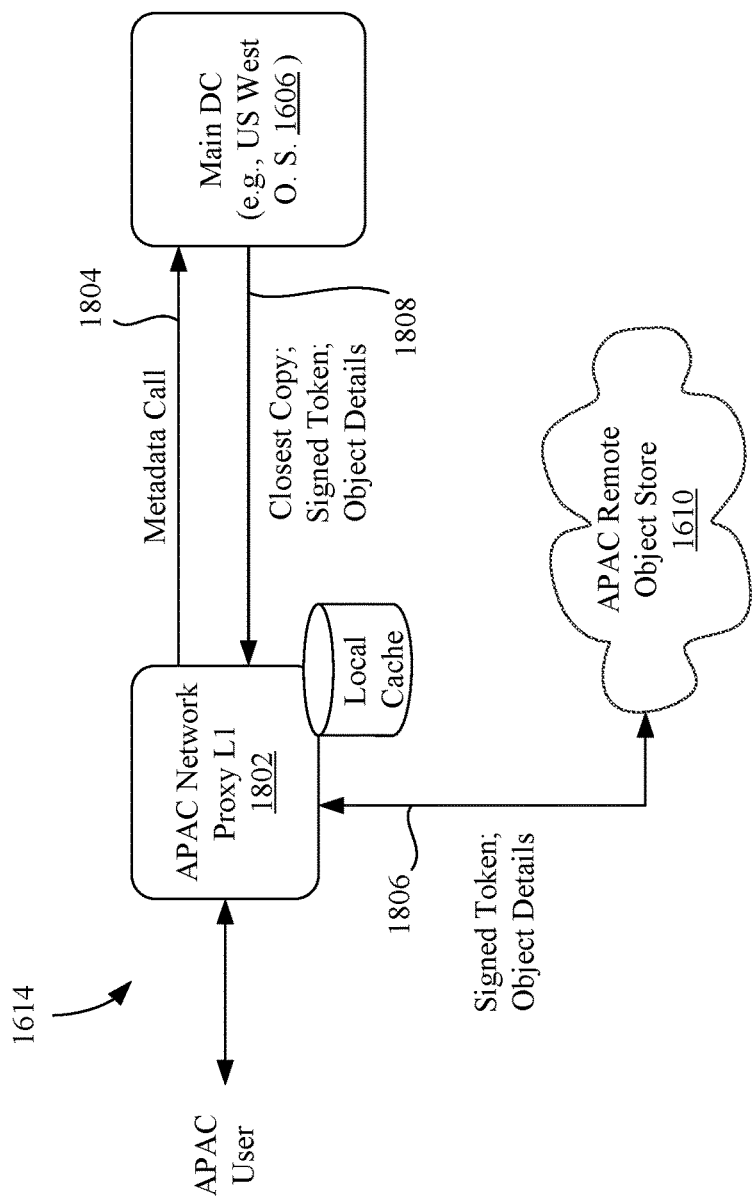
FIG. 18 shows an exemplary geographically-routed download process in the global object store of FIG. 16.

FIG. 18 shows an exemplary geographically-routed download process in global object store 1600. Users are routed to the nearest network pop based on their location. For example, a customer account's Main DC could be the US West remote object store 1606 in this example, but the user could be in Singapore, so user is routed to an APAC network pop 1614 in Hong Kong. This routing is done using geo-aware DNS routing. For example, the cloud service provider's client interface (e.g., website) would resolve to a network pop IP in Hong Kong for a user in Singapore, but would resolve to an Amsterdam Pop IP on EU network pop 1616 for a user in Europe.

An associated network proxy 1802 on the network pop (e.g., APAC 1614) splits every file download call into two calls, including (1) a permissions authorization and metadata fetch call 1804; and (2) a call 1806 to download (or upload as the case may be) the actual object. This split happens at the network pop level and allows the file to be transparently downloaded from the closest copy without any changes to the user interface or user flow. The user would not detect the object redirection even with advanced tools like Firebug or Wireshark.

When the request arrives at the network pop 1614, the network pop 1614 forwards it to the Main DC (here US West 1606) with additional metadata that the request is coming via a network pop. The Main DC, on seeing the request coming in via network pop, would then apply authentication and permissions as usual, but instead of returning the object, it would return a set of metadata 1808, including data indicative of the closest copy, a signed token for validation, and other object details (e.g., Object ID, Workgroup ID, compression details, encryption details, object locations in the geographically distributed cloud 1500, etc.) to network proxy 1802, so the network proxy 1802 can fetch the data from the closest copy.

Network proxy 1802 of the network pop 1614 temporarily caches the returned information and utilizes the redirection metadata and the signed token, and checks if the object exists in a local cache. If so, it streams the object to the user from the local cache without even sending the request to the remote object store. (Note: serving the object happens after permissions are validated by the Main DC, which facilitates a 100% consistent cache.)

However, if the object does not exist in the local cache, then network proxy 1802 sends a request 1806 to the "closest copy" object store as determined by the object details returned from the main DC. The closest copy object store validates the token and serves the object requested to the network pop proxy 1802. The network pop proxy 1802 streams the object back to user thus sending the real object to the user from the closest copy instead of a far off Main DC. This advantageously reduces latency. The retrieved object is also locally cached while streaming down to the user for future requests, which also reduces future latency.

All the above communications are over HTTPS and components are authenticated by SSL certificates and digital signatures. In particular:
a. The network pop presents its CA signed Certificate to the Main DC, which is preconfigured in the allowed list of the Main DC. This is how the Main DC securely identifies network pop connections;
b. The Main DC replies to the Network Pop with a signed token;
c. The remote object store validates a request from the network pop using the same certificate as (a);
d. The remote object store validates the signed token from the Main DC using the preconfigured public key for the Main DC; and
e. The Main DC securely identifies requests from the remote object store using a preconfigured CA signed remote object store key.

Figure 19:
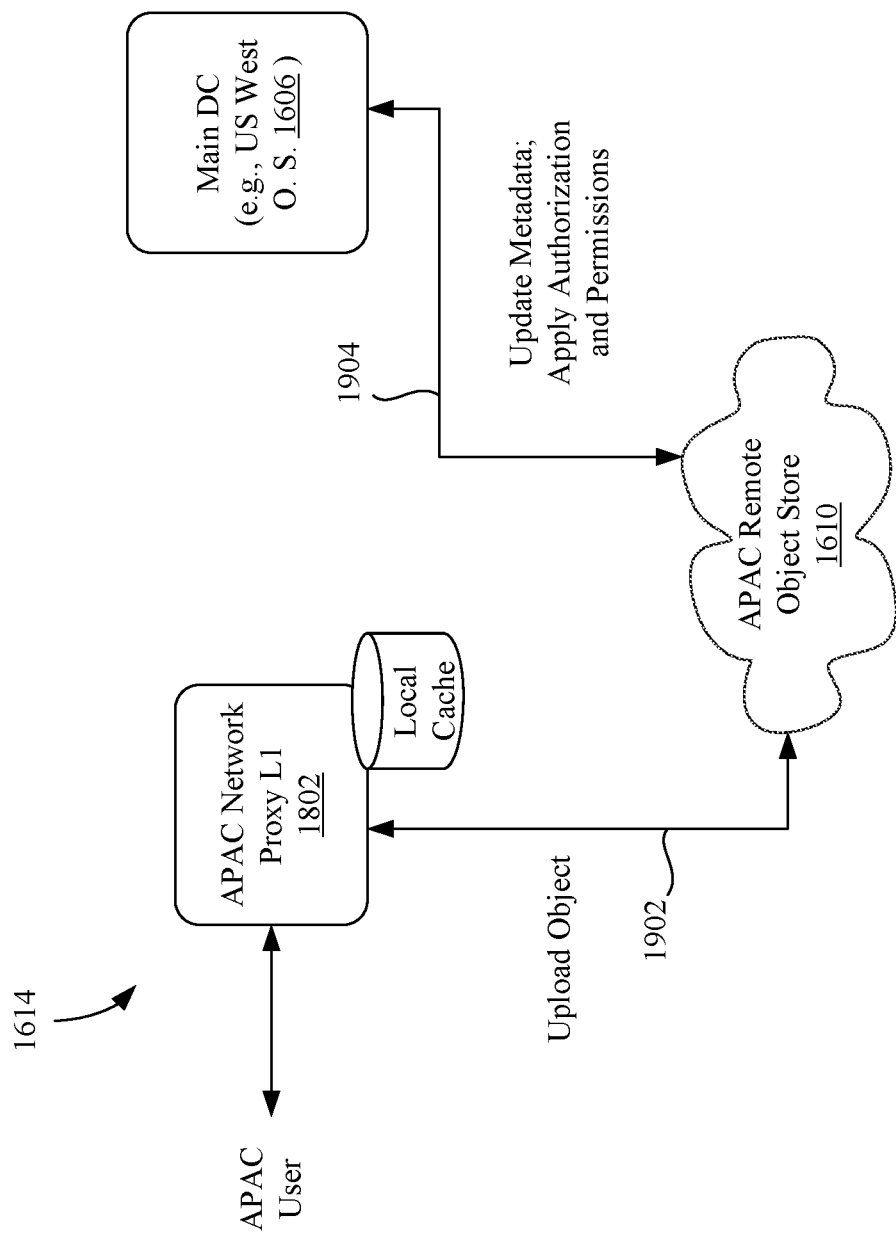
FIG. 19 shows an exemplary geographically-routed upload process in the global object store of FIG. 16.

FIG. 19 shows an exemplary geographically-routed upload process in global object store 1600. As above, users are routed to the closest network pop based on their location. For the above example, where a customer account's Main DC is the US West Object Store 1606, but the user is in Singapore, the user is routed to the APAC network pop 1614 in Hong Kong with the help of geo-aware DNS routing. Again, the cloud service provider's client interface (e.g., website) would resolve to a network pop IP in Hong Kong for a user in Singapore, but would resolve to an Amsterdam pop IP for a user in Europe.

The Network Pop detects an upload request and determines the closest object store where the object could be stored, instead of sending object to the far way Main DC (US West object store 1606) for storage. Accordingly, the upload request 1902 is routed to the closest object store, which is APAC remote object store 1610. The APAC remote object store 1610 receives the upload request 1902 and persists the object in it's storage. The APAC remote object store 1610 also sends the metadata (e.g., object size, compression information, encryption information, object name, checksum information, etc.) to the Main DC (object store 1606) via a communication 1904. The Main DC applies permissions and authentication rules on the object and user credentials and stores the metadata for the object. If the permissions do not allow the object, then Main DC rejects the request and notifies the APAC remote object store 1610. The APAC remote object store 1610 then discards the object in question and returns an error/forbidden message to the network pop proxy 1802 which is relayed to the user.

Deduplication

A cloud service provider is oftentimes a multi-tenant cloud store. Accordingly, a lot of files uploaded by users are duplicates of some files already uploaded to the domain. Deduplication provides an advantage in that the cloud service provider can avoid storing multiple copies of the same object. Instead, the original object is stored and, for each duplicate, the cloud service provider stores a reference to the original object.

Figure 20A:
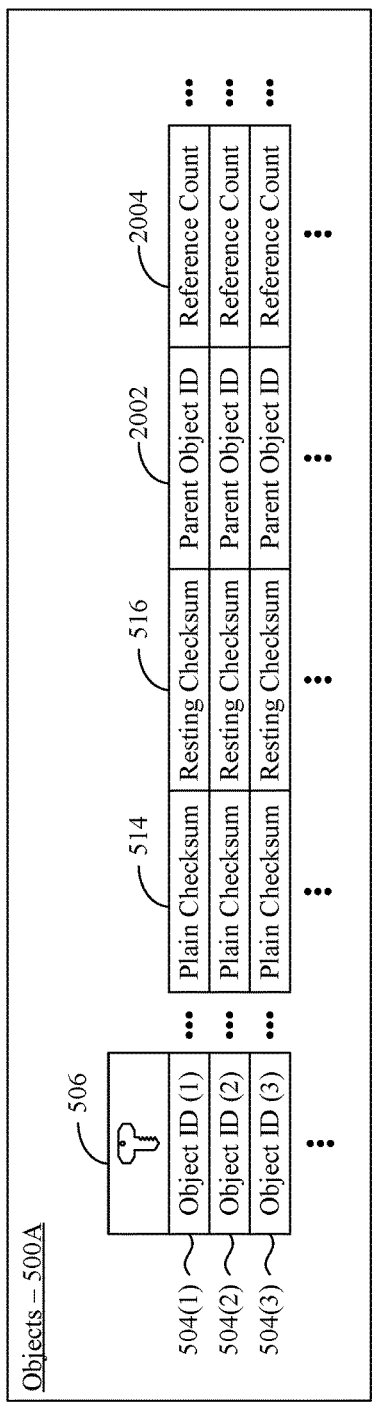
FIG. 20A shows an exemplary object record stored in the object database of FIG. 3 facilitating object deduplication according to the invention.

FIG. 20A shows additional fields in object records 504 of table 500A (of FIGS. 5A-5B) related to deduplication. As mentioned previously, a plurality of object records 504 are arranged as the rows of objects table 500A. Each object record 504 includes an object ID field 506, a plain checksum field 514, and a resting checksum field 516, as described previously. However, as shown in FIG. 20A, each object record 504 can also include a parent object ID field 2002 and a reference count field 2004 to facilitate deduplication. The data in these two fields, along with the plain checksum in plain checksum field 514 facilitate object deduplication as will be explained below.

Figure 20B:
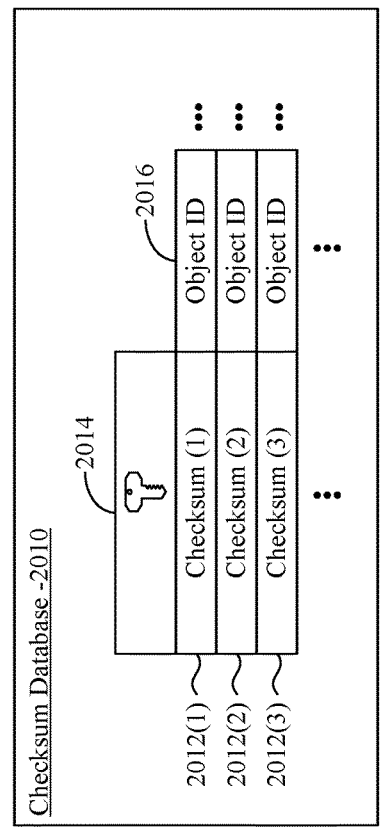
FIG. 20B shows an exemplary checksum database that facilitates object deduplication according to the invention.

FIG. 20B shows a checksum database 2010 that also facilitates object deduplication in conjunction with the object records 504 shown in FIG. 20A. Checksum database 2010 includes a plurality of checksum records 2012 (only three shown) arranged as the rows of a table in checksum database 2010 in this embodiment. Each checksum record 2012 includes a checksum field 2014 and an object ID field 2016. Checksum field 2014 is the key field for checksum database 2010 and stores a unique checksum associated with one or more unencrypted objects stored on the cloud object store. Object ID field 2016 includes data corresponding to an object ID 506 that uniquely identifies an object record 504 in objects table 500A having the particular checksum in field 2014. Thus, checksum database 2010 maps a particular checksum 2014 to a particular object identifier 506 in table 500A in a readily scalable way.

A deduplication process according to the invention is as follows:

1. A user uploads an object to the object store.
2. When the new object is uploaded, the object store 102 computes a SHA512 checksum (or other type of checksum) for the unencrypted object and stores this checksum in plain checksum field 514 of the associated object record 504 in objects table 500A. In some embodiments, until the file is persisted in the object store, its checksum will be unknown, for example, when both checksum computation and writing to the object store's filers/data storage happen without buffering. Using SHA512 checksums is desirable because the probability of collisions for SHA512 is almost zero.
3. After the object is uploaded, the object deduplicator engine 338 picks up the new object and queries checksum database 2010 to determine if the new object's plain checksum is already stored therein as one of checksums 2014 and, if so, to find the object identifier associated with the object whose checksum is same as the one just uploaded.
4. If there is no such checksum found in database 2010, then the plain checksum 514 for the new object is stored in field 2014 of a new checksum record 2012 in checksum database 2014, and the object identifier 506 assigned to the new object is stored in object ID field 2016 of the new checksum record 2012. Additionally, the attributes of the object record 504 for the new object are set as follows:
   a. Parent Object ID 2002=NULL (implies this is a parent object id); and
   b. Reference Count 2004=1.
5. In contrast, if instead the deduplicator engine 338 finds an existing object in the checksum database 2010 with the same checksum as the new object, then the newly uploaded object is considered to be a child object. Accordingly, the attributes of both the parent and child object records 504 are updated as follows:
   a. In the child record (the object record 504 for the new object):
      i. Parent Object ID 2002 is set to the object ID fetched from the field 2016 of the associated checksum record 2012 in checksum database 2010; and
      ii. Reference Count 2004=1
   b. In the parent object record 504, the reference counter in field 2004 is incremented by one (1). (Note the parent object record 504 is that record which has an object ID 506 corresponding to the object ID fetched from field 2016 of the associated checksum record 2012 in checksum database 2010.)

As can be seen from steps 4 and 5 above, the reference counter is operative in maintaining all valid references to an object. When a new child object is discovered, the parent object's reference counter is incremented. When a parent or child object is deleted, the reference counter of the parent object record is decremented. However the physical object itself is not deleted unless the reference counter is zero (0).

The checksum database 2010 facilitates scalable and fast deduplication. In a particular embodiment, the checksum database is a scalable and fast key value database. The key value database can be implemented using:

(1) A column store like Apache Hbase or Apache Cassandra; or (2) A custom key value store built on top of a set of MySQL servers. For example the store can include a My SQL pool of multiple servers and the checksum can be hashed with an appropriate hash function to distribute the checksums among the pool of servers. For querying, the hash function will indicate the possible location of the checksum in the MySQL cluster, and querying the particular database would return a possible parent object for the given checksum.

It is important to note that deduplication is accomplished by comparing the plaintext checksum of a new unencrypted object, but not the checksum of an encrypted object-at-rest, with the checksums of unencrypted versions of other objects. Where each object is encrypted with its own object key as described above, calculating and storing a plaintext checksum of the unencrypted object is important for deduplication because post-encryption checksums of the same object will be different due to different encrypted content resulting from different object keys. This ensures that two objects, encrypted with different object keys but having the same pre-encrypted plaintext checksums, can still be deduplicated.

Upload Processes

FIGS. 21-24 describe two types of special upload procedures for uploading digital objects to cloud object store 102.

Figure 21:
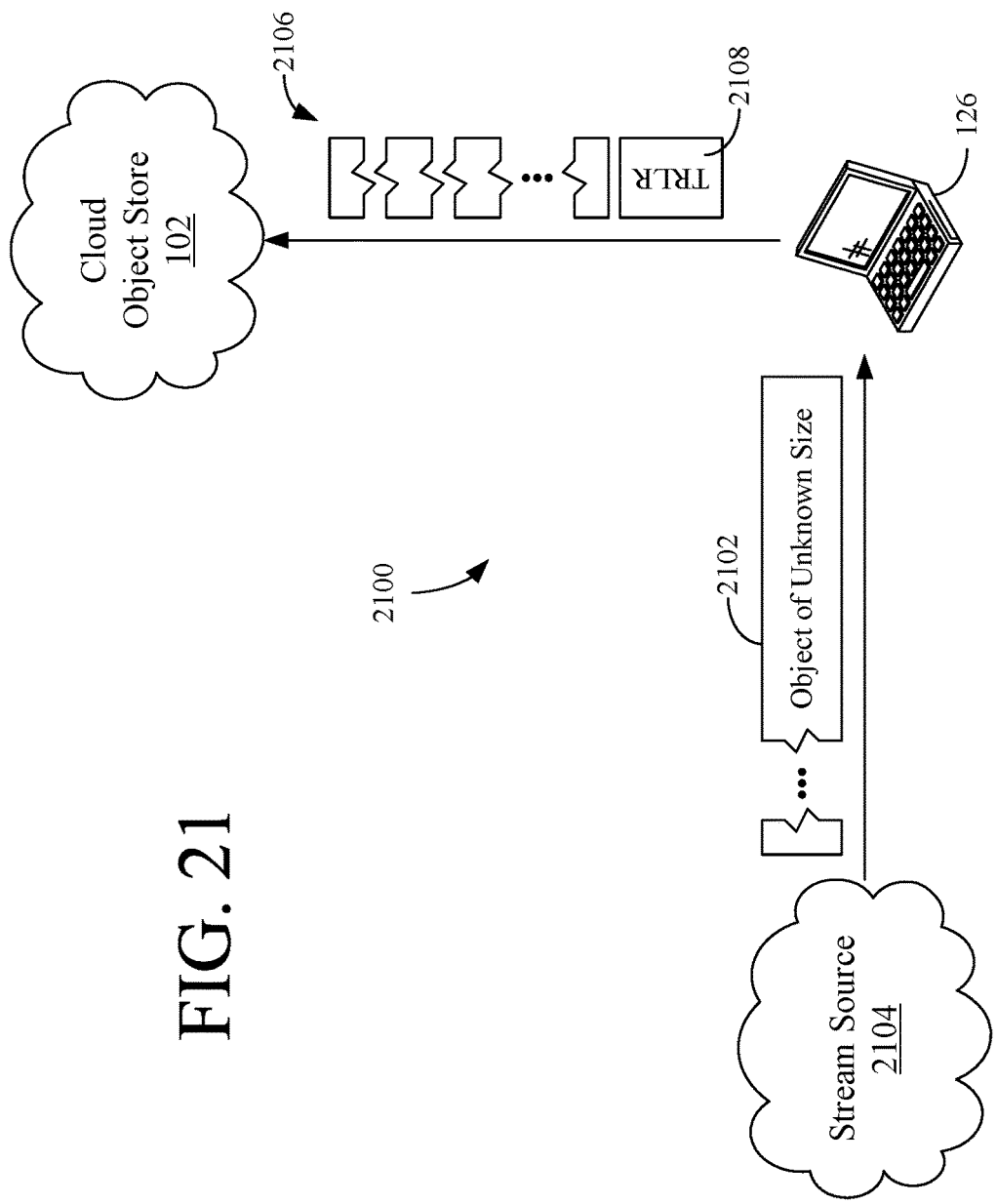
FIG. 21 shows a process for uploading a streamed object to the cloud object store of FIG. 1 according to the invention.

FIG. 21 shows an upload 2100 where a remote client device 126 does not know the size or complete contents of an object 2102 that it needs to upload to cloud object store 102 at the beginning of the upload process. This can occur, for example, where a stream source 2104 streams an object 2102 to a remote client 126, and the remote client 126, in turn, wants to upload the streamed object 2102 to cloud object store 102.

Not knowing the contents of the streamed object 2102 in advance at the time of upload, however, presents an interesting problem, because remote client 126 cannot provide the content length or a checksum for object 2102 at the start of the upload. However both content length and input checksum are important to data inflight integrity.

In order to overcome this limitation, the invention utilizes the "transfer encoding chunked" and HTTP trailers mechanisms of HTTP. HTTP Trailers allows a client to embed pre-declared headers after the chunked object body as a trailer. Accordingly, remote client 126 can compute a checksum while the chunked data is being sent to the object store 102, and append it to the end of the chunk stream for the object. Additionally, the request allows chunk length to be specified.

A sample HTTP request from remote client 126 to object store 102 is provided below:

POST public-api/v1/fs-content-upload/Shared/test/123.txt HTTP/1.1
    Authorization: Basic dWcjE6cHVzZXIx=
    Host: subdomain0.ezegnyte.com
    Transfer-Encoding: chunked
    Trailer: X-Trailer An exemplary data stream 2106 to cloud object store 102 resulting from the above request is as follows:

Length of Each Chunk
    Contents of the Chunks
    Last Chunk Marker
    X-Trailer: {"size": Size-of-Entire-Object, "sha512": "Checksum-of-Entire-Object" } where "Length of Each Chunk" includes data representing the length of each chunk, "Contents of the Chunks" is the actual content of the chunks prepared by remote client 126 and provided to cloud object store 102, "Last Chunk Marker" is a marker (a zero-length chunk) in the data stream that indicates all chunks have been transmitted by client device 126, and "X-Trailer:{ . . . }" is the trailer appended by remote client 126 for use by cloud object store 102. As shown the trailer specifies the size of the entire object, inclusive of all chunks. Additionally, the trailer specifies a checksum (e.g., SHA512, etc.) of the entire object.

Cloud object store 102 receives the HTTP request and associated chunked data stream 2106, assembles the chunked data stream into one object, and stores the object on filers 222 under an associated object ID such as Path/To/ObjectID. Cloud object store 102 can also verify that it has the complete object by verifying the checksum appended in the trailer with a checksum that it determines based on the assembled contents of all the chunks. Cloud object store 102 also updates the associated object record 504 for the object with the checksum.

To accommodate the chunked uploads, cloud object store can include a chunked API endpoint that is configured to receive streams of chunks using the transfer-encoding chunked protocol and accept a trailer specifying size and checksum at the end of the chunk stream. Accordingly, upload module 320 can also be configured to store the chunked upload. In the case of one-key-per-object encryption, the assembled object can be encrypted using a unique object key as discussed above.

Figure 22:
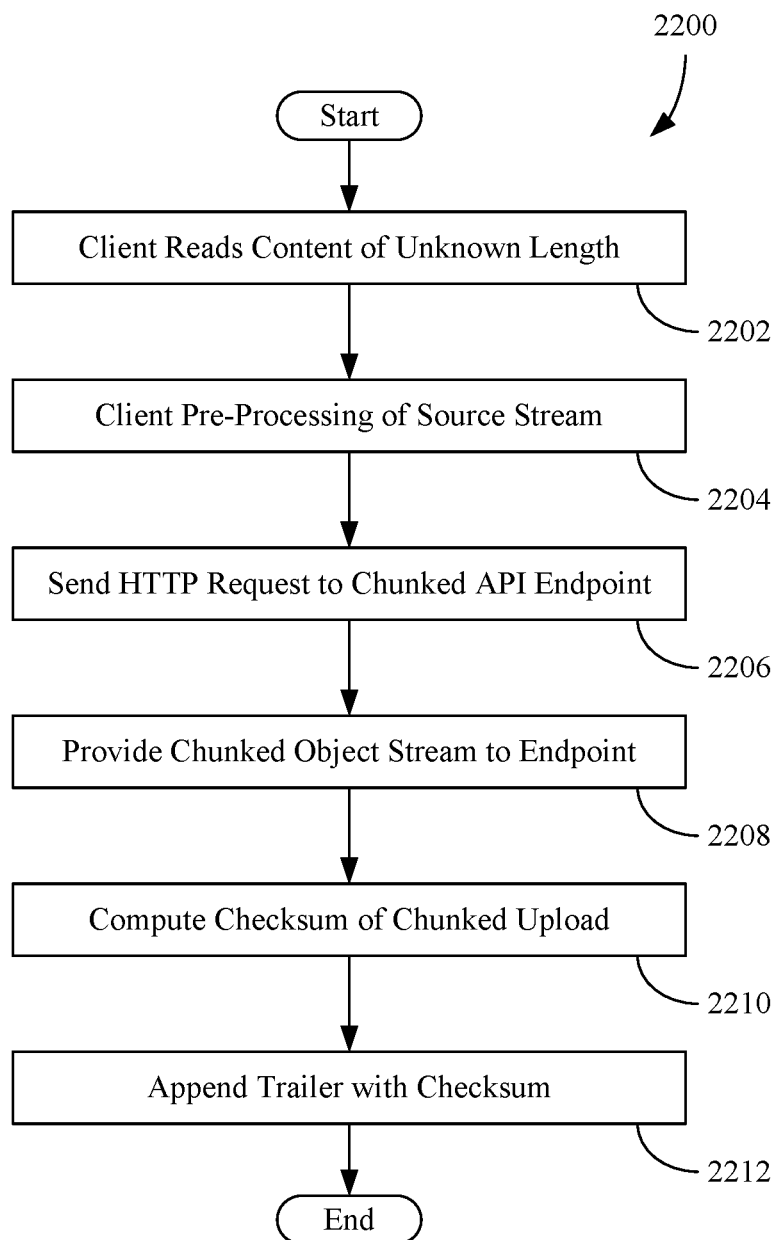
FIG. 22 is a flowchart summarizing an exemplary method for uploading an object of unknown size to the cloud object store of FIG. 1.

FIG. 22 is a flowchart summarizing an exemplary method 2200 for performing a chunked object upload to cloud object store 102 from remote client 126. In a first step 2202, remote client 126 receives a streamed file object 2102 from a stream source 2104 of which remote client 126 does not know its size or checksum. In a second step 2204, remote client 126 performs some pre-processing on the object (e.g., encryption, compression, etc.) that is specific to the client and/or customer. In a third step 2206, remote client 126 sends an HTTP request to an API endpoint of cloud object store 102 that is configured to receive an upload using the transfer encoding chunked mechanism of HTTP. In a fourth step 2208, remote client 126 prepares chunks of the object, and transmits the chunks to cloud object store 102 according to its transfer-encoding-chunked request. In a fifth step 2210, remote client 126 calculates the checksum of the chunked data, for example, as the chunked data stream is being uploaded to cloud object store 102 using standard algorithms. In a sixth step 2212, remote client 126 appends a trailer 2108, including the size and checksum of the entire object, to the end of the chunked data stream after the final chunk, and method 2200 ends.

Figure 23:
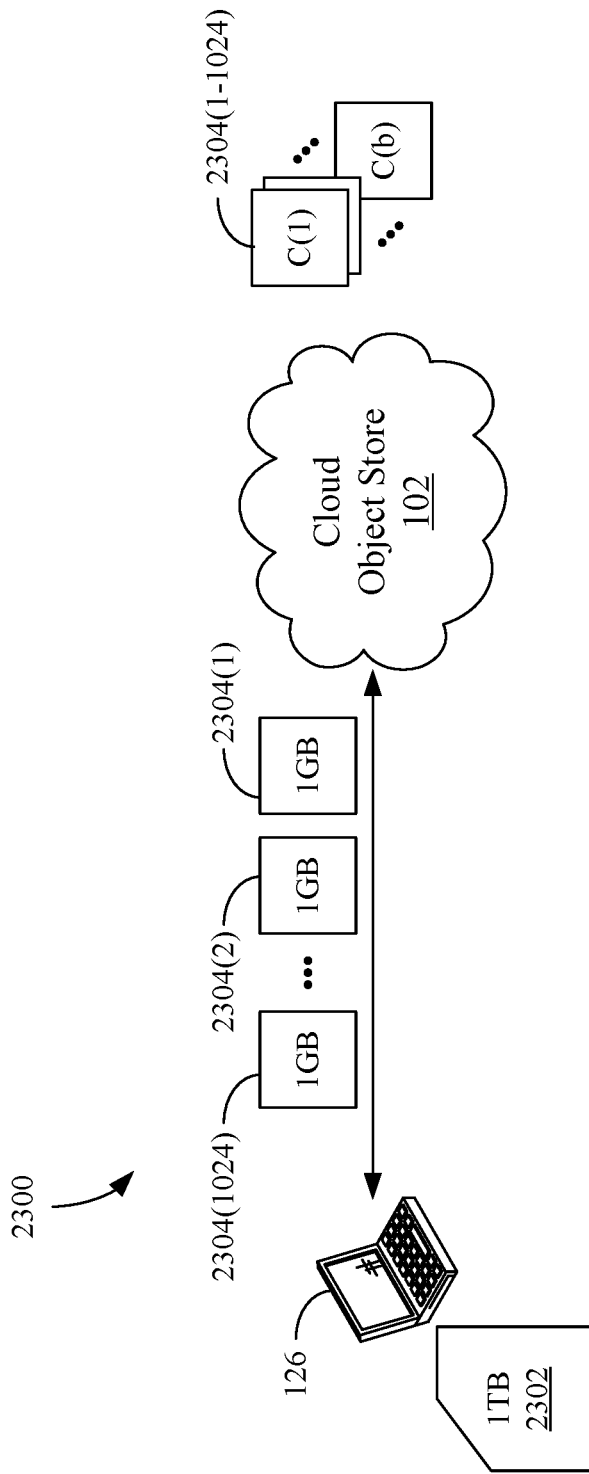
FIG. 23 shows a process for uploading a large file to the cloud object store of FIG. 1.

FIG. 23 shows another upload situation 2300 for a very large file. It is desirable for cloud service providers to support uploads of very large files 2302, for example, files that are one or more terabytes (TBs) in size. The problem with large files is that it is extremely difficult (if not almost impossible) to upload them as a single HTTP request to cloud object store 102.

The invention, however, provides an advantage because it enables a very large file to be uploaded in chunks. (Please note that this chunking is different from HTTP transfer encoding chunked described above.) More specifically, client device 126 is configured to divide a (very large) 1 TB file 2302 into a plurality of chunks 2304 each of a predetermined maximum size, and calculate a checksum for each chunk. For example, the 1 TB file 2302 can be divided into 1,024 chunks 2304(1-1024) each of 1 gigabyte (GB) maximum and each having a checksum associated with it. This enables files as large as several terabytes to be uploaded to cloud object store 102 and stored. When files are uploaded in chunks, remote client 126 provides a checksum associated with each chunk. Cloud object store 102 stores the upload as chunks as is and does not attempt to re-assemble the file. Cloud object store 102 also calculates and stores (in object database 324) checksums for the chunks as the chunks are received, and such checksums are verified against the checksums for the chunks provided by remote client 126. The chunks are organized under an object ID assigned to the object as follows Path/To/Objectid/1.Chunk, 2.Chunk, 3.Chunk . . . .

Thereafter, when the chunked object is later requested from cloud object store 102 (e.g., by a different remote client), cloud object store 102 constructs a virtual continuous stream from the list of all the chunks, which is served as if the object was stored as one single block. It is important to understand that not assembling the chunks provides important advantages. In particular, assembling the objects would take a lot of time, especially when files are terabyte(s) in size. Assembling the objects would also increase IO on the internal network and use a large swap space. By storing the object as chunks at rest, the object is available for consumption as soon as the chunks are uploaded.

Additionally, it is often important to compute a verifiable checksum of every upload. However, when files are uploaded in chunks and stored on disk as is, it is difficult or impossible to compute a complete end-to-end checksum at upload time. Additionally, any asynchronous computation would delay the immediate consumption of the file. To overcome this, cloud object store 102 utilizes a "Checksum-of-Checksums". This Checksum-of-Checksums is represented as follows:

{# of Chunks}-{Chunk Size}-{SHA512(SHA512 of Chunk Checksums)}

This checksum-of-checksums can be computed right at upload time from remote client 126 and is as accurate as the entire end-to-end checksum, thereby allowing other clients to safely download the file chunks and compare checksums for integrity. For example, first a checksum is calculated for each received chunk 2304 that is associated with a particular very large file 2302. Thereafter, a checksum-of-checksums is calculated as follows:

Checksum-of-Checksums:
    import hashlib
    m=hashlib.sha512( )
    m.update("checksum of chunk 1")
    m.update("checksum of chunk 2")

m.update("checksum of chunk 3")
m.hexdigest( )
'fc3688a40 . . . '

Each "m.update" adds chunk checksums to the final checksum provider. Responsive to checksums for all chunks, "m.hexdigest( )" finalizes the stream and generates the "checksum-of-checksums". The final output is then given as:

3-102400-fc3688a40 . . . .

This final result has the format described above and indicates that there are three (3) chunks in this object, that the size of each chunk is one GB (102400), and includes the checksum-of-checksums of m.hexdigest( )("fc3688a 40 . . . ") as indicated above.

Figure 24:
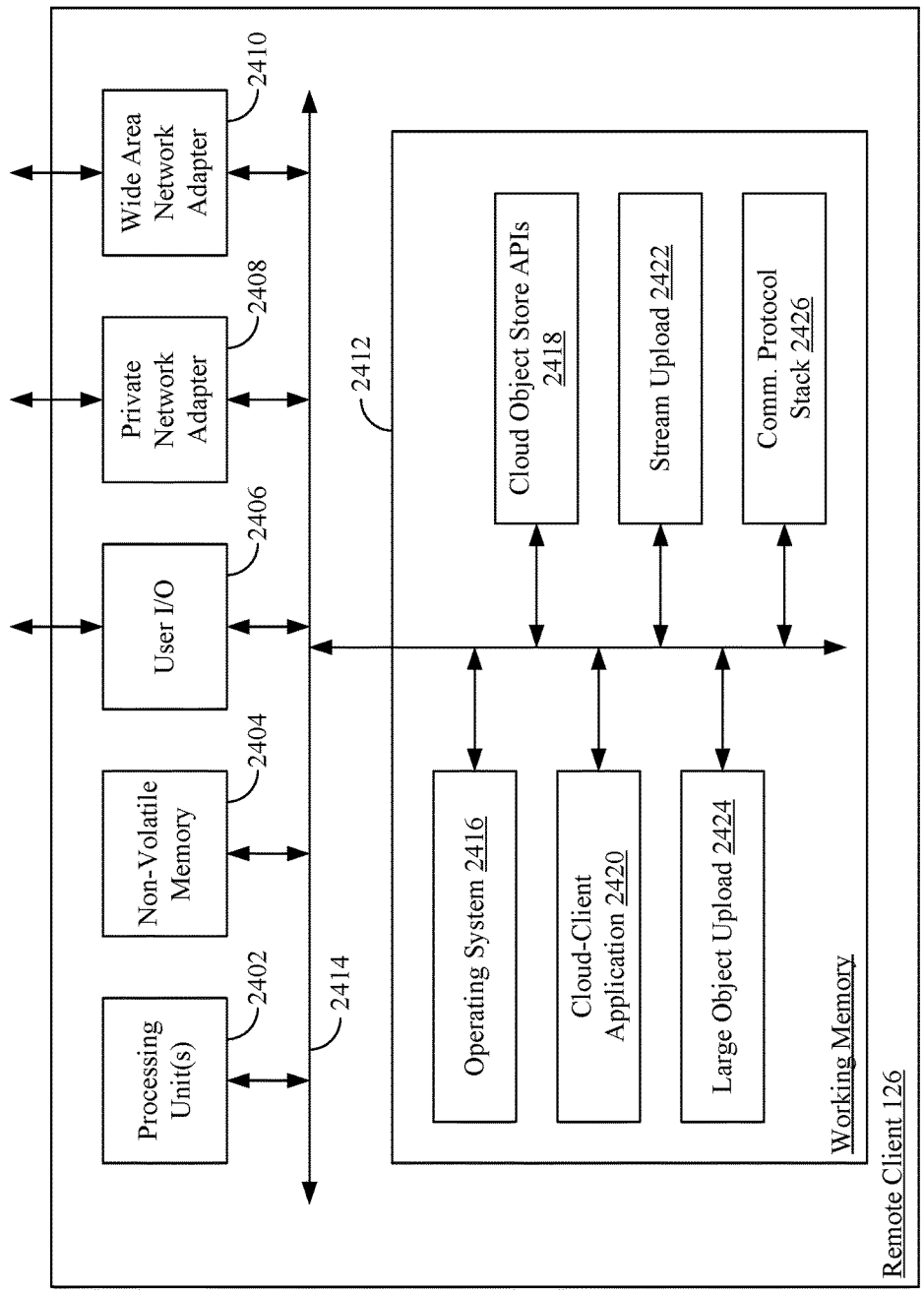
FIG. 24 is a block diagram showing an exemplary embodiment of a remote client device according to a particular embodiment of the invention.

FIG. 24 is a block diagram showing an exemplary embodiment of a remote client 126 configured to employ the special object upload processes described above. Remote client 126 includes one or more processing unit(s) (PU) 2402, non-volatile memory 2404, a user I/O controller 2406, a private network adapter 2408, a wide area network (WAN) adapter 2410, and working memory 2412, all intercommunicating via a system bus 2414. PU(s) 2402 execute(s) data and code contained in working memory 2410 to cause remote client 126 to carry out the remote client functionality, including the special object upload routines, described herein. Non-volatile memory 2404 (e.g. read-only memory, one or more hard disk drives, flash memory, etc.) provides storage for data and code (e.g., boot code, applications, etc.) that are retained even when remote client 126 is powered down. User I/O controller 2406 manages connections for user interfaces devices (not shown) that facilitate interaction and communication between remote client 126 and a user (e.g., a cloud customer). Private network adapter 2408 transmits data packets onto, and receives data packets, from a private network to which remote client 126 has access. WAN adapter 2410 transmits data packets onto, and receives data packets, from the Internet 106 or some other wide area network (e.g., a cellular network). System bus 2414 facilitates intercommunication between the various components of remote client 126.

Working memory 2412 (e.g. random access memory) provides dynamic memory for remote client 126 and includes executable code (e.g. an operating system 2416, etc.), which is loaded into working memory 2412 during system start-up. Operating system 2416 facilitates control and execution of the other modules loaded into working memory 2412. Working memory 2412 also includes cloud object store APIs 2418, which can include (e.g., REST) APIs and/or custom API(s) for remote client 126 to access cloud object store 126 and upload files thereto. A cloud-client application 2420 is also installed in working memory 2412 and includes code (e.g., a cloud application provided by cloud service provider, a customer developed cloud store program, etc.) that provides cloud storage functionality for remote client 126. A stream upload application 2422 is also loaded into working memory 2412 and provides the streaming upload functionality associated with the transfer-encoding-chunked uploads described in FIGS. 21-22, including appending a trailer to a chunked data stream. Stream upload application 2422, therefore, is configured to receive an object stream of unknown size from a stream source 2102, to prepare and transmit a series of chunks using transfer encoding chunked protocol to an endpoint of cloud object store 102 used for chunked uploads, and to append and communicate a trailer as described above to cloud object store 102. Likewise, a large object upload application 2424 is also loaded in working memory 2412 and is configured to upload a very large file as a plurality of chunks to cloud object store 102 as described in FIG. 23. Working memory 2412 also includes a communications protocol stack 2426 that defines protocols (e.g., HTTPS, TCP/IP, etc.) facilitating communications via private network adapter 2408 and WAN adapter 2410.

The description of particular embodiments of the present invention is now complete. Many of the described features may be substituted, altered or omitted without departing from the scope of the invention. For example, particular key management functions assigned to particular software modules herein (e.g., key provisioning services 370 and 370A) may be reassigned to other service (e.g., upload service 320, etc.). As another example, alternative data structures for storing data in object database 324 of cloud object store 102 can also be used. These and other deviations from the particular embodiments shown will be apparent to those skilled in the art, particularly in view of the foregoing disclosure.

We claim:

1. A cloud-based digital object storage system facilitating one-key-per-object encryption, said object storage system comprising:
    at least one hardware processor;
    at least one storage node including non-volatile memory for storing digital objects and code therein, said code including a set of predefined instructions for causing said at least one hardware processor to perform associated operations;
    a key provisioning service including a first subset of said set of predefined instructions configured to
        provide a plurality of unique encryption keys including a first encryption key and a second encryption key,
        generate a master key unique to a particular customer,
        provide said master key to at least one remote customer security module (CSM) associated with said particular customer, said remote CSM providing key management services for said customer,
        discard said master key locally,
        receive an encrypted master key associated with said customer from said remote CSM, said encrypted master key being an encrypted version of said master key,
        cause said encrypted master key to be stored in a manner that associates said encrypted master key with said customer,
        provide said encrypted master key to said remote CSM, and
        receive said master key from said remote CSM, said master key received from said remote CSM being a decrypted version of said encrypted master key;
    a client interface including a second subset of said set of predefined instructions configured to establish a network connection with a geographically remote client device associated with said particular customer over a wide-area network (WAN); and
    an upload service including a third subset of said set of predefined instructions configured to
        receive a first digital object from said client device over said WAN,
        encrypt said first digital object using said first encryption key,
        cause said first encrypted digital object to be stored in said non-volatile memory of said at least one storage node,
        receive a second digital object from said client device over said WAN, encrypt said second digital object using said second
encryption key,
cause said second encrypted digital object to be stored
in said non-volatile memory of said at least one
storage node,
communicate with said at least one remote customer
security module (CSM) associated with said customer, and
encrypt said first encryption key and said second
encryption key using said master key; and wherein
said remote CSM is geographically remote with respect to
said object storage system; and
said remote CSM is geographically local with respect to
said client device.

2. The object storage system of claim 1, wherein said key provisioning service comprises:
a key generator operative to generate said unique encryption keys including said first encryption key and said second encryption key prior to said first digital object and said second digital object being received by said upload service; and
a key cache operative to temporarily store said unique encryption keys including said first encryption key and said second encryption key generated by said key generator for consumption by said upload service.

3. The object storage system of claim 1, wherein each of said plurality of unique encryption keys comprises at least an Advanced Encryption Standard (AES) 256-bit key.

4. The object storage system of claim 1, further comprising:
a deduplication service including a fourth subset of said set of predefined instructions; and wherein
said upload service is further operative to calculate a pre-encryption checksum and a post-encryption checksum for said first digital object; and
said deduplication service is operative to perform a deduplication operation on said first digital object and additional digital objects stored in said object storage system based on said pre-encryption checksum and not said post-encryption checksum.

5. The object storage system of claim 1, further comprising:
an object database storing a plurality of object records associated with stored digital objects; and wherein
said upload service is further operative to
store said encrypted first encryption key in said object database such that said encrypted first encryption key is associated with said first digital object; and
store said encrypted second encryption key in said object database such that said encrypted second encryption key is associated with said second digital object.

6. The object storage system of claim 5, further comprising a download service including a fifth subset of said set of predefined instructions, said download service operative to:
receive a request to download said first encrypted digital object from a requesting client device associated with said customer;
fetch said encrypted first encryption key from said object database in response to said request to access said first encrypted digital object;
decrypt said encrypted first encryption key using said decrypted master key;
decrypt said first encrypted digital object using said decrypted first encryption key; and
serve said first digital object to said requesting client device via said client interface.

7. The object storage system of claim 1, wherein said upload service is further operative to:
provide said first and said second encryption keys to said remote CSM, whereby said remote CSM encrypts said first and said second encryption keys;
receive an encrypted first encryption key and an encrypted second encryption key from said remote CSM; and
delete said first and said second encryption keys locally.

8. The object storage system of claim 7, further comprising a download service operative to:
receive a request to download said first encrypted digital object from a requesting client device associated with said customer;
obtain said first encryption key from said remote CSM in response to said request to download said first encrypted digital object;
decrypt said first encrypted digital object using said first encryption key; and
serve said first digital object to said requesting client device via said client interface.

9. The object storage system of claim 1, further comprising:
at least one customer security module (CSM) proxy associated with said customer; and wherein
said CSM proxy is configured to securely communicate with said remote CSM on behalf of said object storage system.

10. The object storage system of claim 1, wherein:
said upload service is operative to
receive an upload request associated with said first digital object from said client device after said master key has been discarded locally,
responsive to receiving said upload request, cause said master key to be retrieved from said remote CSM, said master key being said decrypted version of said encrypted master key,
encrypt said first encryption key using said decrypted version of said encrypted master key, and
store said encrypted first encryption key such that said encrypted first encryption key is associated with said first digital object; and
said decrypted version of said master key is locally discarded again after said first encryption key is encrypted.

11. The object storage system of claim 10, further comprising a download service including a fifth subset of said set of predefined instructions, said download service being operative to:
receive a request to download said first encrypted digital object from a requesting client device associated with said customer after said master key has been discarded again locally,
responsive to said download request, cause said master key to be retrieved again from said remote CSM, said master key being said decrypted version of said encrypted master key,
decrypt said encrypted first encryption key using said decrypted version of said encrypted master key,
decrypt said first encrypted digital object using said decrypted first encryption key, and
serve said first digital object to said requesting client device; and
wherein said decrypted version of said master key is locally discarded again after said encrypted first encryption key is decrypted.

12. The object storage system of claim 1, further comprising:
a master key cache; and wherein
said object storage system is further operative to
temporarily cache said master key received from said remote CSM for a predetermined time period to service said file request and to service subsequent file requests.

13. The object storage system of claim 12, wherein said predetermined time period is set by said customer.

14. The object storage system of claim 1, further comprising:
at least one customer security module (CSM) proxy associated with said customer; and wherein
said CSM proxy is configured to securely communicate with said remote CSM on behalf of said object storage system.

15. The object storage system of claim 1, wherein said upload service is further operative to:
store said encrypted first encryption key in a manner that associates said encrypted first encryption key with said first digital object; and
store said encrypted second encryption key in a manner that associates said encrypted second encryption key with said second digital object.

16. The object storage system of claim 1, further comprising:
an object database storing a plurality of object records associated with stored digital objects; and wherein
each of said object records includes information facilitating the decryption of an encrypted one of said unique encryption keys used to encrypt a stored digital object associated with said object record from a security module of said customer.

17. The object storage system of claim 1, wherein said client interface is operative to:
receive said first digital object by receiving a plurality of chunks of said first digital object via transfer encoding chunked protocol of HTTP; and
receive a trailer following receipt of a final chunk of said plurality of chunks, said trailer specifying a checksum associated with said first digital object.

18. The object storage system of claim 1, wherein said key provisioning service:
receives a CSM identifier along with said encrypted master key, said CSM identifier being indicative of a CSM encryption key used to encrypt said master key and decrypt said encrypted master key, said CSM encryption key being accessible only by said CSM; and
provides said CSM identifier to said remote CSM along with said encrypted master key.

* * * * *